(12) United States Patent
Yamashita et al.

(10) Patent No.: US 12,501,155 B2
(45) Date of Patent: Dec. 16, 2025

(54) SOLID-STATE IMAGING ELEMENT USING MULTI-IMU

(71) Applicant: SONY GROUP CORPORATION, Tokyo (JP)

(72) Inventors: Kosei Yamashita, Kanagawa (JP); Hiroyuki Kamata, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 163 days.

(21) Appl. No.: 17/927,539

(22) PCT Filed: Jun. 16, 2021

(86) PCT No.: PCT/JP2021/022797
§ 371 (c)(1),
(2) Date: Nov. 23, 2022

(87) PCT Pub. No.: WO2022/004374
PCT Pub. Date: Jan. 6, 2022

(65) Prior Publication Data
US 2023/0353876 A1    Nov. 2, 2023

(30) Foreign Application Priority Data

Jun. 30, 2020  (JP) ................................ 2020-112782
Nov. 27, 2020  (JP) ................................ 2020-197417
Feb. 26, 2021  (JP) ................................ 2021-030228

(51) Int. Cl.
*H04N 23/68* (2023.01)
*G05D 3/12* (2006.01)
*H04N 25/79* (2023.01)

(52) U.S. Cl.
CPC ........... *H04N 23/6812* (2023.01); *G05D 3/12* (2013.01); *H04N 23/687* (2023.01); *H04N 25/79* (2023.01); *H04N 23/683* (2023.01)

(58) Field of Classification Search
None
See application file for complete search history.

(56) References Cited

U.S. PATENT DOCUMENTS

2006/0228049 A1   10/2006   Gensolen
2006/0279639 A1   12/2006   Silverstein
(Continued)

FOREIGN PATENT DOCUMENTS

JP    2011-095467 A    5/2011
JP    2014-138380 A    7/2014
(Continued)

*Primary Examiner* — Paul M Berardesca
(74) *Attorney, Agent, or Firm* — Paratus Law Group, PLLC

(57) ABSTRACT

There is provided a solid-state imaging element, an imaging device, a method for operating an imaging device, a mobile object device, a method for operating a mobile object device, and a program capable of realizing high-accuracy hand shake correction by improving detection accuracy of a multi-IMU. Detection results acquired by a plurality of IMUs (Inertial Measurement Units) are composed and output, an oscillation signal of a drive frequency that becomes a reference for driving an IMU is output to the plurality of IMUs as a reference signal, and the plurality of IMUs are driven using oscillation signals of the same drive frequency. Then, a multi-IMU formed from a plurality of IMUs driven using oscillation signals of the same drive frequency are disposed to be integrated with the image sensor, and hand shake correction matching movement of the image sensor is applied. The present disclosure can be applied to an imaging device.

29 Claims, 72 Drawing Sheets

(56) References Cited

U.S. PATENT DOCUMENTS

| | | | |
|---|---|---|---|
| 2014/0303687 A1* | 10/2014 | Wall, III | ............... A61F 9/08 607/54 |
| 2018/0143043 A1* | 5/2018 | Falabella | ............... H04N 23/20 |
| 2020/0228709 A1* | 7/2020 | An | ............... H04N 23/6812 |
| 2021/0014399 A1 | 1/2021 | Yamazaki | |
| 2023/0179892 A1* | 6/2023 | Yang | ............... H04N 25/79 348/148 |
| 2024/0328790 A1* | 10/2024 | Yamashita | ............ G02B 27/646 |

FOREIGN PATENT DOCUMENTS

| | | |
|---|---|---|
| JP | 2019-003035 A | 1/2019 |
| JP | 2019-121941 A | 7/2019 |
| WO | WO 2018/092282 A1 | 5/2018 |
| WO | WO 2020/045099 A1 | 3/2020 |

* cited by examiner

Fig. 8

| | IMU1-1<br>20.000Hz | IMU1-2<br>20.010Hz | IMU1-3<br>19.990Hz | IMU1-4<br>20.020Hz |
|---|---|---|---|---|
| IMU1-1<br>20.000Hz | | 10Hz | 100Hz | 20Hz |
| IMU1-2<br>20.010Hz | 10Hz | | 110Hz | 10Hz |
| IMU1-3<br>19.990Hz | 100Hz | 110Hz | | 120Hz |
| IMU1-4<br>20.020Hz | 20Hz | 10Hz | 120Hz | |

SOLID-STATE IMAGING ELEMENT USING MULTI-IMU

CROSS REFERENCE TO PRIOR APPLICATION

This application is a National Stage Patent Application of PCT International Patent Application No. PCT/JP2021/022797 (filed on Jun. 16, 2021) under 35 U.S.C. § 371, which claims priority to Japanese Patent Application Nos. 2020-112782 (filed on Jun. 30, 2020), 2020-197417 (filed on Nov. 27, 2020), and 2021-030228 (filed on Feb. 26, 2021) which are all hereby incorporated by reference in their entirety.

TECHNICAL FIELD

The present disclosure relates to a solid-state imaging element, an imaging device, a method for operating an imaging device, a mobile object device, a method for operating a mobile object device, and a program, and more particularly, to a solid-state imaging element, an imaging device, a method for operating an imaging device, a mobile object device, a method for operating a mobile object device, and a program capable of correcting a deviation of imaging with high accuracy by improving detection accuracy of a multi-IMU.

BACKGROUND ART

A multi-IMU that improves detection accuracy by integrating detection results of a plurality of inertial measurement units (IMUs) has been proposed.

As a technology for improving detection accuracy of a multi-IMU, a technology capable of appropriately composing observed values of a plurality of IMUs in accordance with conditions relating to noise characteristics and observed values of the plurality of IMUs has been proposed (see PTL 1).

In addition, a technology for correcting a deviation of imaging by mounting an IMU in an imaging device and controlling movement of an image sensor using an actuator or the like on the basis of an observed value has been proposed (PTL 2 and PTL 3).

Thus, an application for correcting a deviation of imaging with high accuracy by mounting this multi-IMU in an imaging device and applying the technologies disclosed in PTL 2 and PTL 3 may be considered.

CITATION LIST

Patent Literature

[PTL 1]
WO 2020/045099
[PTL 2]
JP 2014-138380 A
[PTL 3]
JP 2011-095467 A

SUMMARY

Technical Problem

Meanwhile, a vibration-type IMU using micro electro mechanical systems (MEMS) used in a multi-IMU using a plurality of IMUs such as the example of PTL 1 detects an angular velocity on the basis of a Coriolis force generated by rotating an object while adding vibration to the object.

However, since a plurality of IMUs generate vibration, vibration generated by the other IMUs interferes with each IMU, and a beat noise caused by the interference may be generated.

Especially, in accordance with recent improvement of machining accuracy of IMUs, manufacturing variations have decreased, and manufacturing of individual IMUs in which frequencies of generated vibrations are similar has increased, and thus interference may easily occur, and the influence of a beat noise due to interference may be easily received.

For this reason, even when a multi-IMU is simply mounted in an imaging device, there is a concern that a deviation of imaging cannot be appropriately inhibited.

In addition, even if the influence of a noise due to interference between individual IMUs of a multi-IMU can be inhibited, like technologies disclosed in PTL 2 and PTL 3, even when only movement of a main body side of an imaging device is detected, and a deviation of imaging is corrected by controlling the movement of an image sensor using an actuator or the like in accordance with the detected movement of the main body, there is concern that a deviation of the imaging cannot be completely inhibited.

In other words, although movement of a device main body can be detected by a multi-IMU detecting movement of the device main body, vibration of an image sensor supported by an actuator cannot be detected.

Particularly, when an imaging device is mounted in a device that is driven by a motor, an engine, or the like, a deviation due to minute high-frequency vibration of the motor, the engine, or the like occurs in an image sensor.

For this reason, a deviation of imaging following a high-frequency vibration actually generated in an image sensor cannot be corrected simply by detecting movement of a device main body and correcting a deviation of imaging to reflect the detected movement in movement of the image sensor.

The present disclosure is in view of such situations and, particularly, realizes a multi-IMU having high accuracy by reducing the influence of a beat noise due to interference between individual IMUs configuring the multi-IMU.

In addition, by applying the multi-IMU having high accuracy described above to an imaging device, the present disclosure enables detection of movement of an image sensor and correction of a deviation of imaging also following movement formed by high-frequency vibration generated in the image sensor.

Solution to Problem

According to a first aspect of the present disclosure, there is provided a solid-state imaging element including: an image sensor configured to capture an image; and an inertial measurement unit (IMU) disposed integrally with the image sensor and configured to detect an acceleration and an angular velocity of the image sensor, in which the IMU outputs the acceleration and the angular velocity of the image sensor to a drive control unit controlling driving of the image sensor.

According to the first aspect of the present disclosure, an image is captured by the image sensor, an acceleration and an angular velocity of the image sensor are detected by an inertial measurement unit (IMU) that is disposed to be integrated with the image sensor, and the acceleration and the angular velocity of the image sensor are output to the drive control unit that controls driving of the image sensor.

According to a second aspect of the present disclosure, there are provided an imaging device and a mobile object device including: a solid-state imaging element including an image sensor configured to capture an image and an inertial measurement unit (IMU) disposed integrally with the image sensor and configured to detect an acceleration and an angular velocity of the image sensor; a drive unit configured to control a position and a posture of the image sensor; and a drive control unit configured to control the position and the posture of the image sensor by controlling driving performed by the drive unit using inertial navigation based on the acceleration and the angular velocity of the image sensor and intermediate output signals.

According to the second aspect of the present disclosure, a method for operating an imaging device and a method for operating a mobile object device represent a method for operating an imaging device including: a solid-state imaging element including an image sensor configured to capture an image and an inertial measurement unit (IMU) disposed integrally with the image sensor and configured to detect an acceleration and an angular velocity of the image sensor; and a drive unit configured to control a position and a posture of the image sensor, the methods including: a step of controlling the position and the posture of the image sensor by controlling driving performed by the drive unit using inertial navigation based on the acceleration and the angular velocity of the image sensor and intermediate output signals.

According to the second aspect of the present disclosure, an image is captured by an image sensor, an acceleration and an angular velocity of the image sensor are detected by an inertial measurement unit (IMU) that is disposed to be integrated with the image sensor, the position and the posture of the image sensor are controlled, and the position and the posture of the image sensor are controlled using inertial navigation based on the acceleration and the angular velocity of the image sensor or intermediate output signals.

BRIEF DESCRIPTION OF DRAWINGS

FIG. 8 is a diagram illustrating interference generated by a multi-IMU.

DESCRIPTION OF EMBODIMENTS

Figure 1:
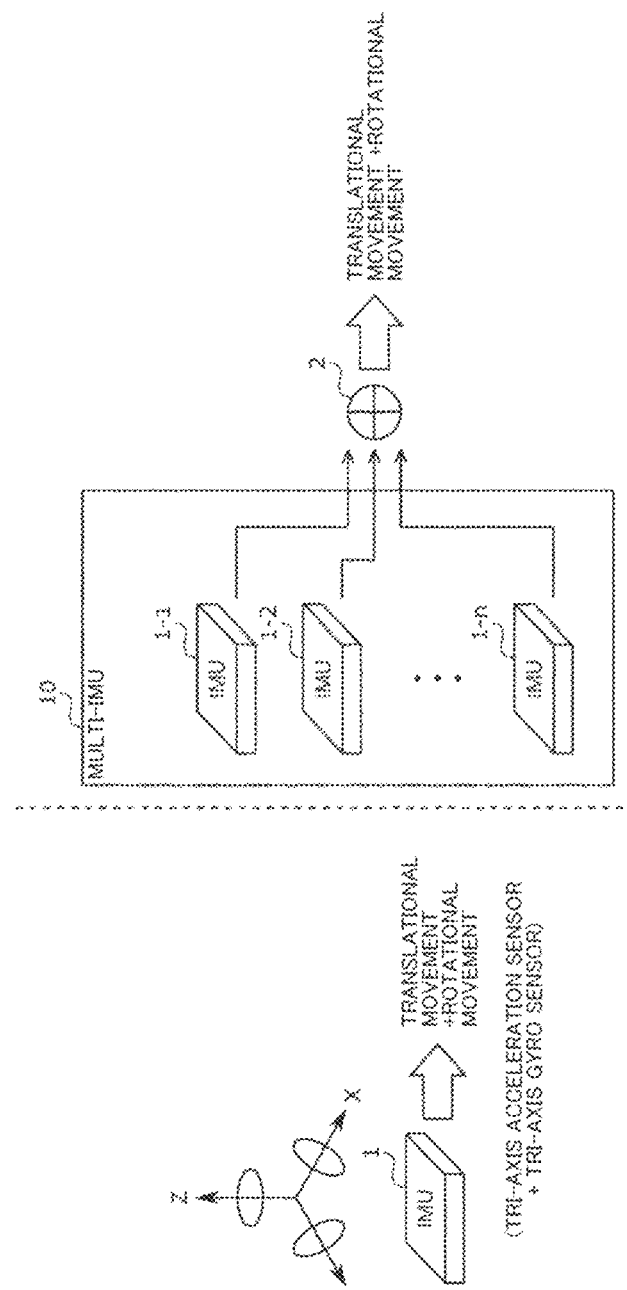
FIG. 1 is a diagram illustrating a multi-IMU.

Preferred embodiments of the present disclosure will be described in detail with reference to the accompanying figures below. Also, in the present specification and the figures, components having substantially the same functional configuration will be denoted by the same reference numerals, and thus repeated descriptions thereof will be omitted.

An embodiment for implementing the present technique will be described below. The description will be made in the following order.

1. Overview of present disclosure
    2. First embodiment
    3. First modified example of first embodiment
    4. Second modified example of first embodiment
    5. Third modified example of first embodiment
    6. Fourth modified example of first embodiment
    7. Fifth modified example of first embodiment
    8. Sixth modified example of first embodiment
    9. Seventh modified example of first embodiment
    10. Second embodiment
    11. First modified example of second embodiment 12. Second modified example of second embodiment
13. Third modified example of second embodiment
14. Fourth modified example of second embodiment
15. Third embodiment
16. First modified example of third embodiment
17. Fourth embodiment
18. First modified example of fourth embodiment
19. Second modified example of fourth embodiment
20. Third modified example of fourth embodiment
21. Fourth modified example of fourth embodiment
22. Fifth modified example of fourth embodiment
23. Fifth embodiment
24. First modified example of fifth embodiment
25. Second modified example of fifth embodiment
26. Third modified example of fifth embodiment
27. Example of executing processing using software 1. Overview of Present Disclosure <Multi-IMU>

The present disclosure, particularly, realizes a multi-inertial measurement unit (IMU) having high accuracy by reducing an influence of a beat noise due to interference between IMUs configuring the multi-IMU.

First, in describing an overview of the present disclosure, a multi-IMU will be described.

As illustrated on the left in FIG. 1, for example, a single IMU 1 is formed to have a configuration that includes an acceleration sensor detecting an acceleration, which is a translational motion, and a gyro sensor detecting an angular velocity, which is a rotational motion, in each of directions of three axes formed from XYZ axes and detects an acceleration and an angular velocity in each of the directions of the three axes.

Although a single IMU 1 may have high accuracy, generally, as the accuracy becomes higher, the IMU becomes larger and more expensive, and thus, to acquire higher accuracy, the size increases and the cost increases.

Thus, as illustrated on the right in FIG. 1, for example, by disposing a plurality of (for example, n) IMUs 1 that have low accuracy and are inexpensive such as IMUs 1-1 to 1-$n$ and composing accelerations and angular velocities that are detection results acquired by the IMUs 1-1 to 1-$n$ using a composing device 2, detection accuracy is improved to achieve high accuracy by reducing a noise density and a bias variation by 1/Vn, whereby a multi-IMU 10 is acquired.

A device size and a device cost relating to the IMUs 1-1 to 1-$n$, which have low accuracy and are inexpensive, configuring the multi-IMU 10 illustrated in the right part of FIG. 1 can be sufficiently small and low relative to a device size and a device cost acquired in a case in which a single IMU 1 having high accuracy as illustrated on the left in FIG. 1 is prepared, and implementation of low cost can be realized.

Hereinafter, in a case in which the IMUs 1-1 to 1-$n$ do not particularly need to be distinguished from each other, one will be referred to as an IMU 1, and this similarly applies to other components. In this specification, hereinafter, although the IMU 1 is assumed to be an IMU that has a small size, is inexpensive, and has relatively low accuracy, the IMU 1 may be an IMU that has a large size, is expensive, and has high accuracy.

<Structure of IMU>

Next, the structure of the IMU 1 will be described with reference to FIG. 2.

Figure 2:
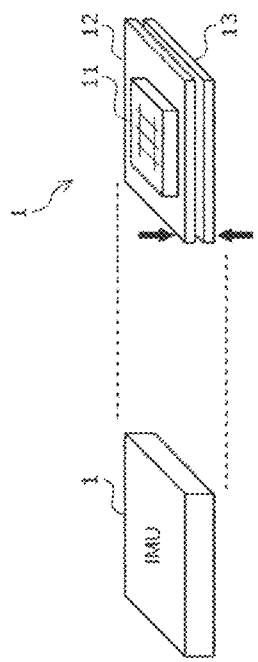
FIG. 2 is a diagram illustrating a structure of an IMU.

As illustrated on the right in FIG. 2, each IMU 1 configuring the multi-IMU 10 is composed of a vibrator 11 that is formed from silicon, a base 12 that fixes the vibrator 11, and a reading circuit 13 that reads vibration of the vibrator 11 and outputs an angular velocity from the top in the drawing, and these are bonded in the order illustrated on the right in FIG. 2 and are integrated as one body using a resin mold as illustrated on the left in FIG. 2.

<Circuit Configuration of Reading Circuit>

Next, a circuit configuration of the reading circuit 13 of the IMU 1 will be described with reference to FIG. 3.

Figure 3:
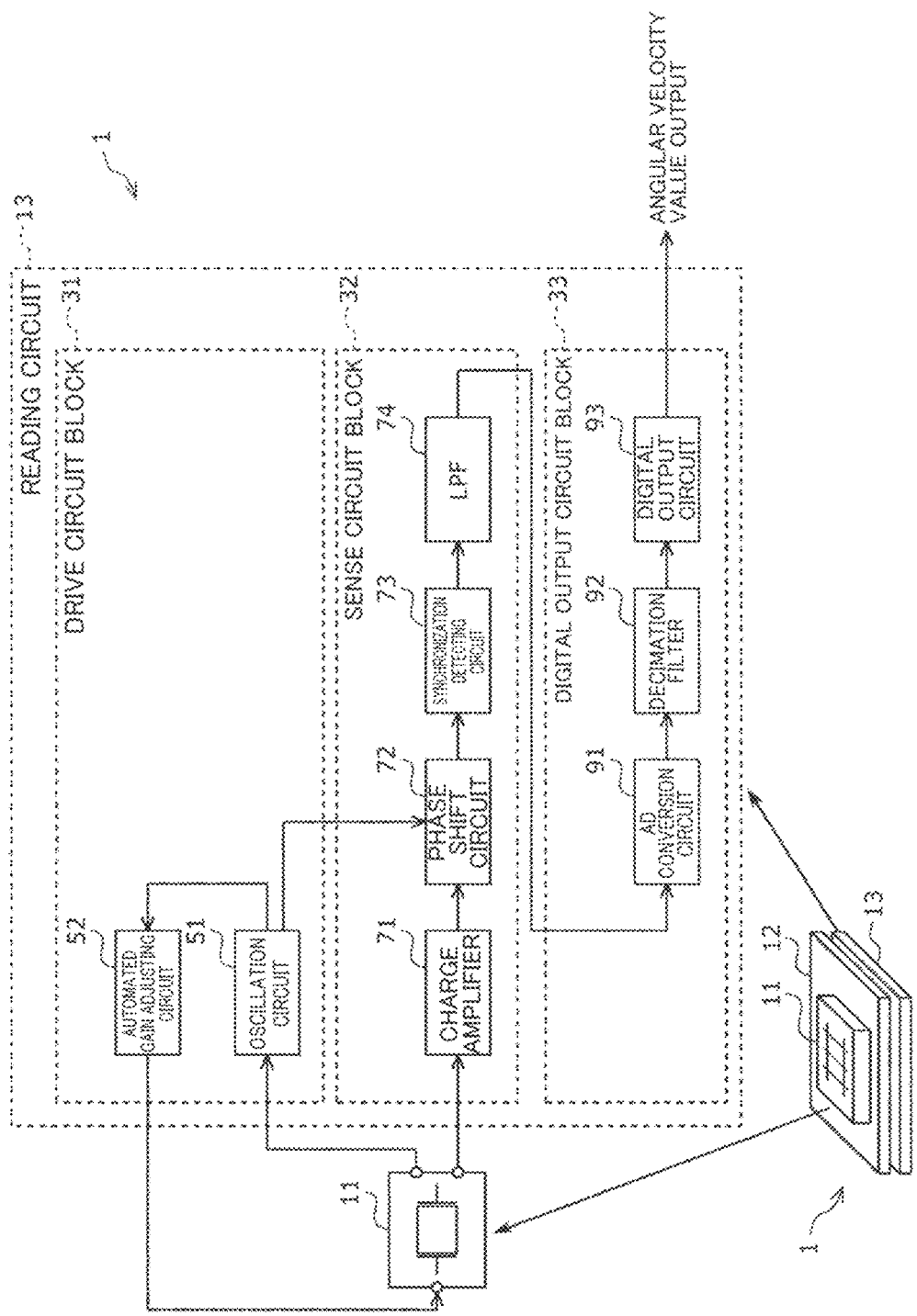
FIG. 3 is a diagram illustrating a circuit configuration of a reading circuit of the IMU illustrated in FIG. 2.

With reference to FIG. 3, a configuration for detecting an angular velocity in the reading circuit configuring the IMU 1 will be described. A configuration for detecting an acceleration in the IMU 1 is a configuration acquired by excluding a wave detection circuit from the configuration for detecting an angular velocity, and thus the configuration for detecting an angular velocity, which is more complex, will be specifically described.

The reading circuit 13 is composed of a drive circuit block 31, a sense circuit block 32, and a digital output circuit block 33.

The drive circuit block 31 supplies an oscillation signal formed from a predetermined drive frequency to the vibrator 11 configured from micro electro mechanical systems (MEMS) and the sense circuit block 32 and vibrates the vibrator 11 on the basis of the oscillation signal.

The sense circuit block 32 detects vibration generated in accordance with a Coriolis force acting on the vibrator 11 vibrating on the basis of an oscillation signal as an analog signal and outputs the detected analog signal to the digital output circuit block 33.

The digital output circuit block 33 converts the vibration generated in accordance with a Coriolis force acting on the vibrator 11 supplied from the sense circuit block 32 from an analog signal to a digital signal and outputs the digital signal as an angular velocity.

In more detail, the drive circuit block 31 includes an oscillation circuit 51 and an automated gain adjusting circuit 52.

The oscillation circuit 51 is configured from RC, generates an oscillation signal using vibration supplied from the vibrator 11 as a reference signal, and outputs the generated oscillation signal to the automated gain adjusting circuit 52 and a phase shift circuit 72 of the sense circuit block 32.

The automated gain adjusting circuit 52 adjusts a gain of an oscillation signal formed from a drive frequency supplied from the oscillation circuit 51 and supplies the adjusted oscillation signal to the vibrator 11, thereby vibrating the vibrator 11.

The sense circuit block 32 includes a charge amplification circuit 71, a phase shift circuit 72, a synchronization detecting circuit 73, and an LPF 74.

The charge amplification circuit 71 detects vibration of the vibrator 11 as a vibration signal, amplifies the vibration signal, and supplies the amplified vibration signal to the phase shift circuit 72.

The phase shift circuit 72 adjusts a phase of the vibration signal of the vibrator 11 detected by the charge amplification circuit 71 on the basis of an oscillation signal supplied from the oscillation circuit 51 and outputs the adjusted vibration signal to the synchronization detecting circuit 73.

The synchronization detecting circuit 73 detects a waveform representing a Coriolis force acting on the vibrator 11 represented by an envelope from the vibration signal of the vibrator 11 of which the phase has been adjusted and outputs the detected waveform to the LPF 74.

The LPF 74 smooths the waveform representing the Coriolis force acting on the vibrator 11 and outputs the smoothed waveform to the digital output circuit block 33 as information of an angular velocity formed from an analog signal.

The digital output circuit block 33 includes an AD conversion circuit 91, a decimation filter 92, and a digital output circuit 93.

The AD conversion circuit 91 converts information of an angular velocity formed from a Coriolis force acting on the vibrator 11 formed from an analog signal into a digital signal and outputs the digital signal to the decimation filter 92.

The decimation filter 92 averages the information of the angular velocity formed from a digital signal and outputs the averaged information to the digital output circuit 93.

The digital output circuit 93 outputs the averaged information of the angular velocity that has been digitized as a digital signal.

<Operation of IMU>

Next, an operation of the IMU 1 will be described with reference to FIG. 4.

Figure 4:
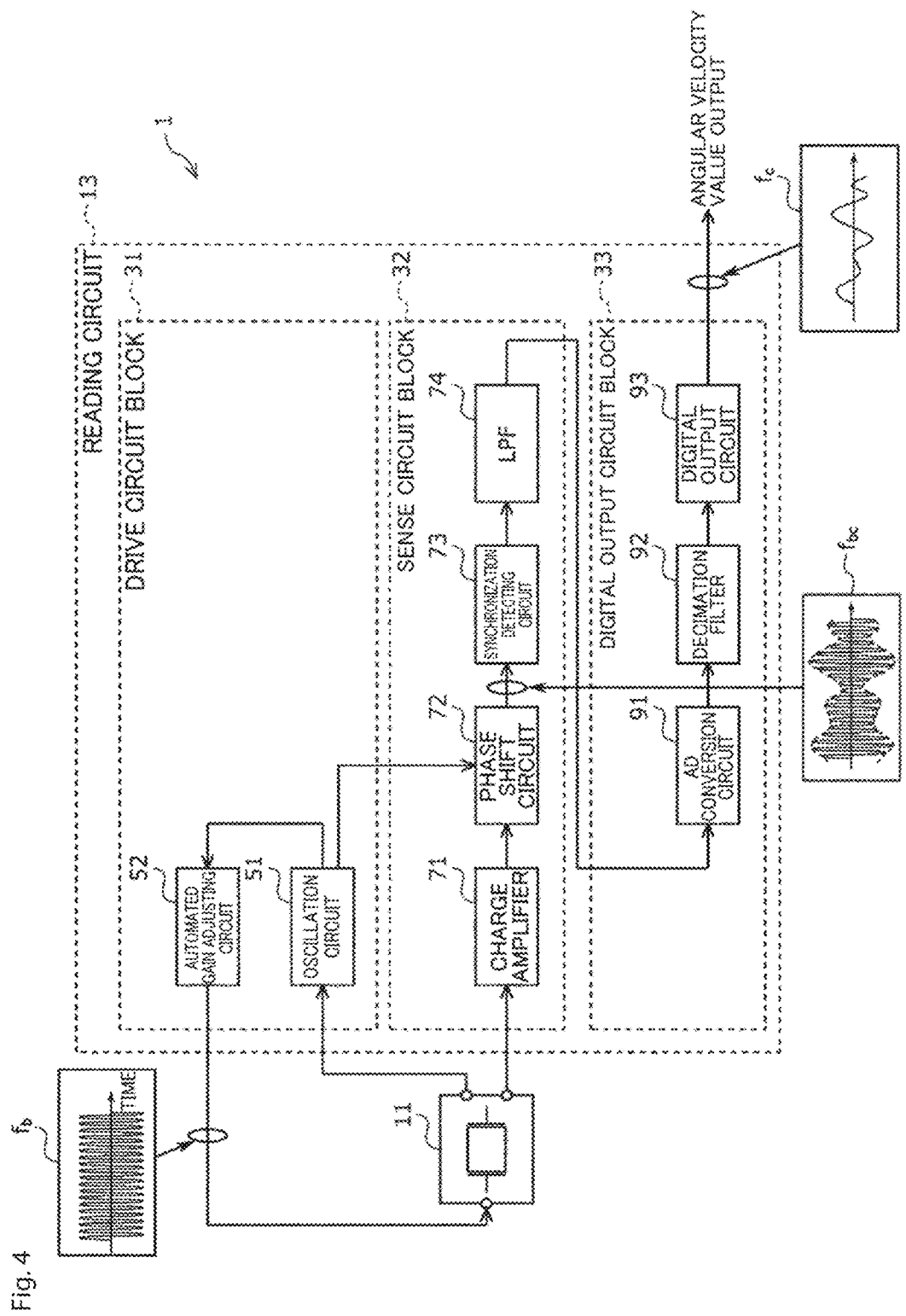
FIG. 4 is a diagram illustrating an operation of the IMU illustrated in FIG. 2.

As illustrated on the upper left in FIG. 4, the vibrator 11 is oscillated by the oscillation circuit 51 and vibrates on the basis of a reference signal formed from an oscillation signal of a drive frequency fb of which a gain has been adjusted by the automated gain adjusting circuit 52.

At this time, when a Coriolis force is applied to the vibrator 11, by applying amplitude modulation according to the Coriolis force, for example, modulation of the amplitude of a waveform output from the charge amplification circuit 71 according to the Coriolis force as denoted by a waveform fbc for the drive frequency fb occurs.

The synchronization detecting circuit 73 detects amplitude modulation according to the Coriolis force as a waveform of an analog signal representing the Coriolis force, that is, the angular velocity from the envelope of the waveform fbc and outputs the detected waveform to the LPF 74.

In this way, the waveform of the analog signal extracted as the Coriolis force is converted into a digital signal by the digital output circuit block 33 and is output as a digitized angular velocity value.

Figure 5:
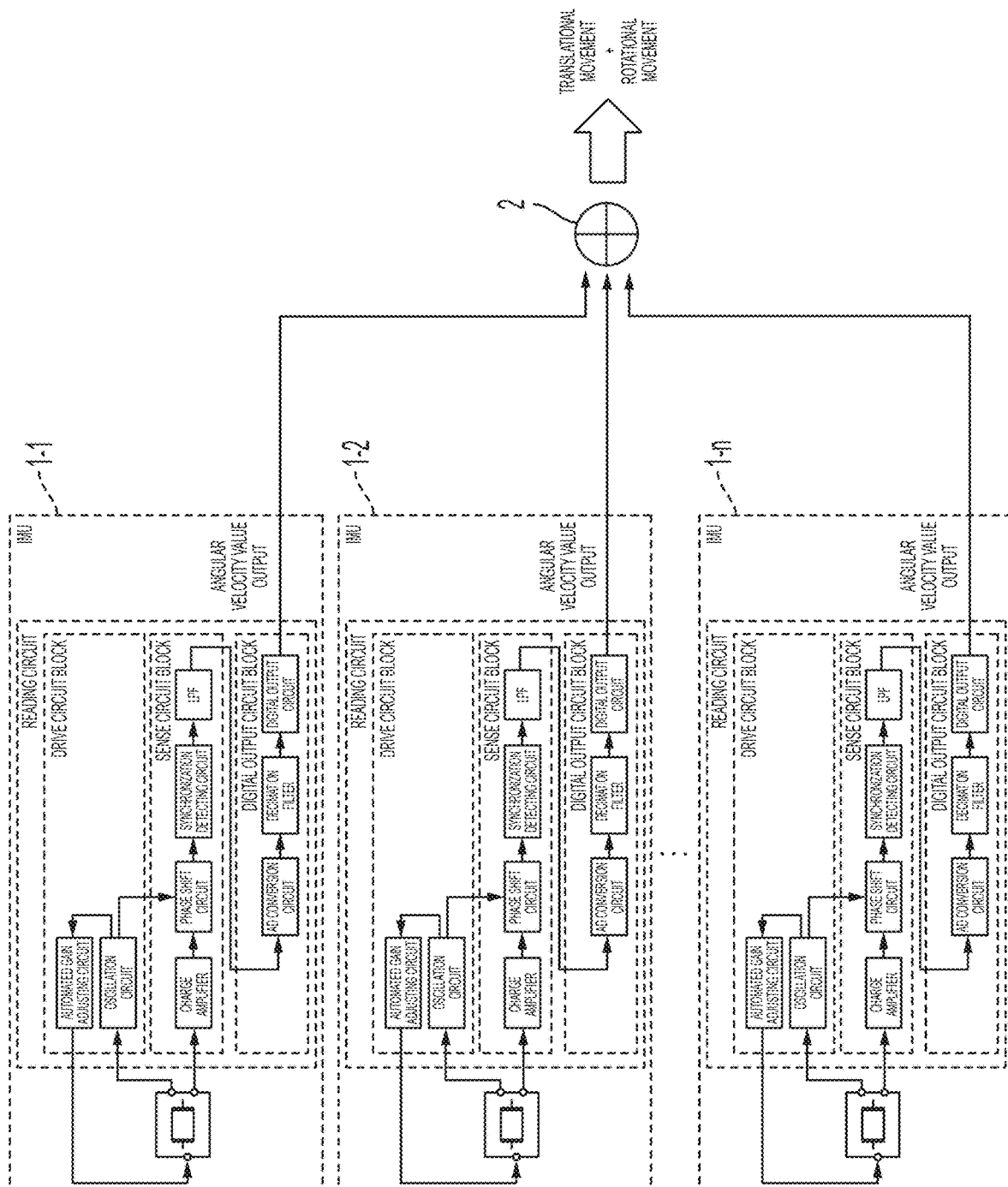
FIG. 5 is a diagram illustrating an operation of a multi-IMU.

The multi-IMU collects and integrates, for example, the n IMUs 1 described above as illustrated in FIG. 5 and composes angular velocities detected by the IMUs 1-1 to 1-n using the composing device 2 to improve the accuracy, and outputs the angular velocity.

<Interference Occurring in Accordance with Plurality of IMUs>

Figure 6:
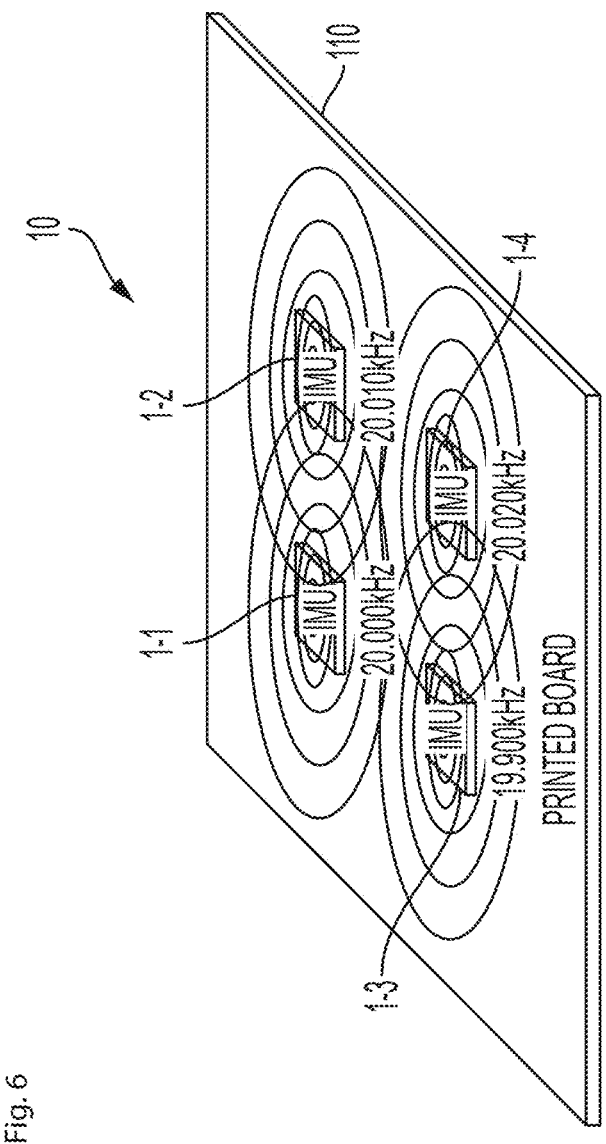
FIG. 6 is a diagram illustrating interference generated by a multi-IMU.

More specifically, the multi-IMU 10 has a configuration, for example, as illustrated in FIG. 6.

In other words, the multi-IMU 10 illustrated in FIG. 6 has a configuration in which IMU 1-1 to IMU 1-4 are disposed on a printed board 110.

In accordance with such a configuration, in the multi-IMU 10 illustrated in FIG. 6, angular velocities detected by the IMU 1-1 to the IMU 1-4 are composed and are output with improved detection accuracy.

Meanwhile, it is known that IMUs 1 are manufactured to have deviations of about 3% in drive frequencies due to individual differences in manufacturing.

For this reason, for example, in a case in which IMUs 1 are designed to have a drive frequency of 20.000 kHz, as illustrated in the IMU 1-1 to the IMU 1-4 illustrated in FIG. 6, a configuration in which the IMU 1-1 is driven with a drive frequency of 20.000 kHz, the IMU 1-2 is driven with a drive frequency of 20.010 kHz, the IMU 1-3 is driven with a drive frequency of 19.900 kHz, and the IMU 1-1 is driven with a drive frequency of 20.020 kHz may be formed.

In such a case, differences between drive frequencies of the IMU 1-1 to IMU 1-4 are small, and thus interference occurs between vibration of the vibrators 11.

Figure 7:
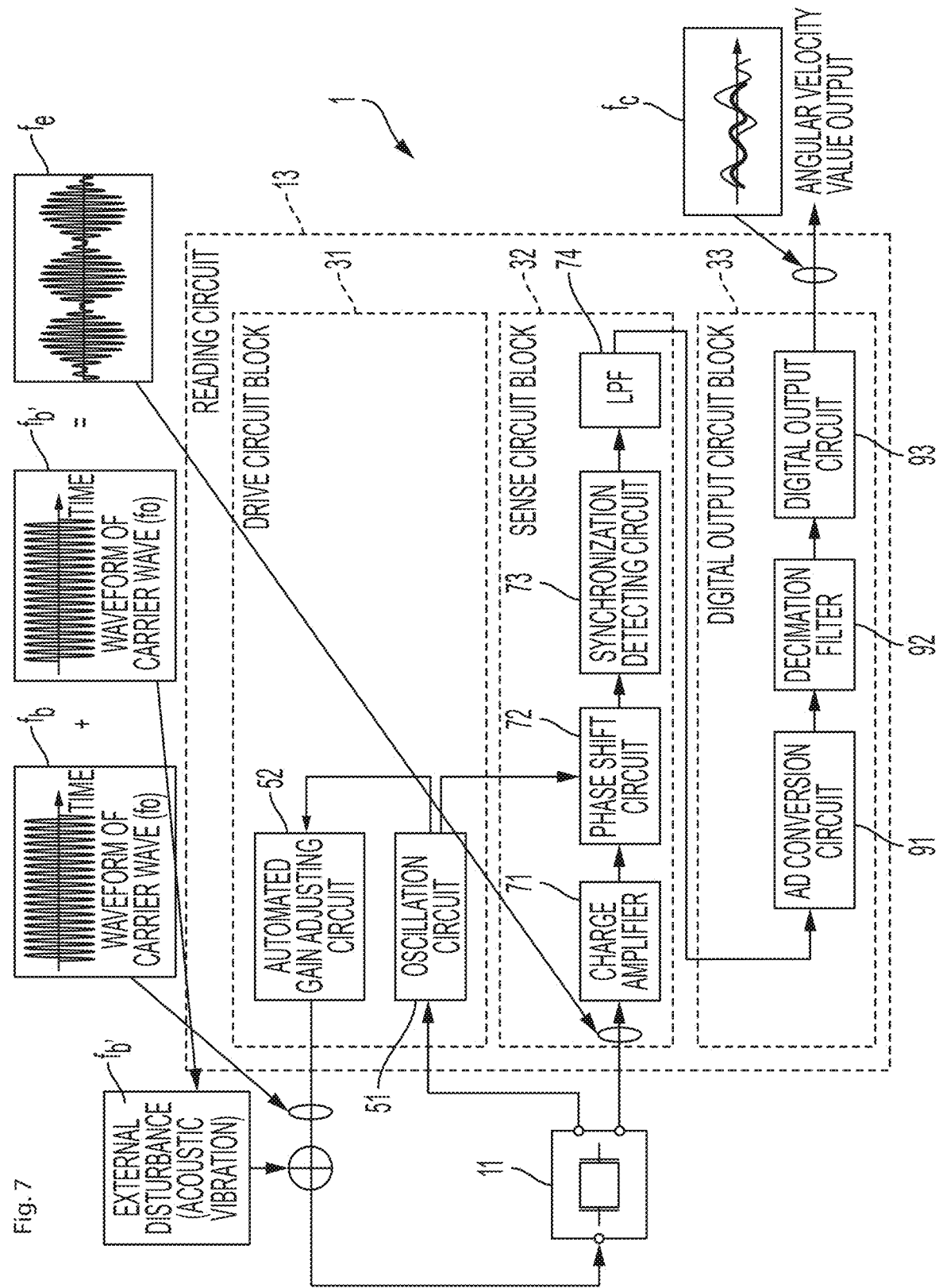
FIG. 7 is a diagram illustrating interference generated by a multi-IMU.

More specifically, as illustrated in FIG. 7, for example, for a reference signal formed from an oscillation signal of a drive frequency fb output through the automated gain adjusting circuit 52 in a predetermined IMU 1, a reference signal of a drive frequency fb' (≠fb) of another nearby IMU 1 becomes an external disturbance (acoustic vibration) and causes interference, amplitude modulation occurs in a reference signal that is actually supplied to the vibrator 11, and an amplitude-modulated signal fe including a beat according to a frequency difference is supplied to the vibrator 11.

In accordance with this, when a reference signal of a drive frequency fb is supplied to the vibrator 11, in a case in which a waveform fc illustrated in FIG. 7 is detected as an angular velocity, when the reference signal supplied to the vibrator 11 changes to an amplitude-modulated signal fe in accordance with an external disturbance, for the waveform fc that is originally detected as an angular velocity, an angular velocity is detected as an amplitude-modulated signal denoted by a thick line in the drawing, and thus an error occurs in the angular velocity.

Similarly, beats are generated as vibration of frequencies corresponding to frequency differences among the IMU 1-1 to the IMU 1-4.

In other words, as beats, as illustrated in FIG. 8, a beat frequency of the IMU 1-1 and the IMU 1-2 becomes 10 Hz that is a drive frequency difference thereof, a beat frequency of the IMU 1-1 and the IMU 1-3 becomes 100 Hz that is drive frequency difference thereof, and a beat frequency of the IMU 1-1 and the IMU 1-3 becomes 20 Hz that is a drive frequency difference thereof.

In addition, a beat frequency of the IMU 1-2 and the IMU 1-3 becomes 110 Hz that is a drive frequency difference thereof, a beat frequency of the IMU 1-2 and the IMU 1-4 becomes 10 Hz that is drive frequency difference thereof, and a beat frequency of the IMU 1-3 and the IMU 1-4 becomes 120 Hz that is a drive frequency difference thereof.

In accordance with this, in the IMU 1-1 to the IMU 1-4, error vibration of beat frequencies overlaps in accordance with interference occurring in mutual reference signals, angular velocities including errors are accordingly detected by the IMU 1-1 to the IMU 1-4, and thus there is concern that an appropriate angular velocity cannot be acquired even by composing these.

2. First Embodiment

<Operation Principle of Multi-IMU According to Present Disclosure>

Thus, in the multi-IMU according to the present disclosure, by setting an oscillation signal of a drive frequency of one of a plurality of IMUs composing the multi-IMU as a reference signal and driving the other IMUs using the reference signal, all the IMUs are driven with the same drive frequency in synchronization with each other, whereby generation of beats according to interference occurring in accordance with mutual vibration is inhibited.

Figure 9:
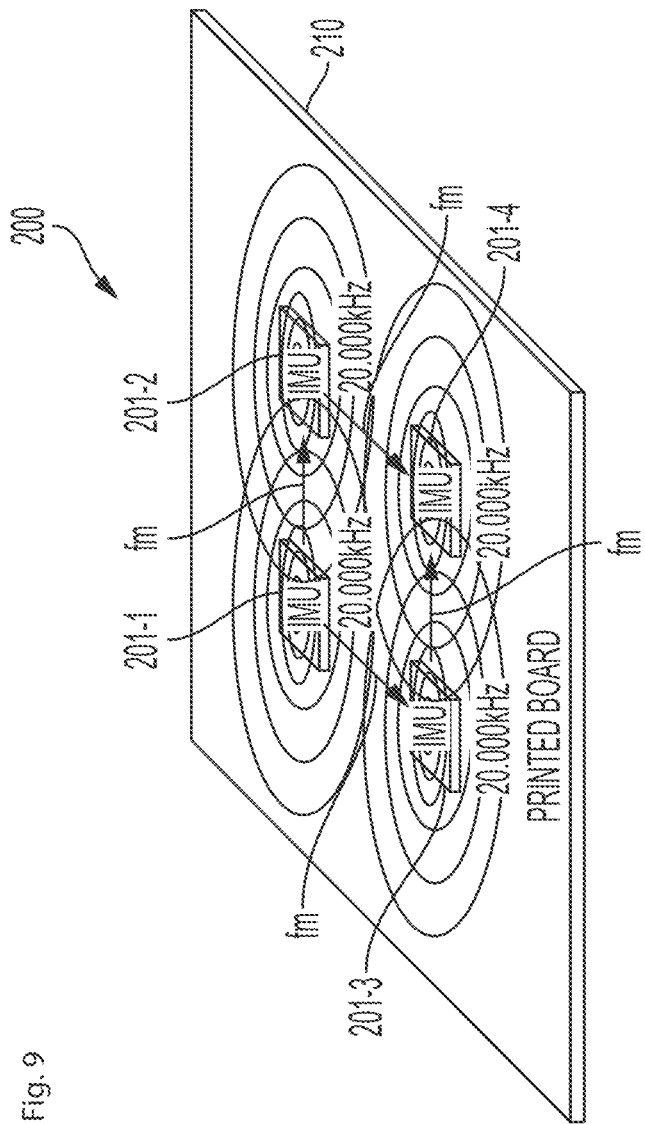
FIG. 9 is a diagram illustrating a multi-IMU according to a first embodiment of the present disclosure.

In other words, in a multi-IMU 200 according to the present disclosure illustrated in FIG. 9, IMUs 201-1 to 201-4 are disposed on a printed board 210.

Here, the printed board 210 and the IMUs 201-1 to 201-4 of the multi-IMU 200 illustrated in FIG. 9 are components respectively corresponding to the printed board 110 and the IMUs 1-1 to 1-4 of the IMU 10 illustrated in FIG. 6. The number of IMUs 201 disposed on the printed board 210 is not limited to four corresponding to the IMUs 201-1 to 201-4 illustrated in FIG. 9 and may be any other number.

In the multi-IMU 200 illustrated in FIG. 9, an oscillation signal used by the IMU 201-1 among the IMUs 201-1 to 201-4 for driving itself is set as a reference signal fm and is supplied to the remaining IMUs 201-2 to 201-4, and the IMUs 201-2 to 201-4 are driven on the basis of the reference signal fm supplied from the IMU 201-1.

Hereinafter, the IMU 201 among the IMUs 201-1 to 201-4 that supplies its oscillation signal to the remaining IMUs 201 as a reference signal fm will also be referred to as a synchronization master device, and the IMU 201 driven using the reference signal fm supplied from the IMU 201 set as the synchronization master device will also be referred to as a synchronization slave device.

In other words, in the case of FIG. 9, the IMU 201-1 is a synchronization master device, and the other IMUs 201-2 to 201-4 are synchronization slave devices.

In this case, a drive frequency of an oscillation signal supplied from the IMU 201-1 that is a synchronization master device is set as a reference drive frequency, and a reference signal fm formed from an oscillation signal of the reference operating frequency is supplied from the IMU 201-1 that is a synchronization master device to the IMUs 201-2 to 201-4 that are synchronization slave devices. Then, the IMUs 201-2 to 201-4 functioning as the synchronization slave devices are driven by the oscillation signal of the reference drive frequency that is the reference signal fm.

In accordance with this, in the case of FIG. 9, the oscillation signal of the drive frequency (=20.000 kHz) of the IMU 201-1 that is a synchronization master device is set as an oscillation signal of the reference drive frequency, the reference signal fm formed from the oscillation signal of the reference drive frequency is supplied to the IMUs 201-2 to 201-4 that are synchronization slave devices, and all the IMUs 201-1 to 201-4 are driven using the same reference signal fm.

In the multi-IMU 200 illustrated in FIG. 9, the reference signal fm output from the IMU 201-1 is supplied to the IMU 201-2 and the IMU 201-3, and the reference signal fm supplied from the IMU 201-1 is supplied to the IMU 201-4 through the IMU 201-2 and the IMU 201-3.

The IMU 201 serving as a synchronization master device may be any one of the IMUs 201-1 to 201-4. The reference signal fm may be supplied directly from the IMU 201 serving as a synchronization master device to the IMUs 201 serving as synchronization slave devices or may be supplied through the IMUs 201 that are other synchronization slave devices.

In accordance with this, the IMUs 201-1 to 201-4 are synchronized and driven with the same drive frequency, and accordingly, generation of beats caused by mutual interference can be inhibited, and thus occurrence of errors in the angular velocities detected by the IMUs 201-1 to 201-4 can be inhibited, whereby each of the IMUs can detect an angular velocity with high accuracy.

In addition, each of the IMUs 201-1 to 201-4 can acquire an angular velocity with high accuracy, and thus, by composing the angular velocities, measurement of an angular velocity with higher accuracy can be performed by the multi-IMU 200.

Configuration Example of Multi-IMU According to Present Disclosure

Next, a configuration example of a multi-IMU according to the present disclosure will be described with reference to FIG. 10.

Figure 10:
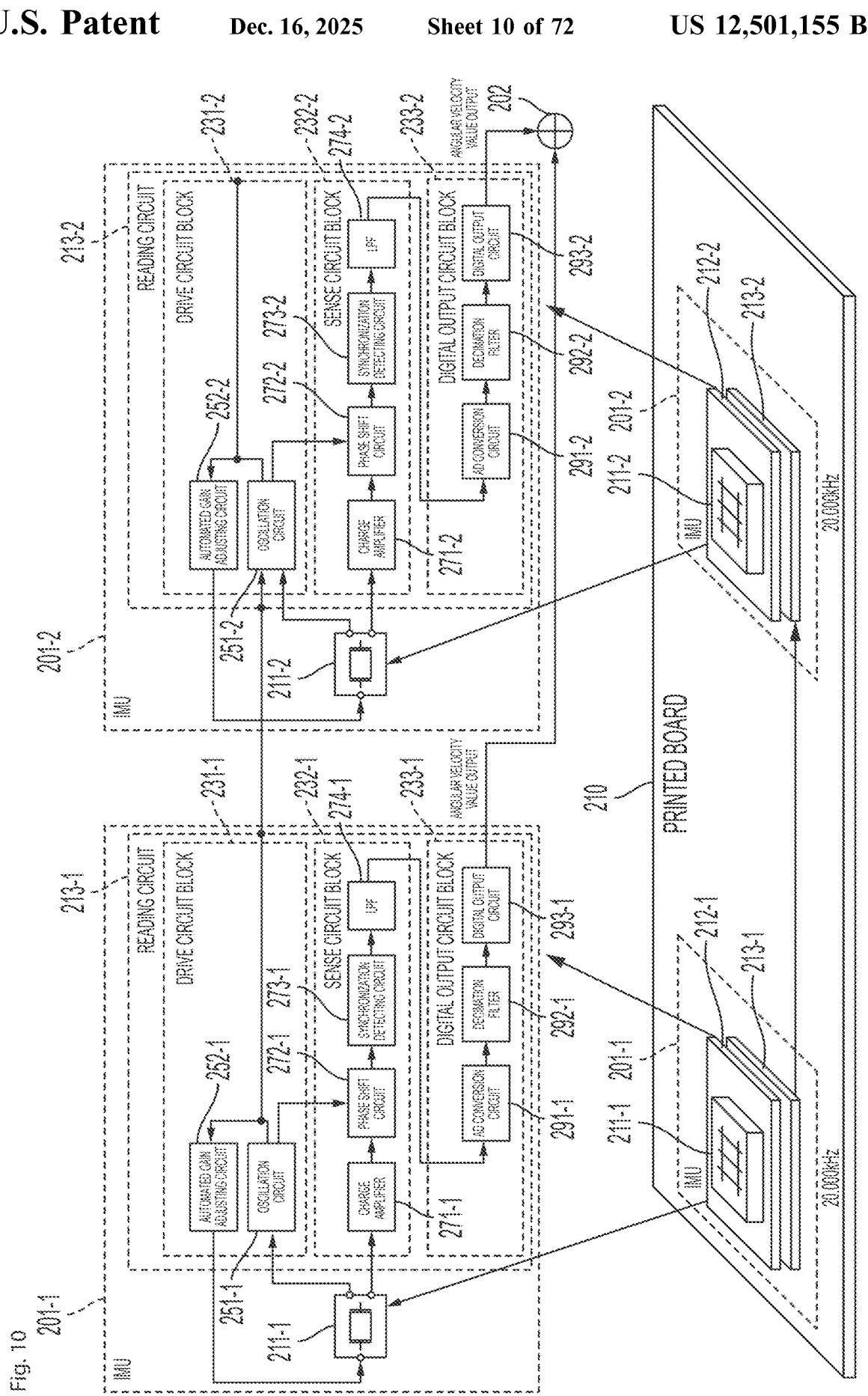
FIG. 10 is a diagram illustrating a configuration example of the multi-IMU illustrated in FIG. 9.

In the configuration example of the multi-IMU 200 illustrated in FIG. 10, an external configuration of an IMU 201-1 functioning as a synchronization master device and an IMU 201-2 functioning as a synchronization slave device among IMUs 201-1 to 201-4 configuring the multi-IMU 200 illustrated in FIG. 9 and a circuit configuration of a reading circuit are illustrated.

In addition, a basic configuration of each of the IMUs 201-3 and 201-4 that are the other IMUs 201 functioning as synchronization slave devices is similar to that of the IMU 201-2 functioning as a synchronization slave device, and thus description thereof will be appropriately omitted.

Both the IMUs 201-1 and 201-2 are disposed on the same printed board 210, and each detects an angular velocity and outputs the detected angular velocity to a composing unit 202. The composing unit 202 composes angular velocities detected by the IMUs 201-1 to 201-4 and outputs information of the composed angular velocity as a detection result.

The IMU 201-1 is composed of a vibrator 211-1 that is formed from MEMS, a base 212-1 that fixes the vibrator 211-1, and a reading circuit 213-1 that reads vibration of the vibrator 211-1 and outputs an angular velocity from the top in the drawing.

Basic functions of the vibrator 211-1 are the same as those of the vibrator 11 illustrated in FIG. 3, and thus description thereof will be omitted.

In addition, the IMU 201-2 is composed of a vibrator 211-2 that is formed from MEMS, a base 212-2 that fixes the vibrator 211-2, and a reading circuit 213-2 that reads vibration of the vibrator 211-2 and outputs an angular velocity from the top in the drawing.

The reading circuit 213-1 is composed of a drive circuit block 231-1, a sense circuit block 232-1, and a digital output circuit block 233-1.

The drive circuit block 231-1, the sense circuit block 232-1, and the digital output circuit block 233-1 are components respectively corresponding to the drive circuit block 31, the sense circuit block 32, and the digital output circuit block 33 illustrated in FIG. 3.

The drive circuit block 231-1 includes an oscillation circuit 251-1 and an automated gain adjusting circuit 252-1.

Basic functions of the oscillation circuit 251-1 and the automated gain adjusting circuit 252-1 are respectively the same as those of the oscillation circuit 51 and the automated gain adjusting circuit 52 illustrated in FIG. 3, and description thereof will be omitted.

Here, the IMU 201-1 functions as a synchronization master device and thus outputs an oscillation signal output from the oscillation circuit 251-1 to the oscillation circuits 251-2 to 251-4 of the IMUs 201-2 to 201-4 that function as synchronization slave devices through the automated gain adjusting circuit 252-1 as a reference signal fm.

The sense circuit block 232-1 includes a charge amplification circuit 271-1, a phase shift circuit 272-1, a synchronization detecting circuit 273-1, and an LPF 274-1.

Basic functions of the charge amplification circuit 271-1, the phase shift circuit 272-1, the synchronization detecting circuit 273-1, and the LPF 274-1 are respectively the same as those of the charge amplification circuit 71, the phase shift circuit 72, the synchronization detecting circuit 73, and the LPF 74 of FIG. 3, and description thereof will be omitted.

The digital output circuit block 233-1 includes an AD conversion circuit 291-1, a decimation filter 292-1, and a digital output circuit 293-1.

Basic functions of the AD conversion circuit 291-1, the decimation filter 292-1, and the digital output circuit 293-1 are respectively the same as those of the AD conversion circuit 91, the decimation filter 92, and the digital output circuit 93 illustrated in FIG. 3, and thus description thereof will be appropriately omitted.

The reading circuit 213-2 is composed of a drive circuit block 231-2, a sense circuit block 232-2, and a digital output circuit block 233-2.

The drive circuit block 231-2, a sense circuit block 232-2, and the digital output circuit block 233-2 are components respectively corresponding to the drive circuit block 31, the sense circuit block 32, and the digital output circuit block 33 illustrated in FIG. 3.

The drive circuit block 231-2 includes an oscillation circuit 251-2 and an automated gain adjusting circuit 252-2.

Basic configurations of the oscillation circuit 251-2 and the automated gain adjusting circuit 252-2 are respectively the same as those of the oscillation circuit 51 and the automated gain adjusting circuit 52 illustrated in FIG. 3, and thus description thereof will be omitted.

Here, since the IMU 201-2 functions as a synchronization slave device, the oscillation circuit 251-2 accepts an input of a reference signal fm supplied from the IMU 201-1 serving as a synchronization master device and performs a pull-in operation, whereby the IMU 201-2 is driven in synchronization with a reference drive frequency (phase locked loop (PLL)) that is a drive frequency of the reference signal fm. In accordance with this, the IMU 201-2 functioning as a synchronization slave device is synchronized with the IMU 201-1 functioning as a synchronization master device and is driven with an oscillation signal of the same reference drive frequency.

The sense circuit block 232-2 includes a charge amplification circuit 271-2, a phase shift circuit 272-2, a synchronization detecting circuit 273-2, and an LPF 274-2.

Basic functions of the charge amplification circuit 271-2, the phase shift circuit 272-2, the synchronization detecting circuit 273-2, and the LPF 274-2 are respectively the same as those of the charge amplification circuit 71, the phase shift circuit 72, the synchronization detecting circuit 73, and the LPF 74 of FIG. 3, and description thereof will be omitted.

The digital output circuit block 233-2 includes an AD conversion circuit 291-2, a decimation filter 292-2, and a digital output circuit 293-2.

Basic functions of the AD conversion circuit 291-2, the decimation filter 292-2, and the digital output circuit 293-2 are respectively the same as those of the AD conversion circuit 91, the decimation filter 92, and the digital output circuit 93 illustrated in FIG. 3, and thus description thereof will be appropriately omitted.

In accordance with a configuration like that described above, the oscillation circuit 251-1 of the IMU 201-1 serving as a synchronization master device supplies the reference signal fm formed from the oscillation signal of the reference drive frequency to the IMUs 201-2 to 201-4 serving as synchronization slave devices.

The oscillation circuits 251-2 to 251-4 of the IMUs 201-2 to 201-4 serving as synchronization slave devices have drive frequencies PLL-locked in accordance with the reference signal fm formed from the oscillation signal of the reference drive frequency, whereby all the IMUs 201-1 to 201-4 configuring the multi-IMU 200 are synchronized with each other and can be driven with oscillation signals formed from the same drive frequency. As a result, generation of beats generated in accordance with differences between the drive frequencies of a plurality of IMUs 201 is inhibited, and an angular velocity can be detected with high accuracy.
<Angular Velocity Detecting Processing Using Multi-IMU Illustrated in FIG. 10>

Figure 11:
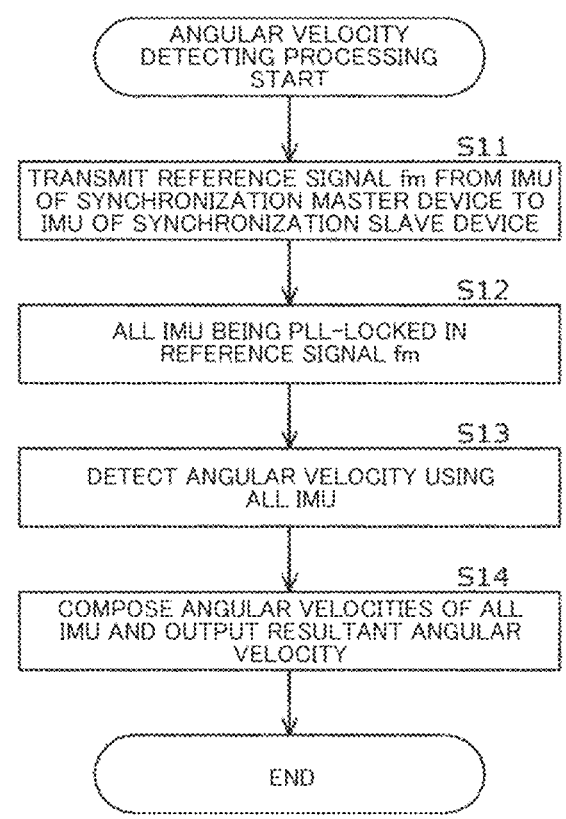
FIG. 11 is a flowchart illustrating angular velocity detecting processing using the multi-IMU illustrated in FIG. 10.

Next, angular velocity detecting processing using the multi-IMU 200 illustrated in FIG. 10 will be described with reference to a flowchart illustrated in FIG. 11.

In Step S11, the oscillation circuit 251-1 of the IMU 201-1 serving as a synchronization master device transmits an oscillation signal having its drive frequency as a reference drive frequency to the IMUs 201-2 to 201-4 serving as synchronization slave devices as a reference signal fm.

In Step S12, the oscillation circuits 251-2 to 251-4 of all the IMUs 201-2 to 201-4 are PLL-locked with the oscillation signal of the drive frequency of the oscillation circuit 251-1 on the basis of the reference signal fm.

According to the process described above, since all the IMUs 201-1 to 201-4 are driven while synchronized with the reference signal fm, generation of beats is inhibited, and errors caused by beats are reduced, whereby each of the IMUs 201-1 to 201-4 can measure an angular velocity with high accuracy.

In Step S13, all the IMUs 201-1 to 201-4 detect angular velocities and output the detected angular velocities to the composing unit 202.

In Step S14, the composing unit 202 composes the angular velocities supplied from the IMUs 201-1 to 201-4 and outputs an angular velocity that is a result of the composing as a result of detection using the multi-IMU 200.

According to the process described above, all the IMUs 201-1 to 201-4 configuring the multi-IMU 200 can be driven in synchronization with each other on the basis of the reference signal fm formed from the oscillation signal of the same drive frequency, and thus occurrence of errors caused by beats can be inhibited, whereby an angular velocity can be detected with high accuracy.

3. First Modified Example of First Embodiment

An example in which, by setting one of a plurality of IMUs 201-1 to 201-4 configuring the multi-IMU 200 as a synchronization master device, setting the other IMUs 201 as synchronization slave devices, setting a drive frequency of the synchronization master device as a reference drive frequency, and forming a configuration in which a reference signal fm formed from an oscillation signal of the reference drive frequency is supplied from the IMU 201 serving as the synchronization master device, all the IMUs 201-1 to 201-4 are driven with the same drive frequency, and generation of errors is inhibited, whereby an angular velocity can be detected with high accuracy has been described above.

However, when any one IMU configuring the multi-IMU 200 is randomly set as a synchronization master device, in a case in which the reference drive frequency is very different from a drive frequency of a synchronization slave device, the frequency is not pulled in the oscillation circuit 251, and there is a possibility of being unable to apply PLL locking.

In this way, in a case in which the IMU 201 serving as a synchronization slave device cannot pull in the drive frequency of the reference signal fm, and PLL locking cannot be applied, the IMU 201 serving as the synchronization slave device cannot perform an operation synchronized with the drive frequency of the IMU 201 serving as the synchronization master device.

Thus, by measuring drive frequencies of a plurality of IMUs 201-1 to 201-4 configuring a multi-IMU 200, setting an IMU 201 of a drive frequency close to a median value as a synchronization master device, and setting the other IMUs 201 as synchronization slave devices, accuracy of pulling-in of the reference drive frequency that is the drive frequency of the reference signal fm may be improved.

Figure 12:
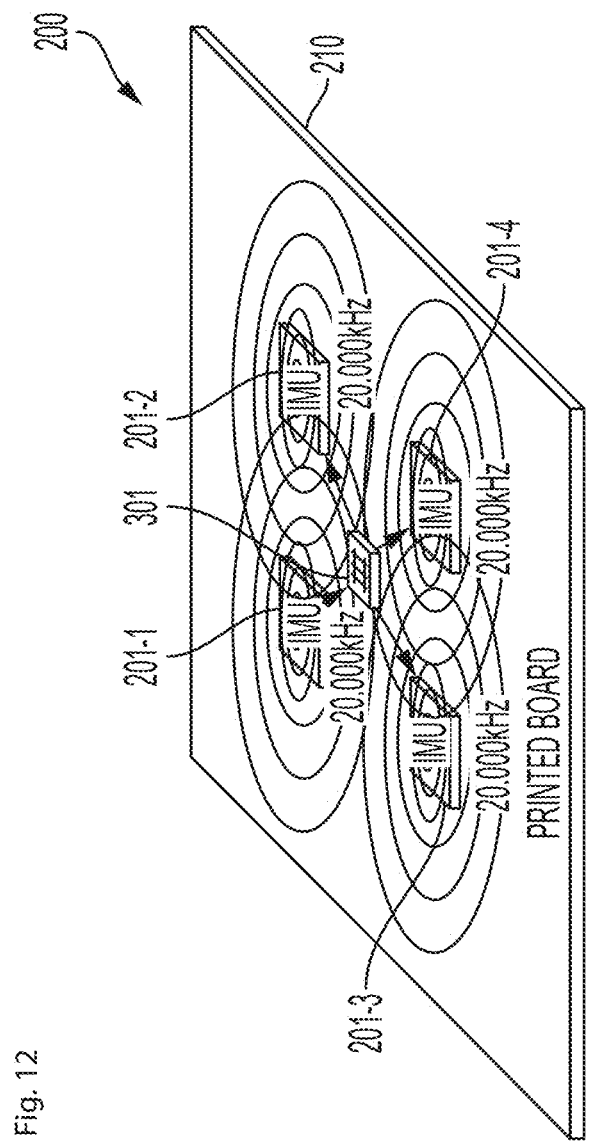
FIG. 12 is a diagram illustrating a multi-IMU according to a first modified example of the first embodiment of the present disclosure.

FIG. 12 illustrates a configuration example of a multi-IMU 200 in which drive frequencies of a plurality of IMUs 201-1 to 201-4 configuring the IMU 200 are measured, an IMU 201 of a drive frequency close to a median value is set as a synchronization master device, and the other IMUs 201 are set as synchronization slave devices.

Among components of the multi-IMU 200 illustrated in FIG. 12, the same reference signs are assigned to components having the same functions as those of the multi-IMU 200 illustrated in FIG. 9, and description thereof will be omitted.

In the multi-IMU 200 illustrated in FIG. 12, a component different from the multi-IMU 200 illustrated in FIG. 9 is a switching circuit 301 that is newly provided.

Figure 13:
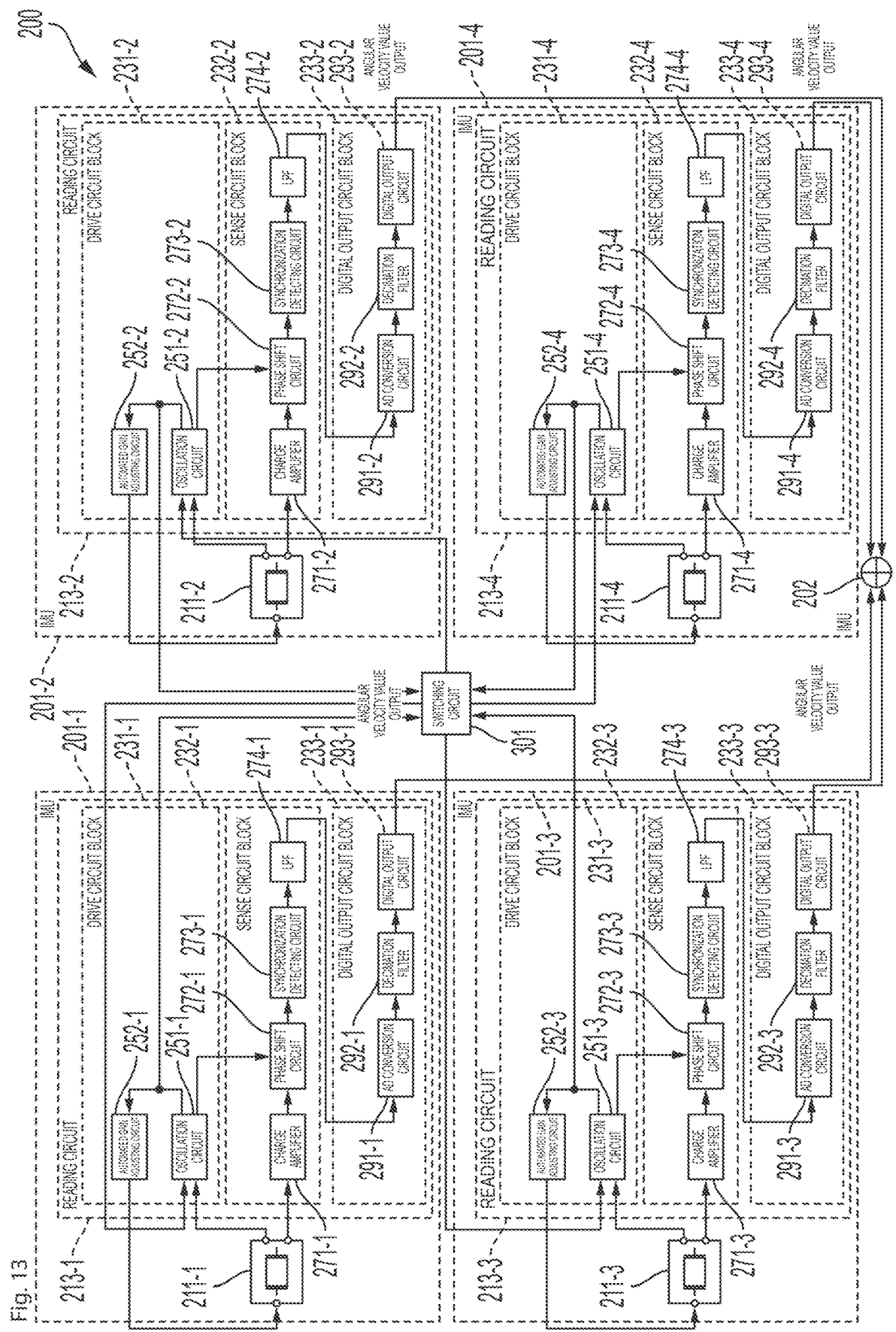
FIG. 13 is a diagram illustrating a configuration example of the multi-IMU illustrated in FIG. 12.

As illustrated in FIG. 13, the switching circuit 301 detects drive frequencies of oscillation circuits 251-1 to 251-4 of IMUs 201-1 to 201-4 configuring the multi-IMU 200 illustrated in FIG. 12, sets an IMU 201 of a drive frequency that is a median value as a synchronization master device, and sets the other IMUs 201 as synchronization slave devices.

Then, the switching circuit 301 supplies an oscillation signal of the drive frequency supplied from the oscillation circuit 251 of the IMU 201 set as the synchronization master device to the oscillation circuits 251 of the IMUs 201 set as the synchronization slave devices as a reference signal fm that is an oscillation signal of the reference drive frequency.

In accordance with this, the IMUs 201 set as the synchronization slave devices are PLL-locked on the basis of the reference signal fm formed from an oscillation signal of the same drive frequency as the IMU 201 set as the synchronization master device, and all the IMUs 201-1 to 201-4 configuring the multi-IMU 200 can detect angular velocities in synchronization with the oscillation signal of the same drive frequency.

As a result, errors relating to detection of an angular velocity caused by beats generated in accordance with interference between IMUs 201 can be inhibited, and angular velocities can be detected with higher accuracy by a plurality of IMUs 201.

FIG. 12 illustrates an example of a case in which the drive frequency of the IMU 201-1 among the IMUs 201-1 to 201-4 configuring the multi-IMU 200 is a frequency close to the median value of the drive frequencies of the IMUs 201-1 to 201-4 and thus is set as the synchronization master device, and the IMUs 201-2 to 201-4 are set as the synchronization slave devices. For this reason, in FIG. 12, a situation in which the switching circuit 301 acquires the oscillation signal of the IMU 201-1 that is the synchronization master device as a reference signal fm and supplies the reference signal to the IMUs 201-2 to 201-4 set as the synchronization slave devices is schematically illustrated using arrows.

In FIG. 13, a circuit configuration configured by reading circuits 213-1 to 213-4 of the IMUs 201-1 to 201-4 configuring the multi-IMU 200 illustrated in FIG. 12 and the switching circuit 301 is illustrated.

The configuration of each of the IMUs 201-1 to 201-4 illustrated in FIG. 13 is basically similar to the configuration illustrated in FIG. 10, and the IMUs 201-1 to 201-4 are identified using signs following "-".

In other words, as illustrated in FIG. 13, outputs of oscillation circuits 251-1 to 251-4 and inputs of reference signals to the oscillation circuits are connected to the switching circuit 301.

The switching circuit 301 acquires drive frequencies by monitoring oscillation signals output from the oscillation circuits 251-1 to 251-4, sets an IMU 201 including an oscillation circuit 251 having a median value as a synchronization master device, and sets the other IMUs 201 as synchronization slave devices.

Then, the switching circuit 301 supplies an oscillation signal output from the oscillation circuit 251 of the IMU 201 set as the synchronization master device to the IMUs 201 set as the synchronization slave devices as a reference signal fm.

The oscillation circuits 251 of the IMUs 201 set as the synchronization slave devices are PLL-locked in the drive frequency of the supplied reference signal fm and thus are driven with the same drive frequency as the oscillation circuit 251 of the IMU 201 set as the synchronization master device. In accordance with this, the IMU set as the synchronization master device and the IMUs 201 set as the synchronization slave devices are driven with the same drive frequency.

<Angular Velocity Detecting Processing Using Multi-IMU Illustrated in FIG. 13>

Figure 14:
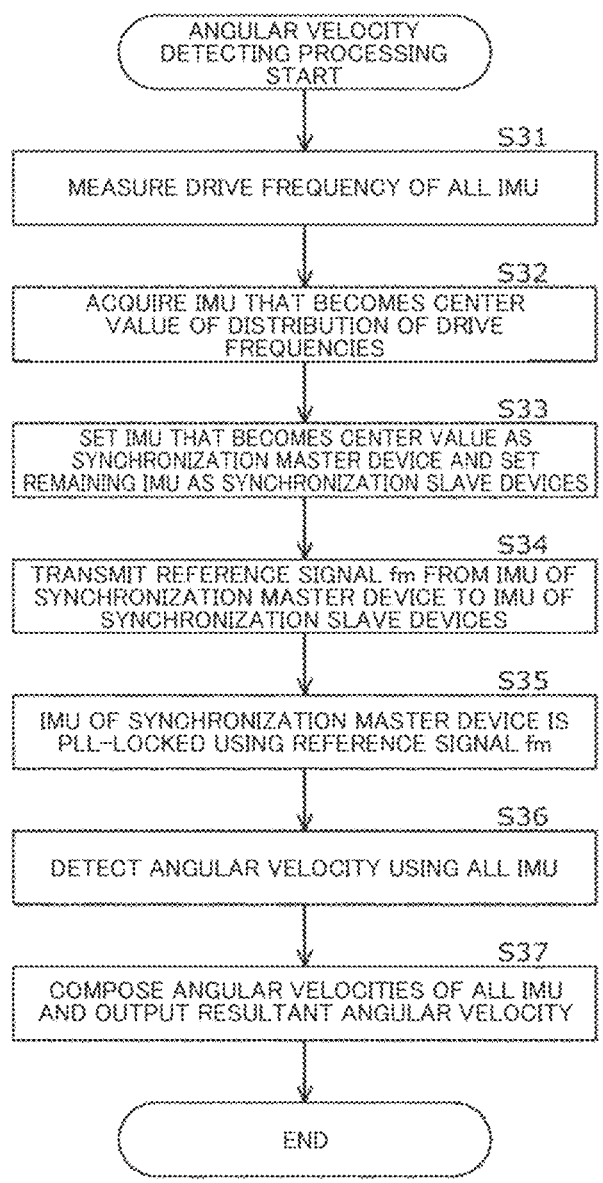
FIG. 14 is a flowchart illustrating angular velocity detecting processing using the multi-IMU illustrated in FIG. 13.

Next, angular velocity detecting processing using the multi-IMU 200 illustrated in FIG. 13 will be described with reference to a flowchart illustrated in FIG. 14.

In Step S31, the switching circuit 301 drives all the oscillation circuits 251-1 to 251-4 of the IMUs 201-1 to 201-4 and detects drive frequencies of oscillation signals.

In Step S32, the switching circuit 301 identifies an IMU 201 of which a drive frequency is close to a median value among drive frequencies of oscillation signals of all the oscillation circuits 251-1 to 251-4 of the IMUs 201-1 to 201-4 that have been detected.

In Step S33, the switching circuit 301 sets an IMU 201 of which a drive frequency is close to the median value as a synchronization master device and sets the other IMUs 201 as synchronization slave devices.

In Step S34, the switching circuit 301 extracts an oscillation signal of the oscillation circuit 251 of the IMU 201 set as the synchronization master device through switching of connection as a reference signal fm and supplies the reference signal to the oscillation circuits 251 of the IMUs 201 set as the synchronization slave devices.

In Step S35, the oscillation circuits 251-1 to 251-4 of all the IMUs 201-1 to 201-4 are PLL-locked in the oscillation signal of the drive frequency of the oscillation circuit 251 of the IMU 201 serving as the synchronization master device on the basis of the reference signal fm.

According to the process described above, all the IMUs 201-1 to 201-4 are driven while synchronized with the reference signal fm, generation of a beat is thus inhibited, and errors are reduced, whereby each can measure an angular velocity with high accuracy.

In Step S36, all the IMUs 201-1 to 201-4 detect angular velocities and output the detected angular velocities to the composing unit 202.

In Step S37, the composing unit 202 composes angular velocities supplied from the IMUs 201-1 to 201-4 and outputs an angular velocity that is a result of the composing as a result of detection using the multi-IMU 200.

According to the process described above, since all the IMUs 201-1 to 201-4 configuring the multi-IMU 200 can be driven in synchronization with each other on the basis of the reference signal fm formed from oscillation signals of the same drive frequency, occurrence of errors caused by beats can be inhibited, and an angular velocity can be detected with high accuracy.

In addition, since the drive frequency of the IMU 201 set as the synchronization master device is set to the median value of all the IMUs 201, a difference from the drive frequency of the reference signal fm supplied to the IMU 201 set as the synchronization slave device becomes a minimum, and thus pulling-in the reference drive frequency can be easily performed, and a state in which PLL locking is not applied and synchronization cannot be formed can be inhibited.

4. Second Modified Example of First Embodiment

An example in which, by measuring drive frequencies of a plurality of the IMUs 201-1 to 201-4 configuring the multi-IMU 200, setting the IMU 201 of a drive frequency close to a median value as a synchronization master device, and setting the other IMUs 201 as synchronization slave devices, accuracy of pulling-in the reference drive frequency that is a drive frequency of the reference signal fm is improved has been described above.

However, the drive frequencies of the plurality of IMUs 201-1 to 201-4 configuring the multi-IMU 200 may be the same, and thus a component that generates a reference signal fm and supplies the reference signal to the IMUs 201-1 to 201-4 may be provided separately from the IMUs 201-1 to 201-4.

Figure 15:
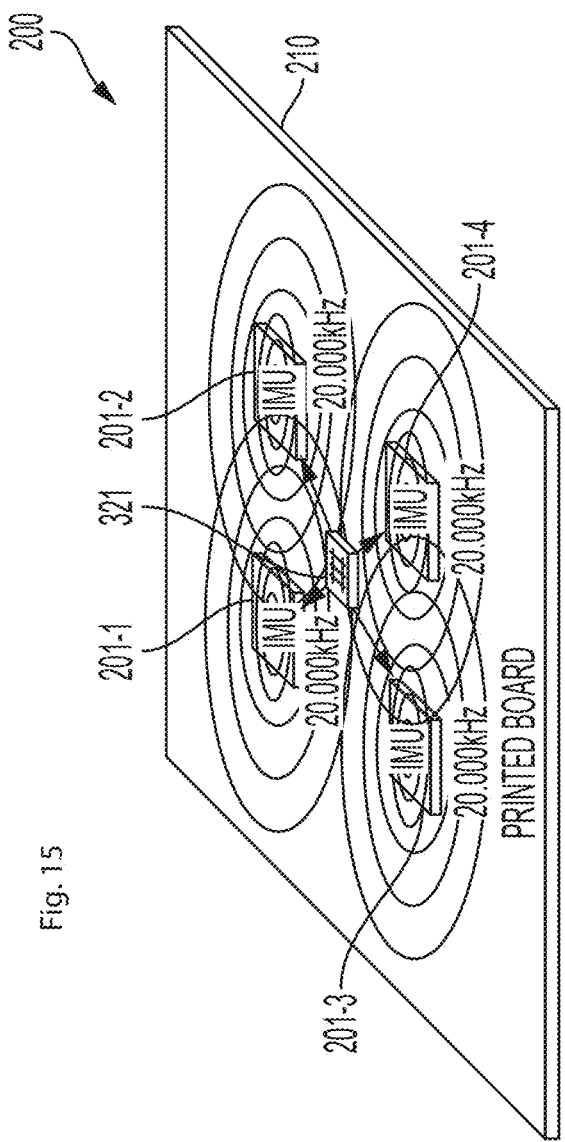
FIG. 15 is a diagram illustrating a multi-IMU according to a second modified example of the first embodiment of the present disclosure.

FIG. 15 illustrates a configuration example of a multi-IMU 200 in which a reference generating unit that generates a reference signal fm is provided in an IMU 200, and the reference signal fm is supplied to IMUs 201-1 to 201-4.

Among components of the multi-IMU 200 illustrated in FIG. 15, the same reference signs are assigned to components having the same functions as those of the multi-IMU 200 illustrated in FIG. 9, and description thereof will be omitted.

In the multi-IMU 200 illustrated in FIG. 15, a component different from the multi-IMU 200 illustrated in FIG. 9 is a reference generating unit 321 that is newly provided.

The reference generating unit 321 generates an oscillation signal of which a drive frequency, which is a designed value in manufacturing the IMU 201, is set as a reference drive frequency as a reference signal fm and supplies the reference signal to the IMUs 201-1 to 201-4.

Figure 16:
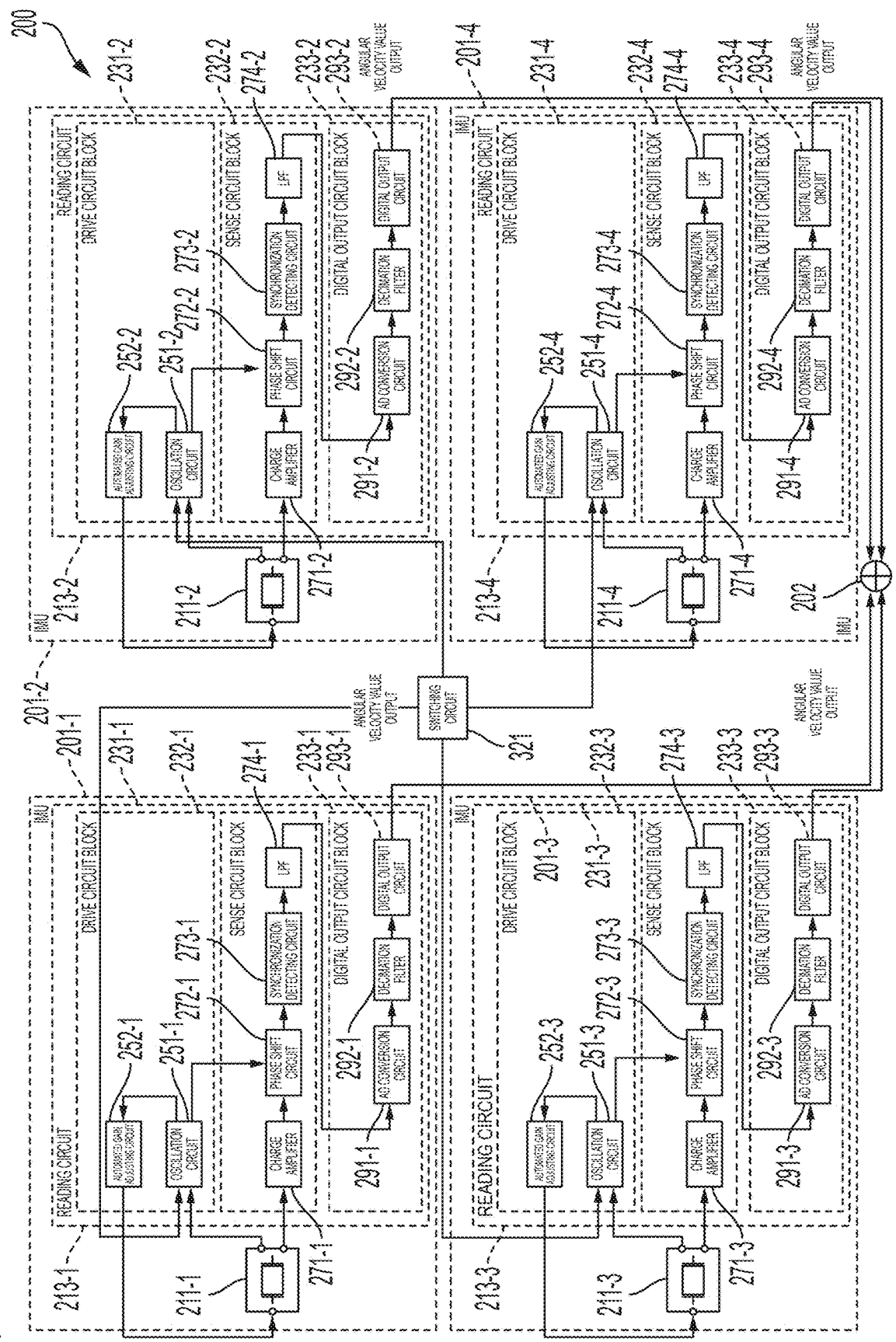
FIG. 16 is a diagram illustrating a configuration example of the multi-IMU illustrated in FIG. 15.

In more detail, as illustrated in FIG. 16, the reference generating unit 321 is connected to oscillation circuits 251-1 to 251-4 of IMUs 201-1 to 201-4 configuring the multi-IMU 200 illustrated in FIG. 15 and supplies the generated reference signal fm to the oscillation circuits 251-1 to 251-4 of the IMUs 201-1 to 201-4.

In accordance with this, the IMUs 201-1 to 201-4 are PLL-locked on the basis of the reference signal fm supplied from the reference generating unit 321, and all the IMUs 201-1 to 201-4 configuring the multi-IMU 200 can detect angular velocities in synchronization with the reference signal fm.

As a result, errors relating to detection of an angular velocity caused by beats generated in accordance with interference between the IMUs 201 can be inhibited, and an angular velocity can be detected with higher accuracy by a plurality of IMUs 201.

In FIG. 15, a configuration in which the reference generating unit 321 substantially functions as a synchronization master device and the IMUs 201-1 to 201-4 function as synchronization slave devices is formed, and supply of the reference signal fm from the reference generating unit 321 to all the IMUs 201-1 to 201-4 is schematically illustrated using arrows.

FIG. 16 illustrates a circuit configuration that is configured by reading circuits 213-1 to 213-4 of the IMUs 201-1 to 201-4 configuring the multi-IMU 200 illustrated in FIG. 15 and the reference generating unit 321.

The configuration of each of the IMUs 201-1 to 201-4 is basically similar to the configuration illustrated in FIG. 10, and IMUs 201-1 to 201-4 are identified using signs following "-".

<Angular Velocity Detecting Processing Using Multi-IMU Illustrated in FIG. 16>

Figure 17:
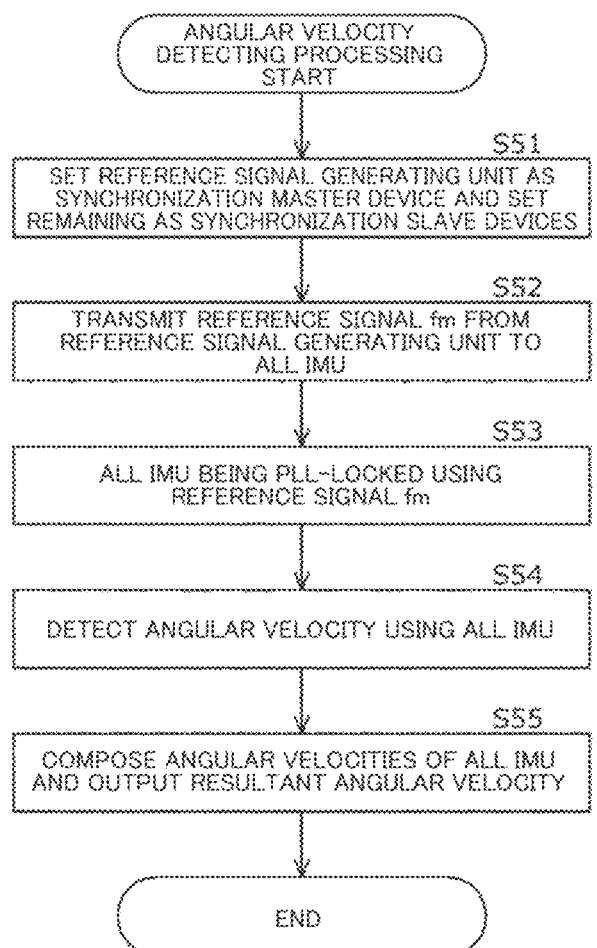
FIG. 17 is a flowchart illustrating angular velocity detecting processing using the multi-IMU illustrated in FIG. 16.

Next, angular velocity detecting processing using the multi-IMU 200 illustrated in FIG. 16 will be described with reference to a flowchart illustrated in FIG. 17.

In Step S51, the reference generating unit 321 sets itself as a synchronization master device and sets all the IMUs 201-1 to 201-4 as synchronization slave devices.

In Step S52, the reference generating unit 321 supplies a reference signal fm to the oscillation circuits 251-1 to 251-4 of the IMUs 201-1 to 201-4 set as the synchronization slave devices.

In Step S53, the oscillation circuits 251-1 to 251-4 of all the IMUs 201-1 to 201-4 have drive frequencies of the oscillation circuits 251-1 to 251-4 to be PLL-locked in the drive frequency of the reference signal fm on the basis of the reference signal fm.

In Step S54, all the IMUs 201-1 to 201-4 detect angular velocities and outputs the detected angular velocities to the composing unit 202.

In Step S55, the composing unit 202 composes the angular velocities supplied from the IMUs 201-1 to 201-4 and outputs an angular velocity that is a composing result as a detection result acquired by the multi-IMU 200.

In accordance with the process described above, all the IMUs 201-1 to 201-4 configuring the multi-IMU 200 can be driven in synchronization with each other on the basis of the reference signal fm formed from the oscillation signal of the same drive frequency, and thus occurrence of error due to beats can be inhibited, and an angular velocity can be detected with high accuracy.

5. Third Modified Example of First Embodiment

As above, although an example in which the IMUs 201-1 to 201-4 configuring the multi-IMU 200 are configured on the printed board 210 has been described, it may be configured such that the vibrators 211-1 to 211-4 of the IMUs 201-1 to 201-4 are formed on a base 212 formed from common silicon, one IMU 201 thereof is set as a synchronization master device, and the other IMUs 204 are set as synchronization slave devices.

Figure 18:
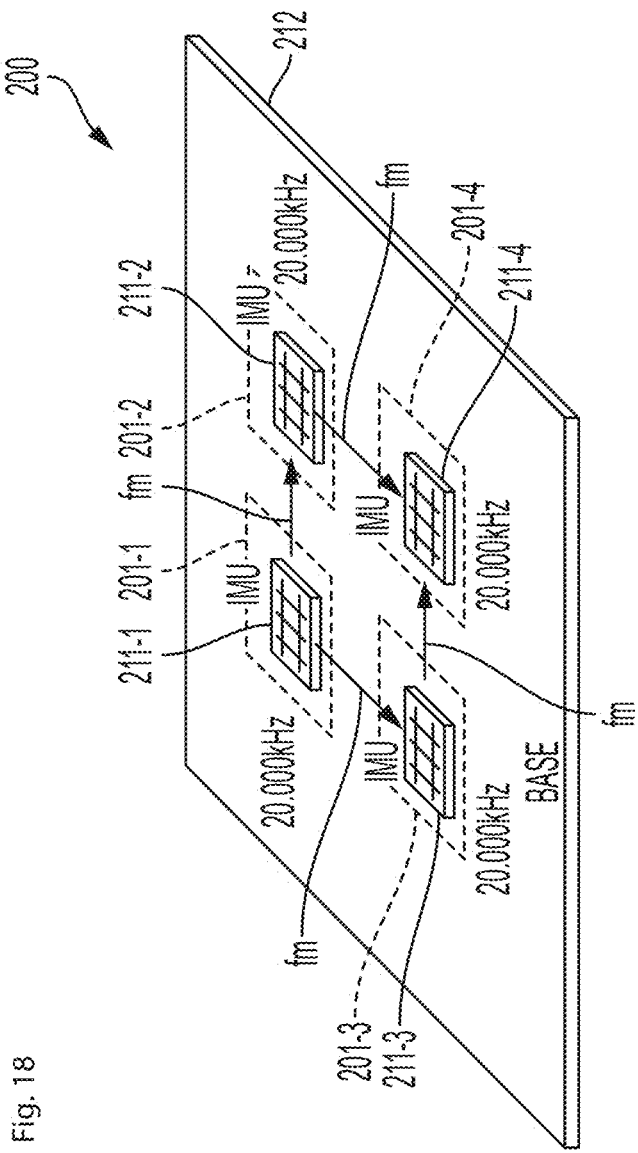
FIG. 18 is a diagram illustrating a multi-IMU according to a third modified example of the first embodiment of the present disclosure.

FIG. 18 illustrates an example in which the vibrators 211-1 to 211-4 of the IMUs 201-1 to 201-4 are formed on the base 212 formed from common silicon, the IMU 201-1 is set as a synchronization master device, and the IMUs 201-2 to 201-4 are set as synchronization slave devices.

Figure 19:
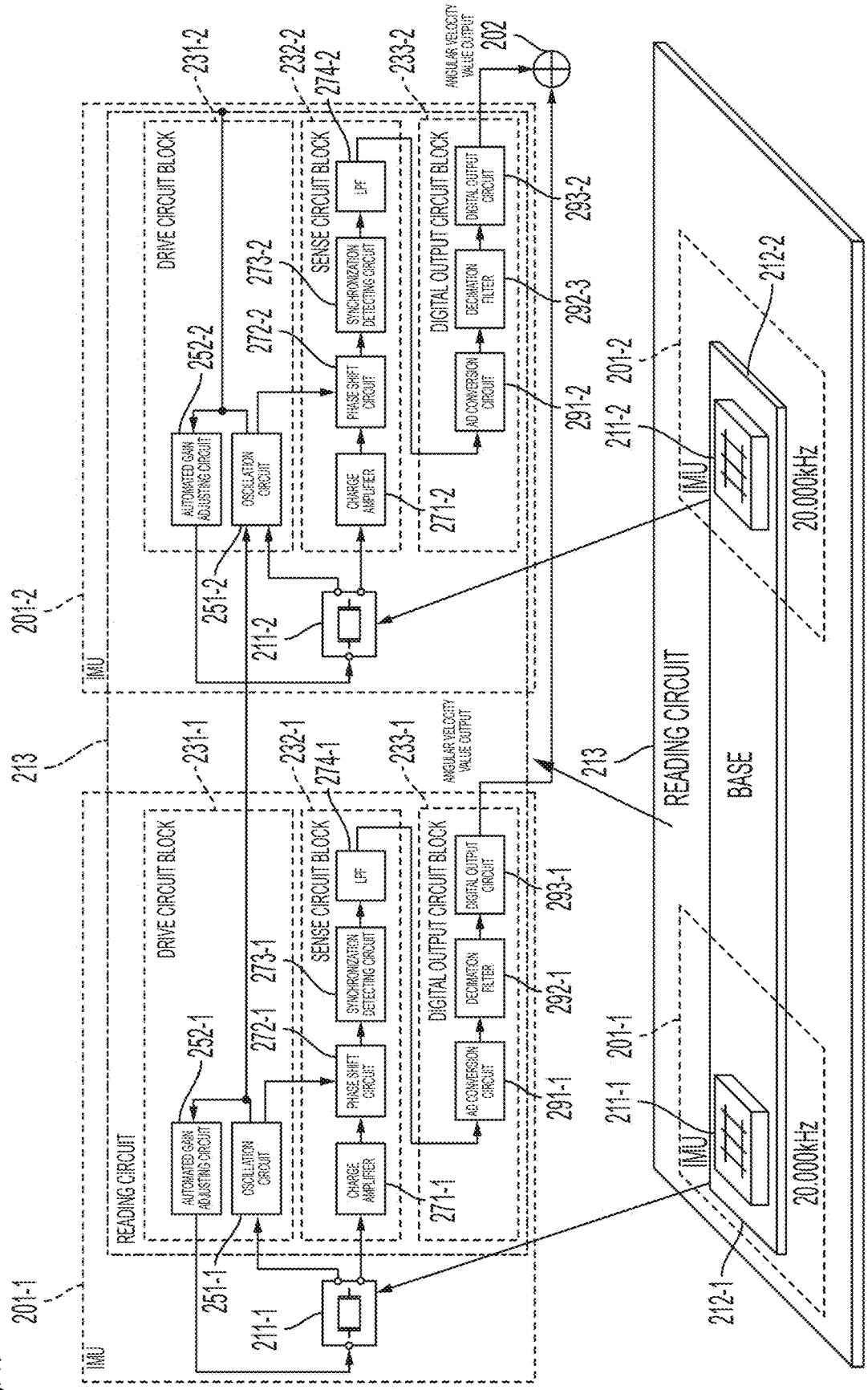
FIG. 19 is a diagram illustrating a configuration example of the multi-IMU illustrated in FIG. 18.

In more detail, as illustrated FIG. 19, an oscillation signal of a drive frequency generated from the oscillation circuit 251-1 of the IMU 201-1 set as a synchronization master device is supplied to the oscillation circuit 251-2 of the IMU 201-2 set as a synchronization slave device as a reference signal fm.

In accordance with this, the oscillation circuit 251-2 of the IMU 201-2 set as the synchronization slave device is pulled in the drive frequency of the reference signal fm and thus is driven in synchronization with the drive frequency of the oscillation circuit 251-1 of the IMU 201-1 set as the synchronization master device.

By supplying the reference signal fm also to the IMUs 201-3 and 201-4 set as the synchronization slave devices, the oscillation circuits 251-3 and 251-4 of the IMUs 201-3 and 201-4 are also driven in synchronization with the drive frequency of the oscillation circuit 251-1 of the IMU 201-1 set as the synchronization master device.

As a result, all the IMUs 201-1 to 201-4 are driven in synchronization with the reference signal fm, and thus occurrence of error due to occurrence of beats is inhibited, and angular velocity with high accuracy can be detected, and the vibrators 211-1 to 211-4 are formed on the same base 212, whereby a decrease in the size of the device configuration and a reduction in the cost can be achieved.

Angular velocity detecting processing using the multi-IMU 200 illustrated in FIG. 18 is similar to the processing described with reference to a flowchart illustrated in FIG. 11, and thus description thereof will be omitted.

6. Fourth Modified Example of First Embodiment

As above, although the multi-IMU 200 in which the vibrators 211-1 to 211-4 of the IMUs 201-1 to 201-4 are formed on the base 212 formed from common silicon, one thereof is set as a synchronization master device, and the others are set as synchronization slave devices have been described above, the switching circuit 301 described above may be provided on the base.

In other words, in the multi-IMU 200 illustrated in FIG. 12, although an example in which the switching circuit 301 is disposed on the printed board 210 on which the IMUs 201-1 to 201-4 are formed has been described, a switching circuit that is a component having the same function may be formed on the base 212 on which the vibrators 211-1 to 211-4 are formed.

Figure 20:
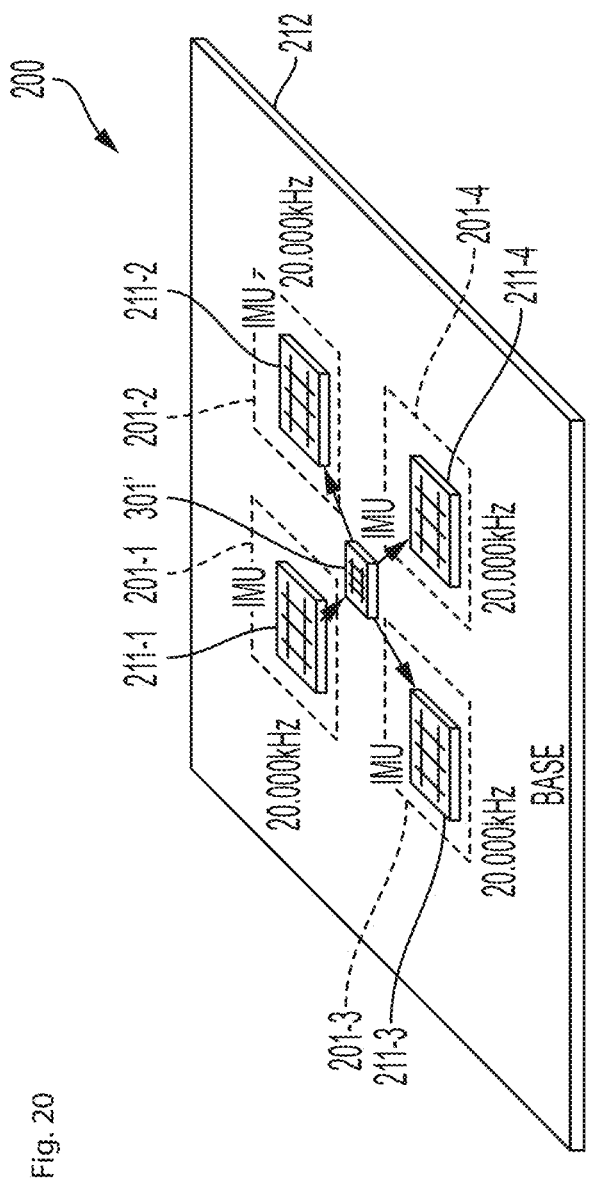
FIG. 20 is a diagram illustrating a multi-IMU according to a fourth modified example of the first embodiment of the present disclosure.

FIG. 20 is a configuration example of a multi-IMU 200 in which a switching circuit 301' that is a component having the same function as the switching circuit 301 is formed on a base 212 on which vibrators 211-1 to 211-4 are formed.

Also in such a configuration, similar to the multi-IMU 200 illustrated in FIG. 12, an angular velocity can be detected with high accuracy, and, by forming the vibrators 211-1 to 211-4 and the switching circuit 301' on the same base 212, a decrease in size of the device and a reduction of the cost can be achieved as well.

7. Fifth Modified Example of First Embodiment

An above, an example in which the vibrators 211-1 to 211-4 of the IMUs 201-1 to 201-4 are formed on the base 212 formed from common silicon, and the switching circuit 301' is further disposed on the base 212 has been described.

However, like the multi-IMU 200 illustrated in FIG. 15, a reference generating unit having a function similar to the reference generating unit 321 may be formed in place of the switching circuit 301.

In other words, in the multi-IMU 200 illustrated in FIG. 20, although an example in which the switching circuit 301' is disposed on the printed board 210 on which the IMUs 201-1 to 201-4 are formed has been described, in place of the switching circuit 301', a reference generating unit having the same function as the reference generating unit 321 illustrated in FIG. 15 may be formed on a base 212 on which vibrators 211-1 to 211-4 are formed.

Figure 21:
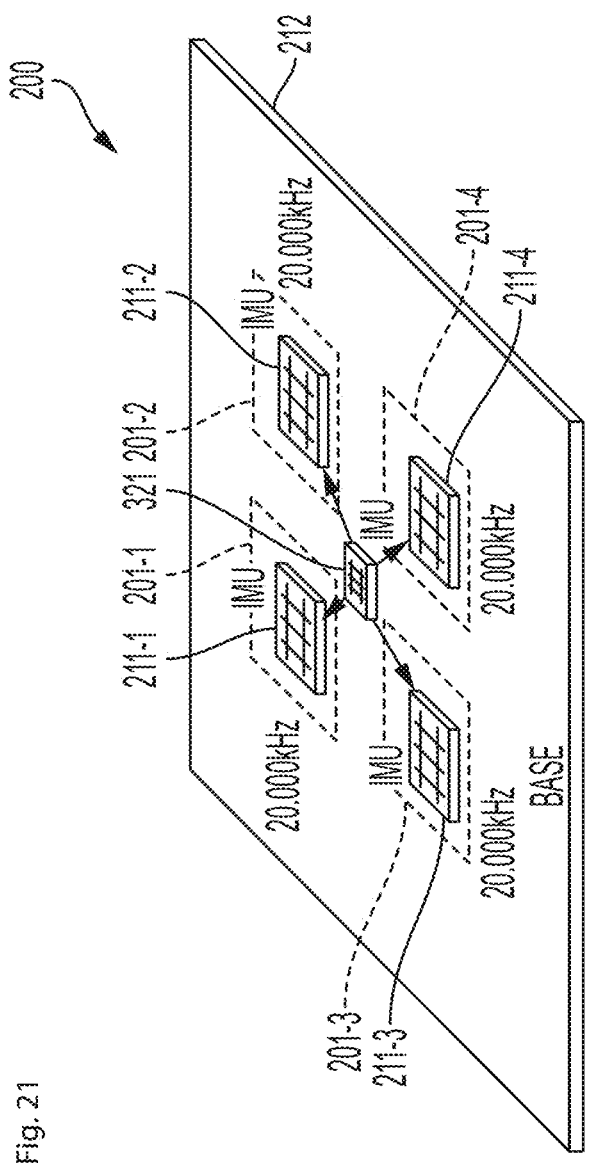
FIG. 21 is a diagram illustrating a multi-IMU according to a fifth modified example of the first embodiment of the present disclosure.

FIG. 21 illustrates a configuration example of a multi-IMU 200 in which a reference generating unit 321' that is a component having the same function as the reference generating unit 321 is formed on a base 212 on which vibrators 211-1 to 211-4 are formed.

Also in such a configuration, similar to the multi-IMU 200 illustrated in FIG. 15, an angular velocity can be detected with high accuracy, and by forming the vibrators 211-1 to 211-4 and the reference generating unit 321 on the same base 212, a decrease in size of the device configuration and a reduction of the cost can be achieved.

8. Sixth Modified Example of First Embodiment

An above, an example in which, by synchronizing the drive frequencies of the oscillation circuits 251-1 to 251-4 of the IMUs 201-1 to 201-4 configuring the multi-IMU 200, occurrence of beats is inhibited, and thus the accuracy of a detected angular velocity is improved has been described.

However, even when the drive frequencies can be synchronized with each other, there is noise that cannot be eliminated due to out of synchronization or the like according to an external disturbance from a certain object.

Thus, for a noise that cannot be eliminated due to a synchronization deviation or the like even when the drive frequencies of the oscillation circuits 251-1 to 251-4 of the IMUs 201-1 to 201-4 are synchronized with each other, the noise may be eliminated by forming the vibrators 211-1 to 211-4 of the IMUs 201-1 to 201-4 on physically-independent bases and interposing acoustic insulators in common contact portions in which the vibrators are respectively disposed.

Figure 22:
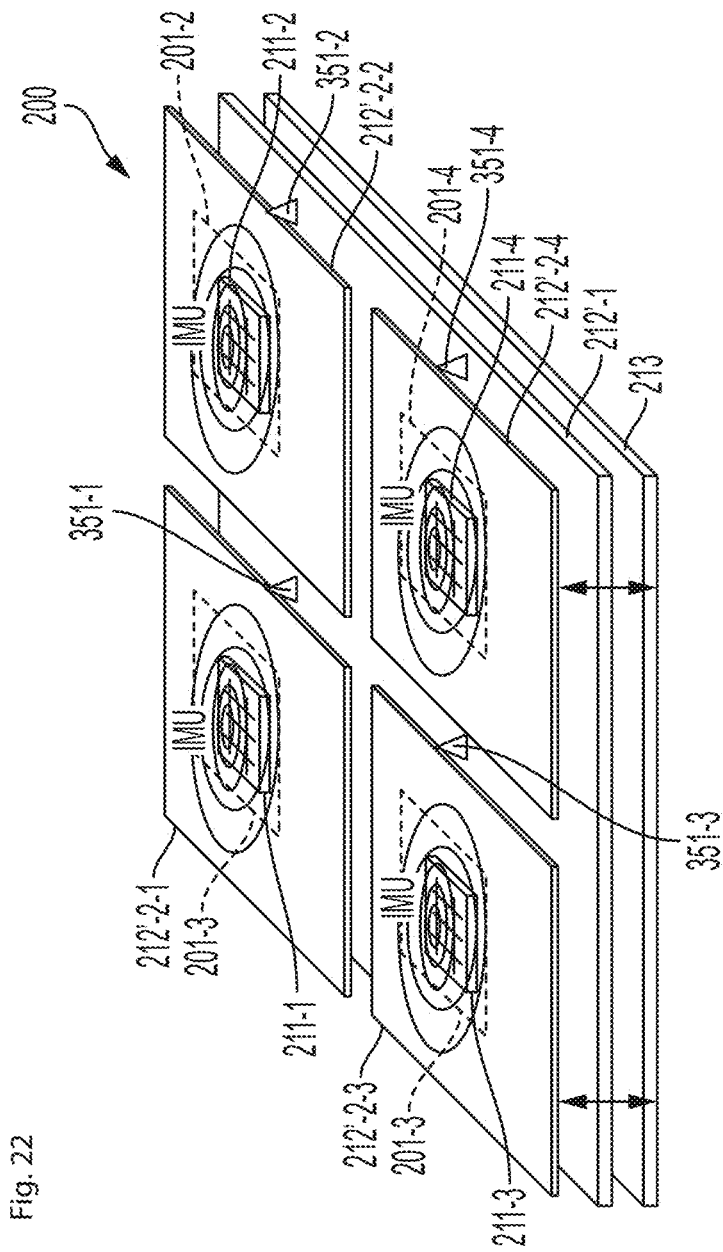
FIG. 22 is a diagram illustrating a multi-IMU according to a sixth modified example of the first embodiment of the present disclosure.

FIG. 22 illustrates a configuration example of a multi-IMU 200 in which the vibrators 211-1 to 211-4 of the IMUs 201-1 to 201-4 are respectively formed independent bases, acoustic insulators are interposed in contact positions that are in contact with common portions in which the bases are disposed, and thus an acoustic interference level is mechanically reduced.

In the multi-IMU 200 illustrated in FIG. 22, the same reference numerals are assigned to components having the same function as that of the multi-IMU 200 illustrated in FIG. 18, and description thereof will be appropriately omitted.

In other words, in the multi-IMU 200 illustrated in FIG. 22, there are difference points from the multi-IMU 200 illustrated in FIG. 18 in that the vibrators 211-1 to 211-4 are respectively disposed on bases 212'-1 and bases 212'-2-1 to 212'-2-4 in place of the base 212, and acoustic insulators 351-1 to 351-4 are disposed.

In the multi-IMU 200 illustrated in FIG. 22, the vibrators 211-1 to 211-4 are respectively formed on bases 212'-2-1 to 212'-2-4 formed from silicon that are physically independent.

In addition, the bases 212'-2-1 to 212'-2-4 that are physically independent from each other are formed on the common base 212-1 with the acoustic insulators 351-1 to 351-4 interposed therebetween.

The acoustic insulators 351-1 to 351-4 are components absorbing vibrations, are formed on the common base 212-2 for the vibrators 211-1 to 211-4, and respectively support the bases 212'-2-1 to 212'-2-4.

In accordance with such a configuration, the acoustic insulators 351-1 to 351-4 absorb vibrations generated in the vibrators 211-1 to 211-4 and the base 212, and thus vibrations of each of the vibrators 211-1 to 211-4 are isolated, whereby mutual transfer of vibrations is inhibited.

In accordance with this, noise generated due to external disturbances and the like even when the drive frequencies of the IMUs 201-1 to 201-4 are synchronized with each other can be reduced, and, as a result, an angular velocity can be detected with higher accuracy.

9. Seventh Modified Example of First Embodiment

As above, an example in which, by forming the vibrators 211-1 to 211-4 of the IMUs 201-1 to 201-4 on independent bases and interposing the acoustic insulators at contact positions that are in contact a common portion in which the bases are disposed, noise that cannot be eliminated even when the drive frequencies of the IMUs 201-1 to 201-4 are synchronized with each other is eliminated has been described.

However, noise that cannot be eliminated even when the drive frequencies of the IMUs 201-1 to 201-4 are synchronized with each other may be eliminated by directly detecting a beat and generating a reverse phase signal for the detected beat.

Figure 23:
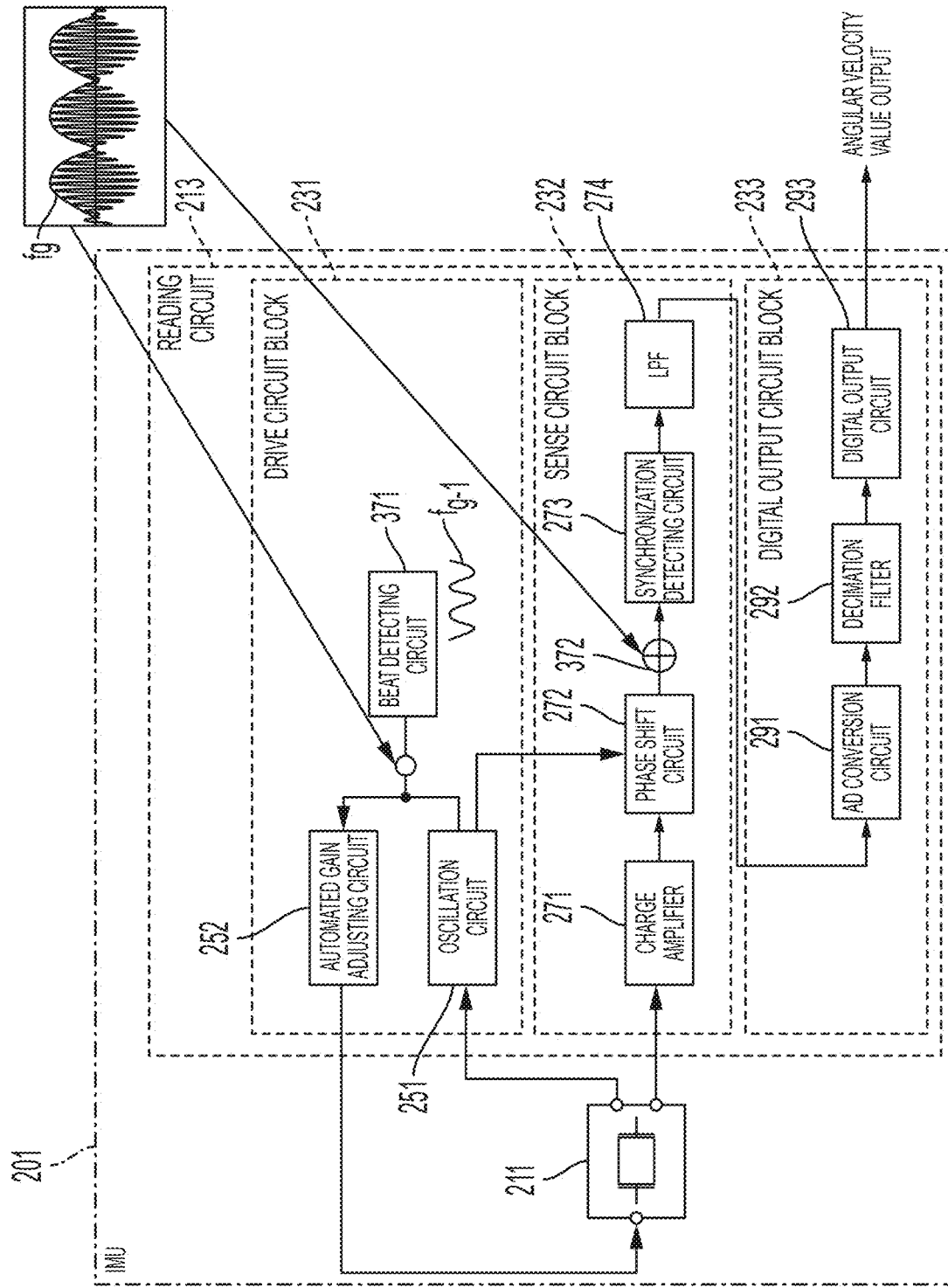
FIG. 23 is a diagram illustrating a configuration example of a multi-IMU according to a seventh modified example of the first embodiment of the present disclosure.

FIG. 23 is a configuration example of an IMU 201 in which a beat is eliminated by detecting the beat from an oscillation signal output from the oscillation circuit 251 and generating a reverse phase signal of the detected beat.

In other words, in the IMU 201 illustrated in FIG. 23, a configuration different from the IMU 201 illustrated in FIG. 10 is that a beat detecting circuit 371 and a composing unit 372 are disposed.

The beat detecting circuit 371 detects a beat signal fg from an oscillation signal output from the oscillation circuit 251, generates a reverse phase signal fg-1 of the beat signal, and supplies the generated reverse phase signal to the composing unit 372.

The composing unit 372 composes the reverse phase signal fg-1 of the beat signal with a signal output from the phase shift circuit 272 to eliminate a beat component from the signal output from the phase shift circuit 272, and outputs a resultant signal to the synchronization detecting circuit 273.

In accordance with this, noise generated even when the drive frequencies of the IMUs 201-1 to 201-4 are synchronized with each other can be reduced, and, as a result, an angular velocity can be detected with higher accuracy.

10. Second Embodiment

As above, an example in which generation of a beat is inhibited by synchronizing the drive frequencies of the IMUs 201-1 to 201-4 with each other, and an angular velocity is enabled to be detected with high accuracy has been described.

However, in a case in which the drive frequency of the IMU 201 is different much from the drive frequency of the synchronization slave device, there is a possibility that pulling-in is not performed in the oscillation circuit 251, and PLL locking cannot be applied.

Thus, detection accuracy of an angular velocity may be improved by measuring drive frequencies of a plurality of IMUs 201, forming a cluster of IMUs 201 of which drive frequencies can be synchronized with each other as described above, detecting an angular velocity with the drive frequencies to be synchronized in units of clusters, acquiring angular velocities acquired in units of clusters in a time divisional manner, and composing the angular velocities.

Figure 24:
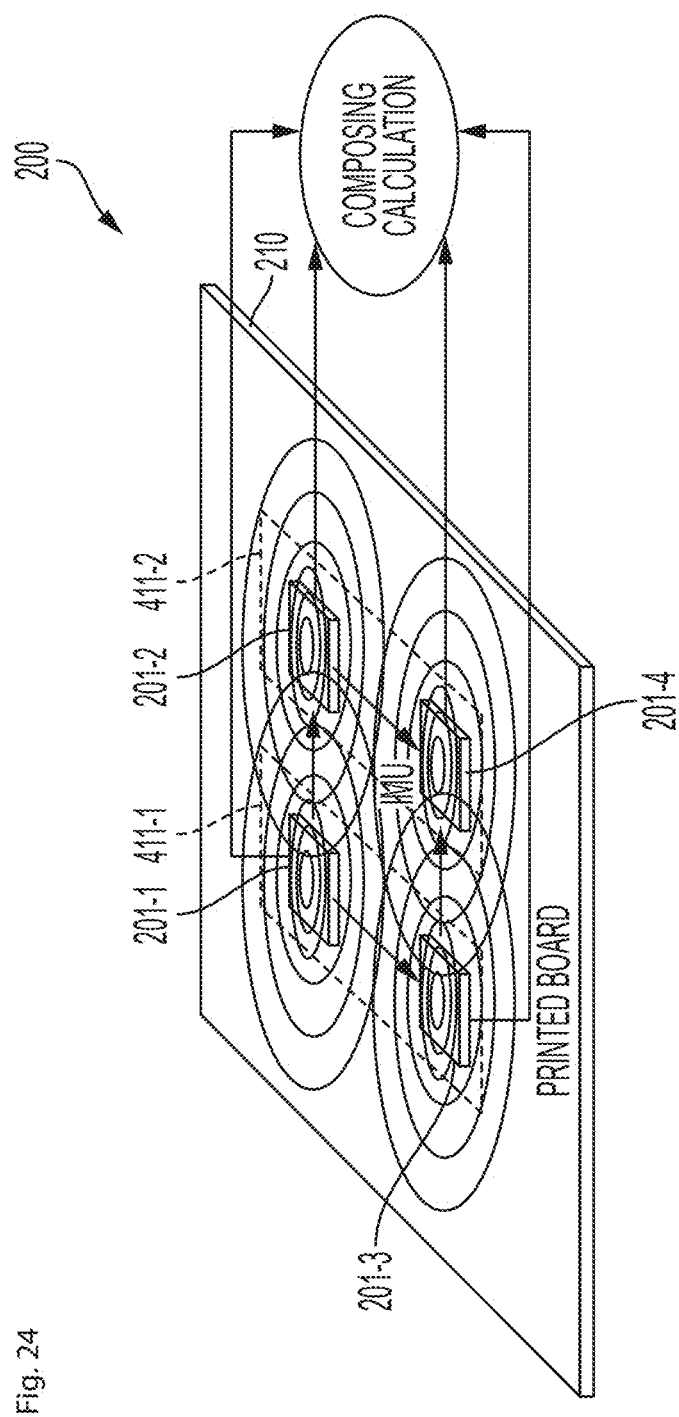
FIG. 24 is a diagram illustrating a multi-IMU according to a second embodiment of the present disclosure.

In other words, as illustrated in FIG. 24, a case in which a drive frequency of oscillation signals driving IMUs 201-1 and 201-3 are 20.000 kHz, and a drive frequency of oscillation signals driving IMUs 201-2 and 201-4 is 20.100 kHz will be considered.

In such a case, on the basis of the drive frequencies of oscillation signals driving the IMUs 201-1 to 201-4, the drive frequencies of the IMUs 201-1 and 201-3 are the same, and thus, as illustrated in FIG. 24, the IMUs 201-1 and 201-3 are formed as a cluster 411-1, and the drive frequencies of the IMUs 201-2 and 201-4 are the same, and thus clustering is performed such that the IMUs 201-2 and 201-4 are formed as another cluster 411-2.

In the multi-IMU 200 illustrated in FIG. 24, by setting a synchronization master device and a synchronization slave device in units of clusters 411-1 and 411-2, the drive frequencies of the IMUs 201 are synchronized in units of clusters, and an angular velocity is detected.

Then, angular velocities detected in units of clusters are acquired in a time divisional manner and are calculated to be composed, whereby an angular velocity can be detected with higher accuracy.

<Clustering of IMU>

Next, clustering of a plurality of IMUs 201 disposed in a multi-IMU 200 will be described with reference to FIG. 25.

The clustering of a plurality of IMUs 201 disposed in the multi-IMU 200 is a part of a manufacturing process of the multi-IMU 200.

Figure 25:
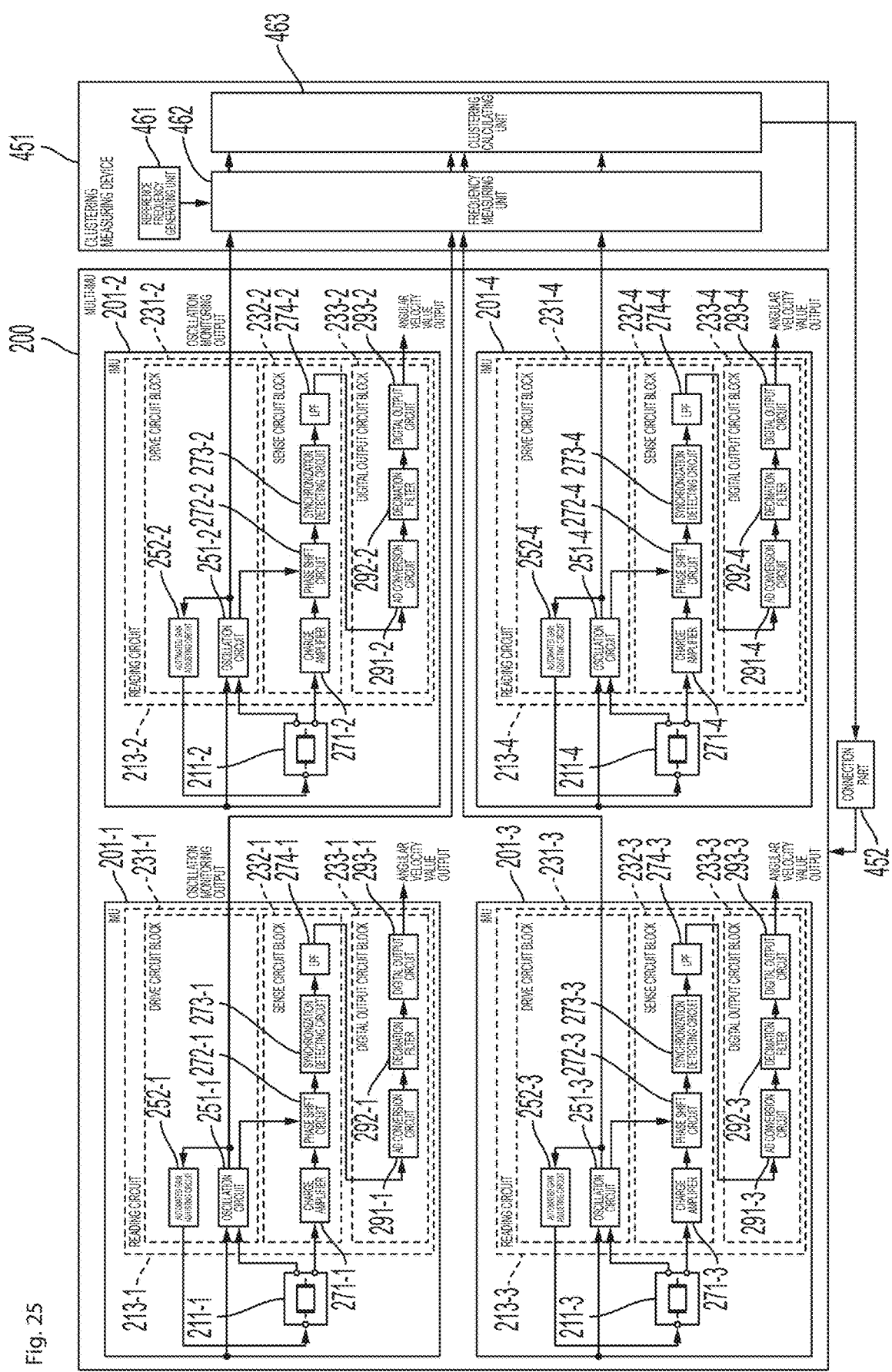
FIG. 25 is a diagram illustrating a configuration example of a clustering measurement device that clusters IMUs of the multi-IMU illustrated in FIG. 24.

More specifically, clustering is performed by a clustering measuring device 451 and a connection part 452 illustrated in FIG. 25.

The clustering measuring device 451 is used in the manufacturing process of the multi-IMU 200 and is configured separately from the multi-IMU 200. The clustering measuring device 451 measures drive frequencies output from oscillation circuits 251 of a plurality of IMUs 201 disposed in the multi-IMU 200, IMUs 201 of which the measured drive frequencies are similar and can be driven with the same drive frequency are configured as the same cluster, and information indicating which cluster each IMU 201 belongs to is output to the connection part 452.

In more detail, the clustering measuring device 451 includes a reference frequency generating unit 461, a frequency measuring unit 462, and a clustering calculating unit 463.

The reference frequency generating unit 461 generates a frequency that becomes a reference in measurement of drive frequencies of a plurality of IMUs 201 and outputs the reference frequency to the frequency measuring unit 462.

The frequency measuring unit 462 measures a drive frequency of an oscillation signal output from the oscillation circuit 251 of each IMU 201 (monitors an oscillation monitoring output) on the basis of the reference frequency supplied from the reference frequency generating unit 461 and outputs the measured drive frequency to the clustering calculating unit 463.

The clustering calculating unit 463 performs clustering of IMUs 201 of which drive frequencies are similar into the same cluster on the basis of the drive frequency of the oscillation signal output from the oscillation circuit 251 of each IMU 201 and outputs information indicating to which cluster each IMU 201 belongs to the connection part 452.

The connection part 452 sets one of IMUs 201 belonging to the same cluster as a synchronization master device on the basis of the information indicating to which cluster each IMU 201 belongs supplied from the clustering measuring device 451 and sets the other IMUs 201 as synchronization slave devices, and connection is formed such that an output of the automated gain adjusting circuit 252 of the IMU 201 set as the synchronization master device is connected to the oscillation circuit 251 of the IMU 201 set as the synchronization slave devices.

<Composing of Angular Velocity Detected for Each Cluster>

Next, composing of angular velocities detected for clusters of the IMUs 201 that are clustered will be described with reference to FIG. 26.

Composing of angular velocities detected for the clusters of IMUs 201 that are clustered is realized by composing angular velocities detected in a time divisional manner in units of clusters using a composing calculating unit 471.

Although the composing calculating unit 471 is configured separately from the multi-IMU 200, it may be configured to be integrated with the multi-IMU 200.

The composing calculating unit 471 includes a re-sampler 481, an interference eliminating unit 482, and a composing unit 483.

The re-sampler 481 aligns sampling frequencies of data different for each cluster, which have been clustered by the clustering measuring device 451, for example, using an arbitrary re-sampling technique such as zero-th order hold, first-order interpolation, or the like and outputs the aligned sampling frequencies to the interference eliminating unit 482.

In other words, since the clusters of IMUs 201 are set on the basis of the drive frequencies, angular velocities detected in units of clusters have different sampling frequencies. Thus, the re-sampler 481 aligns sampling frequencies of angular velocities supplied in units of clusters.

The interference eliminating unit 482 eliminates interference components between clusters, for example, using filter processing and outputs a result to the composing unit 483. In addition, in a case in which drive frequencies of clusters are away from each other, no interference occurs, and thus the processing of the interference eliminating unit 482 may be omitted.

The composing unit 483 composes angular velocities that are detection values detected by the IMUs 201 and outputs the angular velocities as one detection value. The composing unit 483 composes detection values into one detection value as a simple average value, a weighted average value, or a dynamic weighted average value, which is in accordance with a noise status, of angular velocities that are detection values detected by the IMUs 201.

In addition, a composing unit in units of clusters may be disposed in a previous stage of the re-sampler 481, and the processing of the re-sampler 481 and the interference eliminating unit 482 may be performed with an angular velocity set as one detection value in units of clusters.

Example of Connection

Next, an example of connection of IMUs 201 in units of clusters that is performed by the connection part 452 will be described. For example, as illustrated in FIG. 24, a case in which IMUs 201-1 and 201-3 are set as a cluster 411-1, and IMUs 201-2 and 201-4 are set as a cluster 411-2 will be considered.

In such a case, the connection part 452 sets one of IMUs 201 inside each cluster as synchronization master device and sets the other IMUs 201 as synchronization slave devices. As a method for selecting a certain IMU 201 as a synchronization master device, an IMU of which synchronization frequency is s median value inside the cluster may be selected.

In the example illustrated in FIG. 25, in the cluster 411-1, the IMU 201-1 is set as a synchronization master device, and the IMU 201-3 is set as a synchronization slave device.

Figure 26:
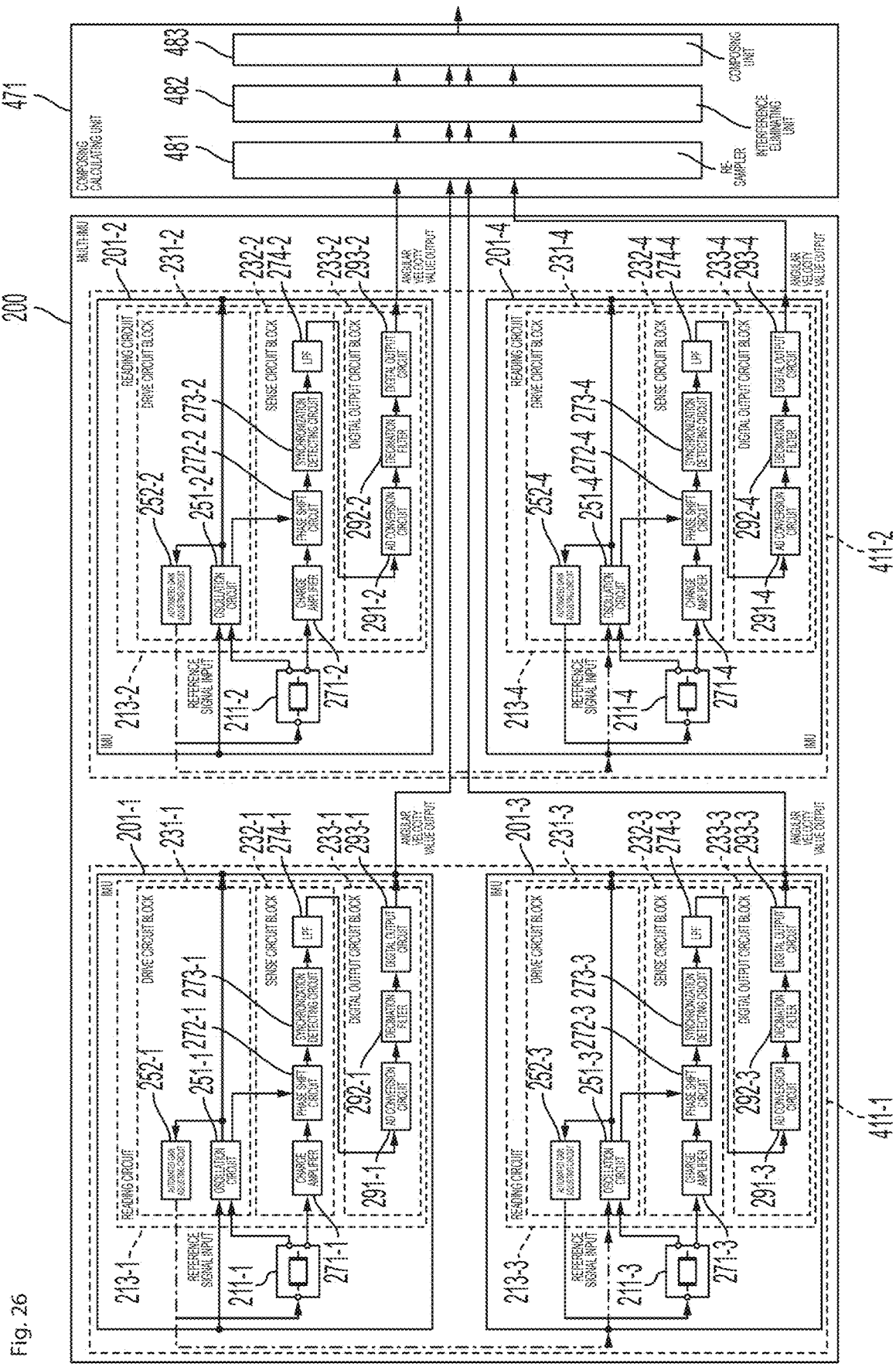
FIG. 26 is a diagram illustrating a connection example of IMUs for each cluster of the multi-IMU illustrated in FIG. 25 and a configuration example of a composing calculating unit that composes angular velocities of clusters.

In accordance with this, as denoted by a dash-dot line in FIG. 26, the connection part 452 connects an output of the automated gain adjusting circuit 252-1 of the IMU 201-1 and the oscillation circuit 251-3 of the IMU 201-3 are connected.

In addition, in FIG. 26, in the cluster 411-2, the IMU 201-2 is set as a synchronization master device, and the IMU 201-4 is set as a synchronization slave device.

In accordance with this, as denoted by a dash-dot line in FIG. 26, the connection part 452 connects an output of the automated gain adjusting circuit 252-2 of the IMU 201-2 and the oscillation circuit 251-4 of the IMU 201-4 are connected.

In addition, as illustrated in FIG. 24, clustering may be performed to form clusters other than the cluster 411-1 formed from the IMUs 201-1 and 201-3 and the cluster 411-2 formed from the IMUs 201-2 and 201-4.

For example, clustering may be performed to form a cluster 411-11 formed from the IMU 201-2 and a cluster 411-12 formed from IMUs 201-1, 201-3, and 201-4.

Figure 27:
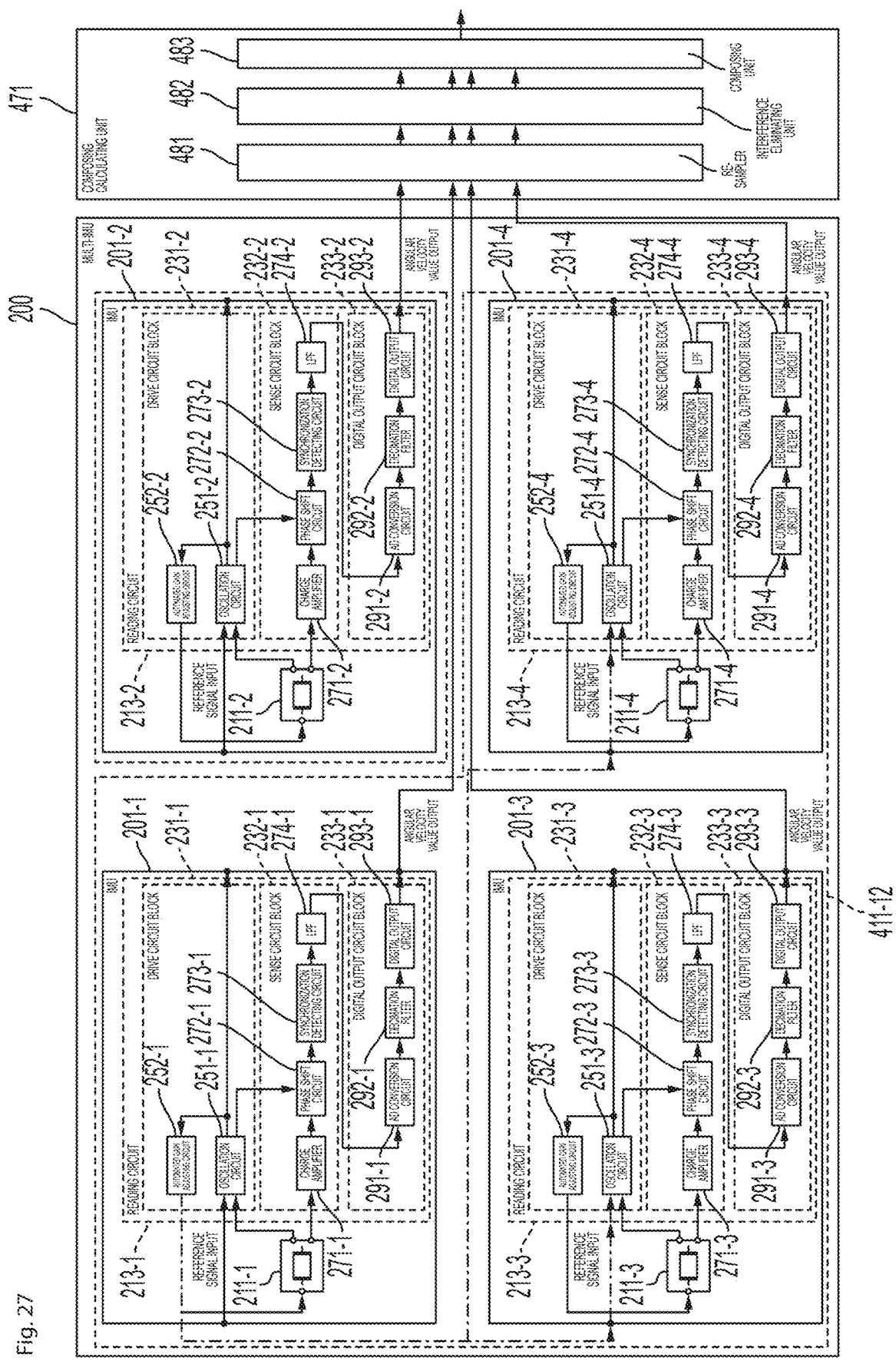
FIG. 27 is a diagram illustrating an example of another connection for each cluster of the multi-IMU illustrated in FIG. 25.

In a case in which clustering is performed as such, the IMUs 201-1 to 201-4 are connected as illustrated in FIG. 27 by the connection part 452.

In other words, in FIG. 27, in the cluster 411-11, only the IMU 201-2 is configured as a single body, and thus there is no new connection.

In addition, in the cluster 411-12, when the IMU 201-1 is set as a synchronization master device, and the IMUs 201-3 and 201-4 are set as synchronization slave devices, as denoted by a dash-dot line in FIG. 27, the output of the automated gain adjusting circuit 252-1 of the IMU 201-1 and the oscillation circuits 251-3 and 251-4 of the IMUs 201-3 and 201-4 are connected.

Although an example in which there are two clusters has been described as above, the number of clusters may be two or more. In addition, the number of IMUs 201 belonging to each cluster may be any number.

<Clustering Processing>

Next, clustering processing performed by the clustering measuring device 451 will be described with reference to a flowchart illustrated in FIG. 28.

In Step S101, the frequency measuring unit 462 measures drive frequencies of all the IMUs 201 on the basis of the reference frequency supplied from the reference frequency generating unit 461 and outputs measurement results to the clustering calculating unit 463.

In Step S102, the clustering calculating unit 463 selects an IMU 201 of which the drive frequency is the lowest.

In Step S103, the clustering calculating unit 463 sets IMUs within a threshold frequency that is higher than the drive frequency of the selected IMU 201 by a predetermined width B to a same cluster.

In Step S104, it is determined whether or not there is an unprocessed IMU 201 that has not been clustered.

In Step S104, in a case in which there is an unprocessed IMU 201 that has not been clustered, the process proceeds to Step S105.

In Step S105, the clustering calculating unit 463 selects an unprocessed IMU 201 of a frequency higher than the threshold frequency, and the process returns to Step S102.

In other words, until all the IMUs 201 are clustered, a process in which IMUs 201 of up to a threshold frequency that is higher than the lowest drive frequency by a predetermined width B among IMUs 201 that have not been clustered are clustered into the same cluster is repeated. In other words, IMUs 201 of drive frequencies within a band width set to have a predetermined width B from the lowest drive frequency are clustered into the same class.

Then, in Step S105, in a case in which it is determined that there is no unprocessed IMU 201, the process proceeds to Step S106.

In Step S106, the clustering calculating unit 463 outputs information indicating which cluster a certain IMU 201 belongs to the connection part 452. In accordance with this, the connection part 452 connects IMUs 201 in units of clusters.

In accordance with the process described above, a plurality of IMUs 201 are clustered on the basis of drive frequencies, and IMUs 201 are connected for each cluster.

Although an example in which a process of setting IMUs 201 up to the threshold frequency that is higher than the lowest drive frequency by the predetermined width B to the same cluster among unprocessed IMUs 201 is repeated has been described above, a process of setting IMUs 201 up to a threshold frequency that is lower than the highest drive frequency by the predetermined width B among IMUs 201 that have not been processed to the same cluster may be configured to be repeated.

In addition, although an example in which IMUs 201 are connected by the connection part 452 for each cluster has been described above, for example, by using the switching circuit 301 illustrated in FIG. 12, wiring may be switched to be in a state in which connection is made for each clustered cluster.

<Angular Velocity Detecting Processing Using Multi-IMU and Composing Calculating Unit Illustrated in FIG. 26 or 27>

Figure 29:
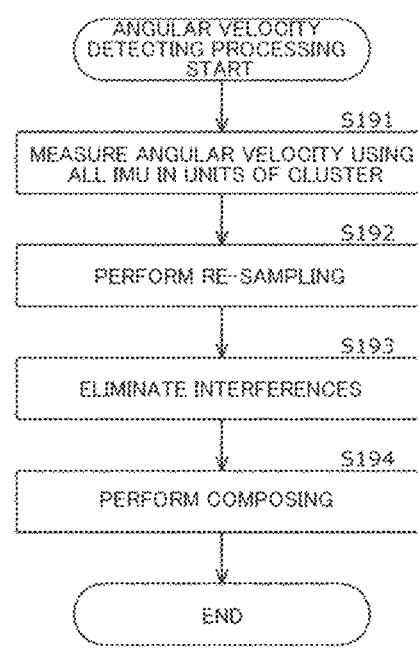
FIG. 29 is a flowchart illustrating angular velocity detecting processing using the multi-IMU illustrated in FIG. 26.

Next, angular velocity detecting processing using the multi-IMU 200 and the composing calculating unit 471 illustrated in FIG. 26 or 27 will be described with reference to a flowchart illustrated in FIG. 29.

In Step S191, all the IMUs 201 measure angular velocities using an oscillation signal of a drive frequency for each cluster in units of clusters and supplies the measured angular velocities to the composing calculating unit 471.

In Step S192, the re-sampler 481 acquires angular velocities supplied from each IMUs 201 in a time divisional manner in units of clusters, aligns the sampling frequencies in units of clusters, and outputs the sampling frequencies to the interference eliminating unit 482.

In Step S193, the interference eliminating unit 482 eliminates an influence of interferences from information of angular velocities supplied from the re-sampler 481 and outputs resultant angular velocities to the composing unit 483.

In Step S194, the composing unit 483 composes information of angular velocities in units of clusters supplied from the interference eliminating unit 482 and output a result of the composing as one detection value.

In accordance with the process described above, sampling frequencies of angular velocities supplied for each cluster from IMUs 201 of which the drive frequencies can be synchronized can be aligned, the angular velocities are composed with interferences being eliminated, and thus, even in a case in which a plurality of IMUs 201 of which drive frequencies are different from each other are used as a whole, an angular velocity can be detected with high accuracy.

11. First Modified Example of Second Embodiment

First Modified Example of Clustering Processing

Although an example in which a process of clustering IMUs 201 up to the threshold frequency that is higher than the lowest drive frequency by the predetermined width B among unprocessed IMUs 201 to the same cluster is repeated in the clustering processing has been described, in a case in which the number of clusters is too large, the effect of clustering is reduced.

Thus, when the number of clusters is larger than a specified value N, the predetermined width B is increased, and clustering is performed again, and clustering may be performed with the number of clusters up to the specified value N.

Thus, referring to the flowchart illustrated in FIG. 30, clustering processing in which, when the number of clusters is larger than the specified value N, the predetermined value is increased, and clustering is performed again such that the number of clusters is decreased will be described.

Figure 28:
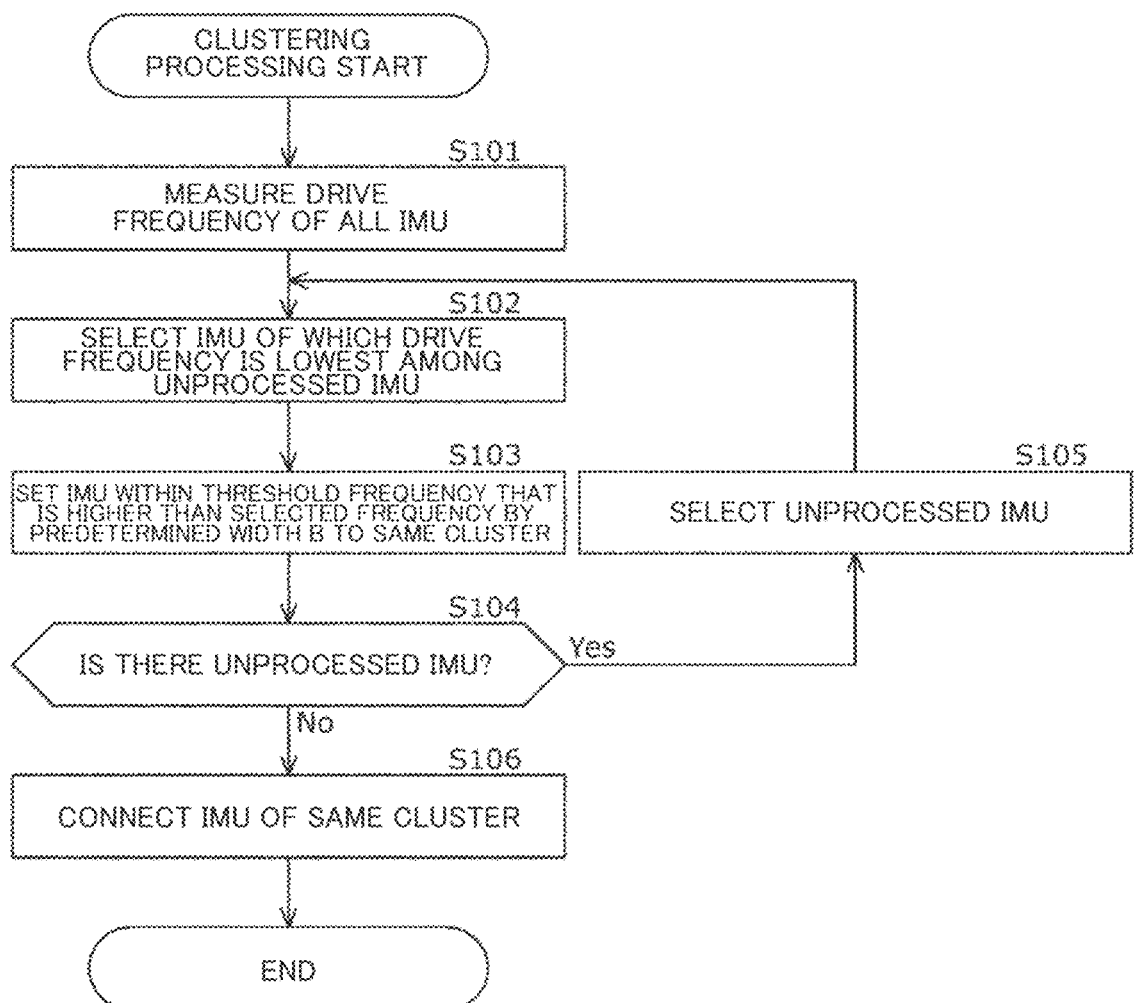
FIG. 28 is a flowchart illustrating clustering processing using a clustering measurement device.
Figure 30:
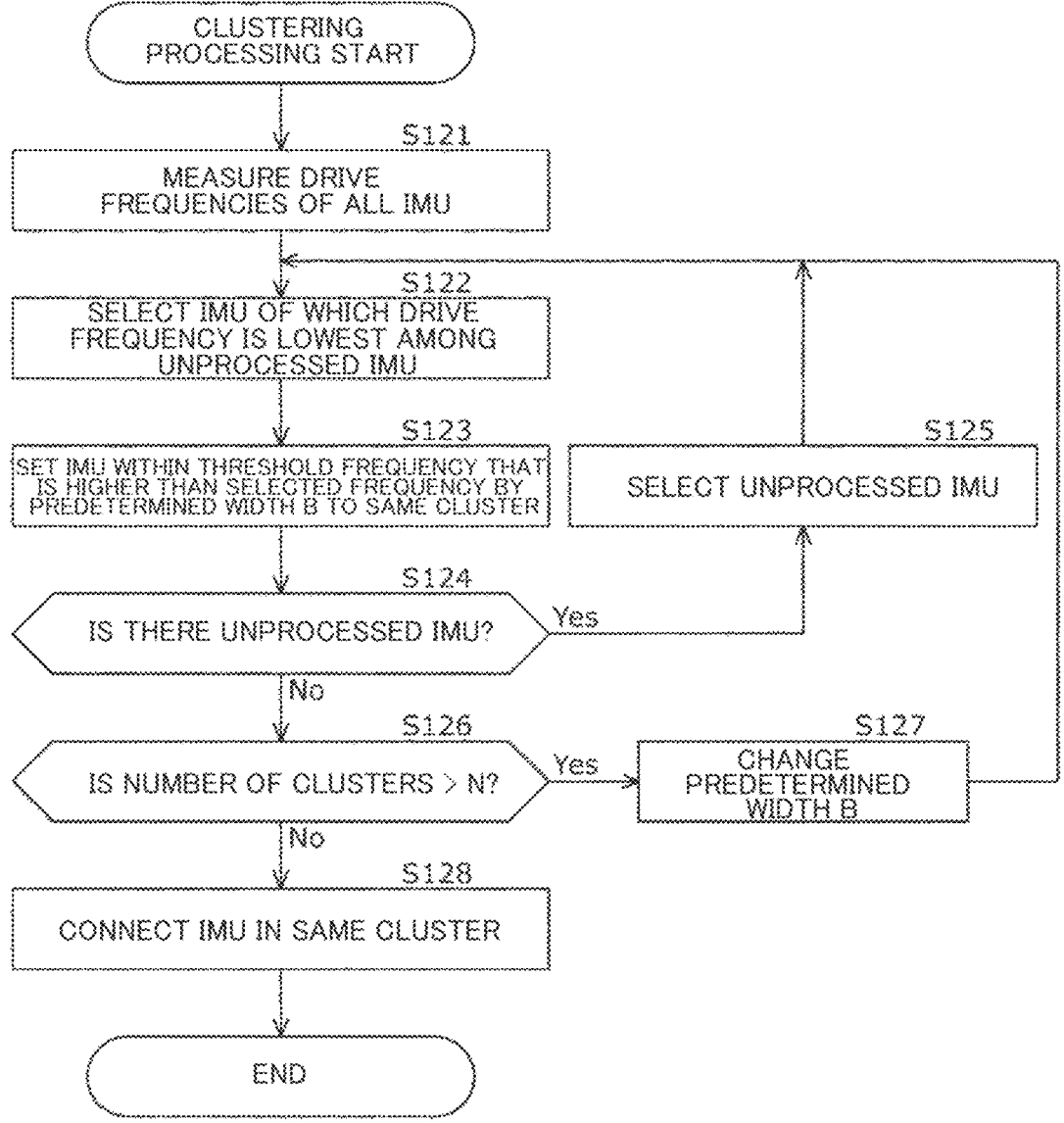
FIG. 30 is a flowchart illustrating a first modified example of clustering processing that is a first modified example of the second embodiment of the multi-IMU according to the present disclosure.

Processes of Steps S121 to S125 and S128 in the flowchart illustrated in FIG. 30 are similar to the processes of Steps S101 to S106 illustrated in FIG. 28, and thus description thereof will be omitted.

In other words, after all the IMUs 201 are clustered in the processes of Steps S121 to S125, in Step S126, the clustering calculating unit 463 determines whether or not the current number of clusters is larger than the specified value N.

In Step S126, in a case in which the number of clusters is larger than the specified value N, the process proceeds to Step S127.

In Step S127, the clustering calculating unit 463 resets clustering, increases the predetermined width B by a predetermined value, and the process returns to Step S122.

In other words, in Step S127, the processes of Steps S122 to S127 are repeated until the number of clusters becomes smaller than the specified value N, and retry of the clustering is repeated.

Then, in Step S127, in a case in which the number of clusters is determined to be smaller than the specified value N, the process proceeds to Step S128.

In accordance with the process described above, a plurality of IMUs 201 are clustered into clusters of a number smaller than the specified value N, and the IMUs 201 are connected for each cluster on the basis of the drive frequencies.

As a result, clustering can be performed within the specified value N.

12. Second Modified Example of Second Embodiment

Second Modified Example of Clustering Processing

An example in which, when the number of clusters is larger than the specified value N, the predetermined width B that is a width of the frequency of each cluster is increased, and clustering is performed again until the number of clusters becomes smaller than the specified value N in the clustering processing has been described above.

However, in a case in which the predetermined width B is changed, an IMU 201 of which a drive frequency deviates much from a designed drive frequency may be assumed to be included.

Thus, in a case in which the predetermined width B is changed, for an IMU 201 of which a measured drive frequency deviates much from the designed drive frequency, by trimming the vibrator 211 through laser retrimming or the like, the drive frequency may be adjusted.

Thus, clustering processing in which, when the predetermined width B is increased, clustering is performed again, and the number of clusters is decreased, the vibrator 211 of the IMU 201 of which the drive frequency deviates much from the designed drive frequency is trimmed will be described with reference to a flowchart illustrating in FIG. 31.

Figure 31:
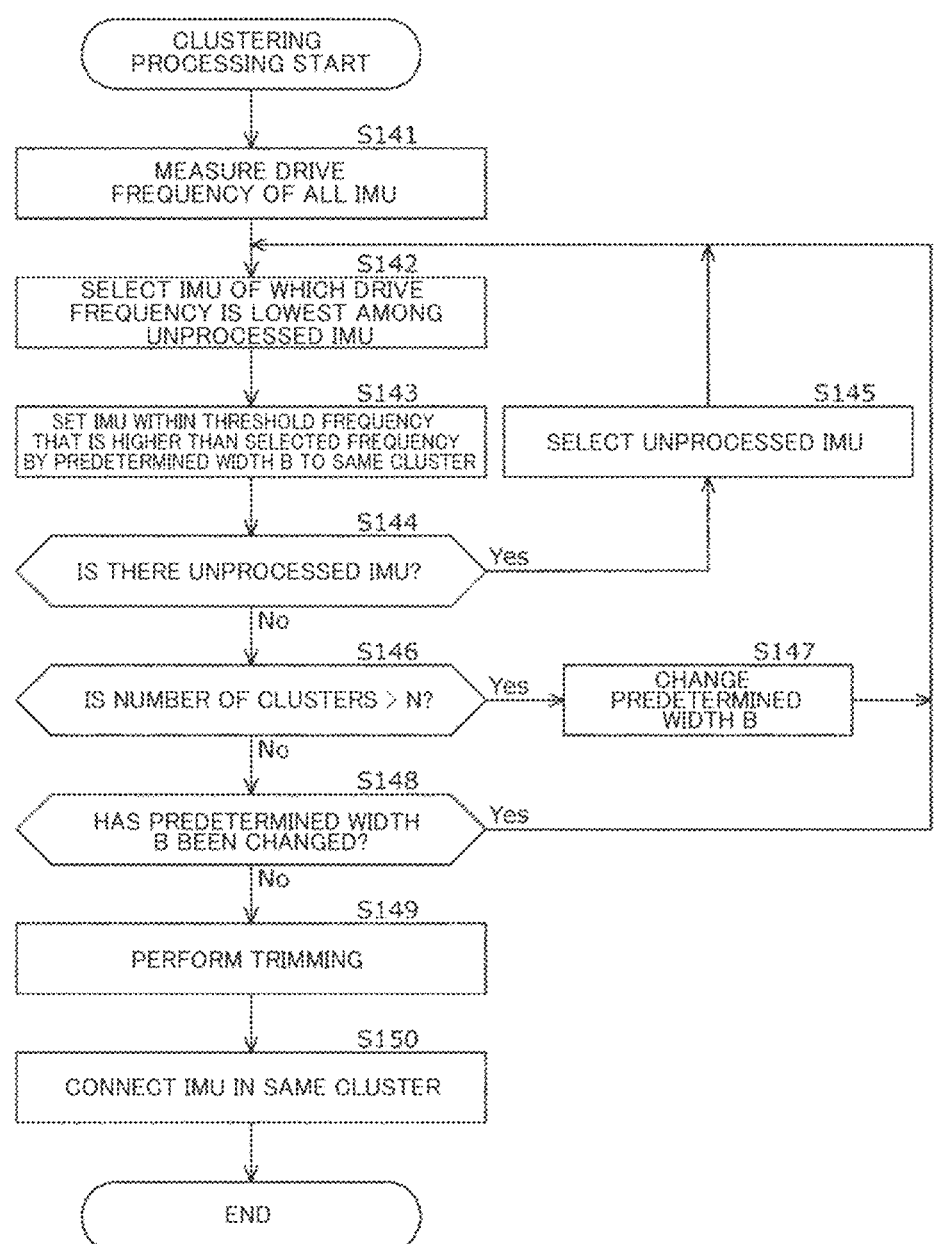
FIG. 31 is a flowchart illustrating a second modified example of clustering processing that is a second modified example of the second embodiment of the multi-IMU according to the present disclosure.

Processes of Steps S141 to S147 and S150 in the flowchart illustrated in FIG. 31 are similar to the processes of Steps S101 to S106 illustrated in FIG. 28, and thus description thereof will be omitted.

In other words, after all the IMUs 201 are clustered in the processes of Steps S141 to S147, in Step S148, the clustering calculating unit 463 determines whether or not the predetermined width B has been changed to be large.

In Step S148, in a case in which the predetermined width B is changed to be large, the process proceeds to Step S149.

In Step S149, for an IMU 201 of which a measured drive frequency deviates more than a predetermined value from the designed drive frequency, the vibrator 211 is trimmed through laser trimming or the like such that the drive frequency becomes appropriate for the designed drive frequency, and the process proceeds to Step S150.

In accordance with the process described above, a plurality of IMUs 201 are clustered into clusters of a number smaller than the specified value N on the basis of the drive frequencies, IMUs 201 are connected for each cluster, the vibrator 211 of the IMU 201 of which a measured drive frequency deviates more than a predetermined value from the designed drive frequency is trimmed, and thus the drive frequency can be adjusted.

13. Third Modified Example of Second Embodiment

Third Modified Example of Clustering Processing

In description presented above, the clustering of IMUs 201 may be performed using a clustering technique such as K means clustering or the like.

Figure 32:
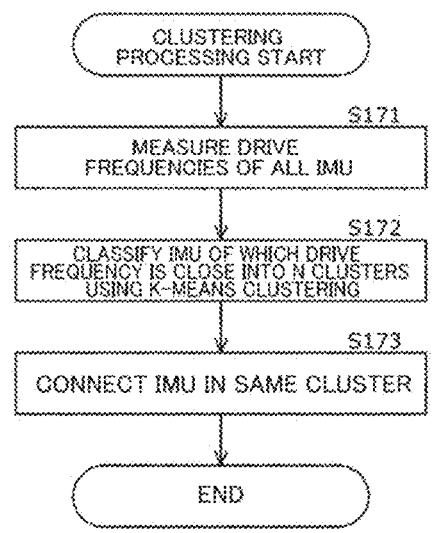
FIG. 32 is a flowchart illustrating a third modified example of clustering processing that is a third modified example of the second embodiment of the multi-IMU according to the present disclosure.

Thus, clustering processing using the K means clustering will be described with reference to a flowchart illustrated in FIG. 32.

In Step S171, the frequency measuring unit 462 measures drive frequencies of all the IMUs 201 on the basis of the reference frequency supplied from the reference frequency generating unit 461 and outputs measurement results to the clustering calculating unit 463.

In Step S172, the clustering calculating unit 463 classifies IMUs of which drive frequencies are close to each other into N clusters on the basis of the drive frequencies of all the IMUs 201 using the K means clustering.

In Step S173, the clustering calculating unit 463 outputs information indicating which cluster a certain IMU 201 belongs to the connection part 452. In accordance with this, the connection part 452 connects IMUs 201 in units of clusters.

In accordance with the process described above, a plurality of IMUs 201 are clustered on the basis of drive frequencies, and IMUs 201 are connected for each cluster.

14. Fourth Modified Example of Second Embodiment

In description presented above, an example in which the drive circuit block 231, the sense circuit block 232, and the digital output circuit block 233 are disposed in the reading circuit 213 in each IMU 201 has been described.

However, the sense circuit block 232 and the digital output circuit block 233 may be shared by IMUs 201 classified into the same cluster.

Figure 33:
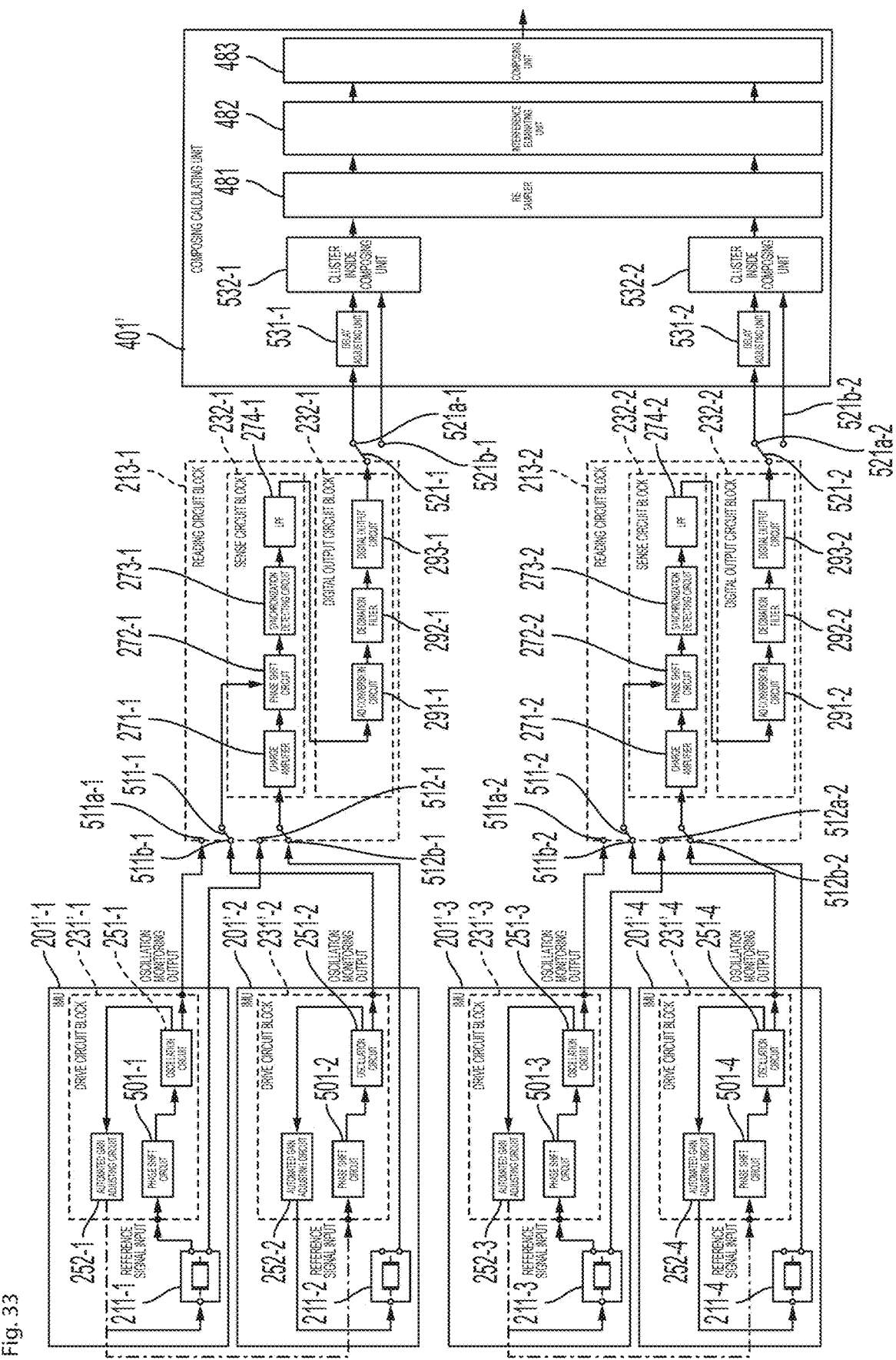
FIG. 33 is a diagram illustrating a multi-IMU according to a fourth modified example of the second embodiment of the present disclosure.

FIG. 33 illustrates a configuration example of a multi-IMU 200 in which the sense circuit block 232 and the digital output circuit block 233 are shared by IMUs 201 classified into the same cluster.

In other words, the multi-IMU 200 illustrated in FIG. 33 includes IMUs 201'-1 to 201'-4, reading circuits 213'-1 and 213'-2, and a composing calculating unit 471'. The composing calculating unit 471' may be disposed outside the multi-IMU 200.

In the multi-IMU 200 illustrated in FIG. 33, the IMUs 201'-1 and 201'-2 are classified into a first cluster, and the IMUs 201'-3 and 201'-4 are classified into a second cluster.

In the first cluster, the IMU 201'-1 is set as a synchronization master device, and the IMU 201'-2 is set as a synchronization slave device. For this reason, an output of an automated gain adjusting circuit 242-1 of the IMU 201'-1 is supplied to an oscillation circuit 251-2 through a phase shift circuit 501-2 of the IMU 201'-2 as a reference signal fm.

In addition, in the second cluster, the IMU 201'-3 is set as a synchronization master device, and the IMU 201'-4 is set as a synchronization slave device. For this reason, an output of an automated gain adjusting circuit 242-3 of the IMU 201'-3 is supplied to an oscillation circuit 251-4 through a phase shift circuit 501-4 of the IMU 201'-4 as a reference signal fm.

In accordance with such a configuration, the IMUs 201'-1 and 201'-2 share the reading circuit 213'-1 in a time divisional manner, and the IMUs 201'-3 and 201'-4 share the reading circuit 213'-4 in a time divisional manner.

In other words, the reading circuit 213'-1 reads an angular velocity supplied from the IMU 201'-1 at a timing in a first phase, reads an angular velocity supplied from the IMU 201'-2 at a timing in a second phase, and supplies the read angular velocities to the composing calculating unit 471'.

In addition, the reading circuit 213'-2 reads an angular velocity supplied from the IMU 201'-3 at a timing in the first phase, reads an angular velocity supplied from the IMU 201'-4 at a timing in the second phase, and supplies the read angular velocities to the composing calculating unit 471'.

The composing calculating unit 471' temporarily stores the angular velocities of the IMU 201'-1 and 201'-3 supplied at a timing in the first phase, acquires the angular velocities of the IMUs 201'-2 and 201'-4 supplied at a timing in the second phase together with the angular velocities of the IMU 201'-1 and 201'-3 being delayed, first, composes the angular velocities inside the cluster, thereafter re-samples the angular velocity for each cluster, and composes the angular velocities with interferences being eliminated.

In more detail, different from the configuration of the IMU 201 of the multi-IMU 200 illustrated in FIG. 10, in all the IMUs 201'-1 to 201'-4, only vibrators 211-1 to 211-4 and drive circuit blocks 231'-1 to 231'-4 corresponding to the drive circuit block 231 disposed in the reading circuit 213 are disposed.

The drive circuit blocks 231'-1 to 231'-4 basically have configurations similar to the drive circuit blocks 231-1 to 231-4 and newly includes phase shift circuits 501-1 to 501-4.

In addition, the oscillation circuit 251-1 of the IMU 201'-1 outputs an oscillation signal to a terminal 511*a*-1 of a switch 511-1 of the reading circuit 213'-1 as an oscillation monitoring output in addition to the automated gain adjusting circuit 252-1.

The vibrator 211-1 of the IMU 201'-1 outputs a vibration signal to the oscillation circuit 251-1 through the phase shift circuit 501-1 as a reference signal and outputs the vibration signal to a terminal 512*a*-1 of a switch 512-1 of the reading circuit 213'-1.

In addition, the oscillation circuit 251-2 of the IMU 201'-2 outputs an oscillation signal to a terminal 511*b*-1 of the switch 511-1 of the reading circuit 213'-1 as an oscillation monitoring output in addition to the automated gain adjusting circuit 252-2.

The vibrator 211-2 of the IMU 201'-2 outputs a vibration signal to a terminal 512*b*-1 of the switch 512-1 of the reading circuit 213'-1.

In addition, the oscillation circuit 251-3 of the IMU 201'-3 outputs an oscillation signal to a terminal 511*a*-2 of the switch 511-2 of the reading circuit 213'-2 as an oscillation monitoring output in addition to the automated gain adjusting circuit 252-3.

The vibrator 211-3 of the IMU 201'-3 outputs a vibration signal to the oscillation circuit 251-3 through the phase shift circuit 501-3 as a reference signal and outputs the vibration signal to a terminal 512*a*-2 of a switch 512-2 of the reading circuit 213'-2.

In addition, the oscillation circuit 251-4 of the IMU 201'-4 outputs an oscillation signal to a terminal 511*b*-2 of the switch 511-2 of the reading circuit 213'-2 as an oscillation monitoring output in addition to the automated gain adjusting circuit 252-4.

The vibrator 211-4 of the IMU 201'-4 outputs a vibration signal to a terminal 512*b*-2 of the switch 512-2 of the reading circuit 213'-2.

The reading circuit 213'-1 has a configuration corresponding to the reading circuit 213 illustrated in FIG. 10, is configured to include only the sense circuit block 232-1 and the digital output circuit block 233-1 excluding the drive circuit block 231 and includes a switch 511-1 that is newly disposed.

Similarly, the reading circuit 213'-2 has a configuration corresponding to the reading circuit 213 illustrated in FIG. 10, is configured to include only the sense circuit block 232-2 and the digital output circuit block 233-2 excluding the drive circuit block 231 and includes a switch 511-2 that is newly disposed.

In such a configuration, the reading circuit 213'-1 is shared by the IMUs 201'-1 and 201'-2 in time divisional processing, and thus, in accordance with operations of the phase shift circuits 501-1 and 501-2 and the switches 511-1 and 512-1, an operation of reading an oscillation signal from the IMU 201'-1 in the first phase and an operation of reading an oscillation signal from the IMU 201'-2 in the second phase are repeated.

In other words, in accordance with the phase shift circuits 501-1 and 501-2, an oscillation signal is output from the IMU 201'-1 to the reading circuit 213'-1 in the first phase, and an oscillation signal is output from the IMU 201'-2 to the reading circuit 213'-1 in the second phase.

In accordance with this, in the first phase, the switch 511-1 is connected to the terminal 511*a*-1, and the switch 512-1 is connected to the terminal 512*a*-1. In accordance with such an operation, in the first phase, the oscillation signal of the IMU 201'-1 is read by the reading circuit 213'-1 and is output to the composing calculating unit 471' as an angular velocity formed from a digital signal.

In addition, in the second phase, the switch 511-1 is connected to the terminal 511*b*-1, and the switch 512-1 is connected to the terminal 512*b*-1. In accordance with such an operation, in the second phase, the oscillation signal of the IMU 201'-2 is read by the reading circuit 213'-1 and is output to the composing calculating unit 471' as an angular velocity formed from a digital signal.

Similarly, the reading circuit 213'-2 is shared by the IMUs 201'-3 and 201'-4 in time divisional processing, and thus, in accordance with operations of the phase shift circuits 501-3 and 501-4 and the switches 511-2 and 512-2, an operation of reading an oscillation signal from the IMU 201'-3 in the first phase and an operation of reading an oscillation signal from the IMU 201'-4 in the second phase are repeated.

In other words, in accordance with the phase shift circuits 501-3 and 501-4, an oscillation signal is output from the IMU 201'-3 to the reading circuit 213'-2 in the first phase, and an oscillation signal is output from the IMU 201'-4 to the reading circuit 213'-2 in the second phase.

In accordance with this, in the first phase, the switch 511-2 is connected to the terminal 511*a*-2, and the switch 512-2 is connected to the terminal 512*a*-2. In accordance with such an operation, in the first phase, the oscillation signal of the IMU 201'-3 is read by the reading circuit 213'-2 and is output to the composing calculating unit 471' as an angular velocity formed from a digital signal.

In addition, in the second phase, the switch 511-2 is connected to the terminal 511*b*-2, and the switch 512-2 is connected to the terminal 512*b*-2. In accordance with such an operation, in the second phase, the oscillation signal of the IMU 201'-4 is read by the reading circuit 213'-2 and is output to the composing calculating unit 471' as an angular velocity formed from a digital signal.

The composing calculating unit 471' includes delay adjusting units 531-1 and 531-2 and cluster inside composing units 532-1 and 532-2 in addition to the re-sampler 481, the interference eliminating unit 482, and the composing unit 483 of the composing calculating unit 471.

When angular velocities of a first layer are supplied from the reading circuits 213'-1 and 213'-2, the delay adjusting units 531-1 and 531-2 temporarily store and delay the angular velocities until the angular velocity of the second phase is supplied, and outputs the angular velocities to the cluster inside composing units 532-1 and 532-2 at a timing at which the angular velocities of the second phase are supplied.

The cluster inside composing unit 532-1 composes angular velocities supplied on the basis of oscillation signals detected by the IMUs 201'-1 and 201'-2 configuring the first cluster and outputs a resultant angular velocity to the re-sampler 481.

The cluster inside composing unit 532-2 composes angular velocities supplied on the basis of oscillation signals detected by the IMUs 201'-3 and 201'-4 configuring the second cluster and outputs a resultant angular velocity to the re-sampler 481.

In accordance with such a configuration, since the sense circuit block 232 and the digital output circuit block 233 configuring the reading circuit 213' can be shared in units of clusters, circuit components can be omitted, and the cost can be reduced.

<Angular Velocity Measuring Processing Using the Multi-IMU Illustrated in FIG. 33 and Composing Calculating Unit>

Figure 34:
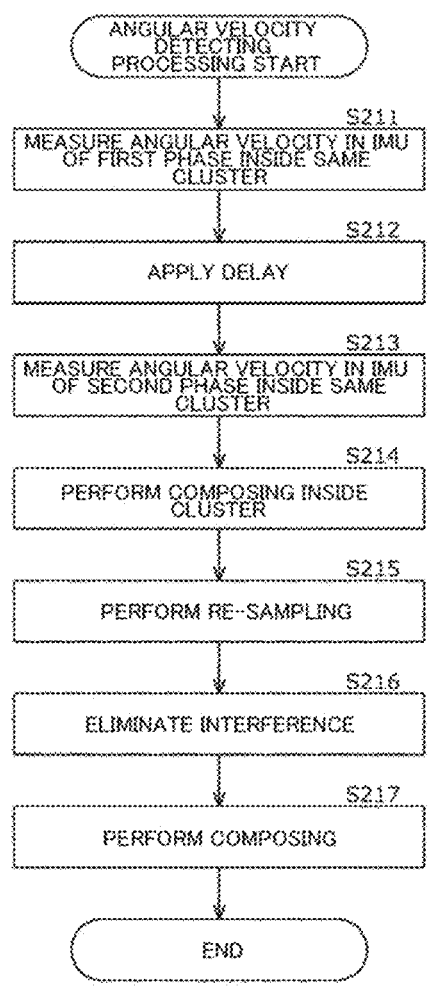
FIG. 34 is a flowchart illustrating angular velocity detecting processing using the multi-IMU illustrated in FIG. 33.

Next, angular velocity measuring processing using the multi-IMU 200 illustrated in FIG. 33 and the composing calculating unit 471' will be described with reference to a flowchart illustrated in FIG. 34.

In Step S211, an angular velocity is measured using the IMU 201' of the first phase inside the same cluster.

In other words, in FIG. 33, when the first cluster is considered, the switches 511-1 and 511-2 are respectively connected to terminals 511a-1 and 512a-1, and the phase shift circuits 501-1 and 501-2 are adjusted, whereby the oscillation signal of the IMU 201'-1 is supplied to the phase shift circuit 272-1 of the reading circuit 213'.

In addition, at this time, an oscillation signal of the vibrator 211-1 of the IMU 201'-1 is supplied to the charge amplification circuit 271-1.

In accordance with this process, in the reading circuit 213', an angular velocity detected by the IMU 201'-1 is measured and is output to the composing calculating unit 471'.

In Step S212, the delay adjusting unit 531 of the composing calculating unit 471' temporarily stores and delays the supplied angular velocity of the first phase until an angular velocity of the second phase is supplied.

In Step S213, an angular velocity using the IMU 201' of the second phase inside the same cluster is measured.

In other words, in FIG. 33, when the first cluster is considered, the switches 511-1 and 511-2 are respectively connected to the terminals 511b-1 and 512b-1, and the phase shift circuits 501-1 and 501-2 are adjusted, whereby an oscillation signal of the IMU 201'-2 is supplied to the phase shift circuit 272-1 of the reading circuit 213'

In addition, at this time, an oscillation signal of the vibrator 211-2 of the IMU 201'-2 is supplied to the charge amplification circuit 271-1.

In accordance with this process, in the reading circuit 213'-1, an angular velocity detected by the IMU 201'-2 is measured and is output to the composing calculating unit 471'.

In Step S214, the cluster inside composing unit 532 acquires an angular velocity of the first layer and an angular velocity of the second phase supplied from the delay adjusting unit 531, composes angular velocities inside the cluster, and outputs a resultant angular velocity to the re-sampler 481.

In Step S215, the re-sampler 481 acquired angular velocities in units of clusters, aligns the sampling frequencies in units of clusters, and outputs the angular velocities to the interference eliminating unit 482.

In Step S216, the interference eliminating unit 482 eliminates an influence of interferences for the information of the angular velocity supplied from the re-sampler 481 and outputs information of resultant angular velocities to the composing unit 483.

In Step S217, the composing unit 483 composes information of angular velocities in units of clusters supplied from the interference eliminating unit 482 and outputs a result of the composing as one detection value.

In accordance with the process described above, sampling frequencies of angular velocities supplied from IMUs 201 of which drive frequencies can be synchronized with each other for each cluster can be aligned, and composing is performed with the interferences eliminated, and thus, also in a case in which a plurality of IMUs 201 of which drive frequencies are different from each other are used, an angular velocity can be detected with high accuracy.

In addition, since the reading circuit 213' is shared for each cluster, by integrating the reading circuit 213' in the device configuration of the multi-IMU 200, the device configuration can be decreased in size, and the manufacturing cost can be reduced.

15. Third Embodiment

In the description presented above, an example in which noise such as a beat is eliminated by measuring angular velocities with the drive frequencies of the plurality of IMUs 201 and 201' to be synchronized with each other to be the same or by clustering IMUs in accordance with drive frequencies and composing angular velocities measured for clusters has been described.

However, there are other noises to be considered. For example there are a white noise, a flicker noise, a random walk noise, and the like.

Figure 35:
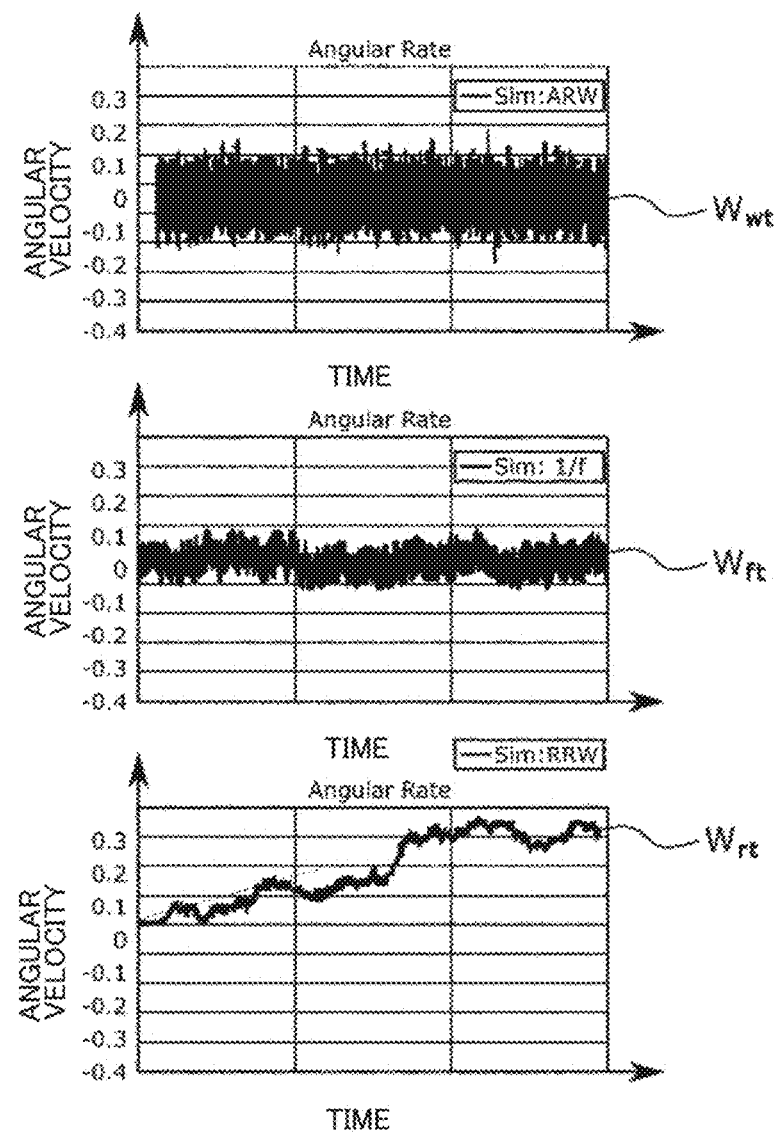
FIG. 35 is a diagram illustrating changes in a white noise, a flicker noise, and a random walk noise in a time domain.

FIG. 35 illustrates examples of waveforms of time series of a white noise, a flicker noise, and a random walk noise.

In FIG. 35, waveforms Wwt, Wft, and Wrt represent effects of a white noise, a flicker noise, and a random walk noise on angular velocities measured in a time series sequentially from top in the drawing.

Figure 36:
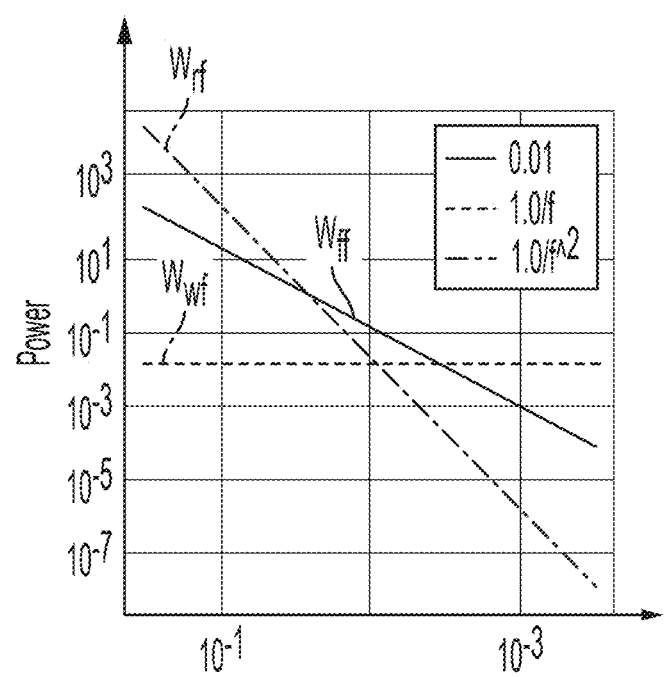
FIG. 36 is a diagram illustrating changes in a white noise, a flicker noise, and a random walk noise in a frequency domain.

As illustrated in FIG. 36, although the white noise is constant in the entire frequency band, the flicker noise and the random walk noise are represented to have large low-frequency components.

In FIG. 36, the vertical axis is intensity, the horizontal axis is a frequency, a waveform Wwf is a waveform of the white noise, a waveform Wff is a waveform of the flicker noise, and a waveform Wrf is a waveform of a random walk noise.

Figure 37:
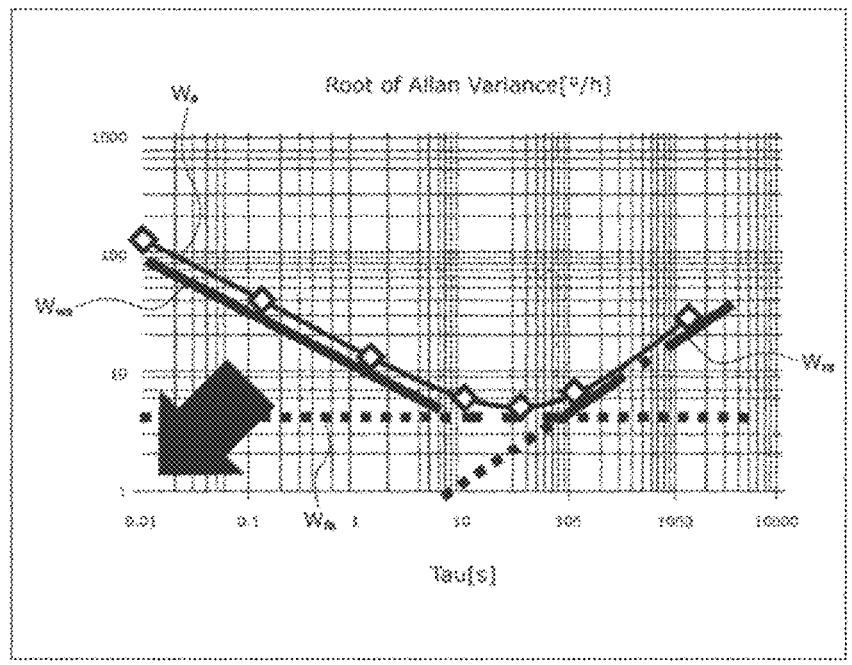
FIG. 37 is a diagram illustrating changes in Allan variance of each of a white noise, a flicker noise, and a random walk noise.

As illustrated in FIG. 37, according to Allan variance, as a stabilized bias point, the flicker noise becomes a limit, and it is illustrated that there is no waveform below a lower limit of the variance of the flicker noise even when a noise filter or the like is used.

FIG. 37 illustrates Allan variance, the horizontal axis is a width of a time window, and the vertical axis is variance. In FIG. 37, a waveform Wa is Allan variance of the IMU 201, a waveform Wwa is Allan variance of the white noise, a waveform Wfa is Allan variance of the flicker noise, and a waveform Wra is Allan variance of the random walk noise. In the waveform illustrated in FIG. 37, as the waveform further moves toward an area of a lower left part denoted by a thick-line arrow, it represents that improvement is made for noise.

In other words, by inhibiting a flicker noise, the bottom of a noise level in the Allan variance can be further lowered.

Thus, a configuration to cancel a flicker noise, which is included in the angular velocity, detected by the IMU 201' may be formed.

Configuration Example of Multi-IMU Capable of Canceling Flicker Noise

Figure 38:
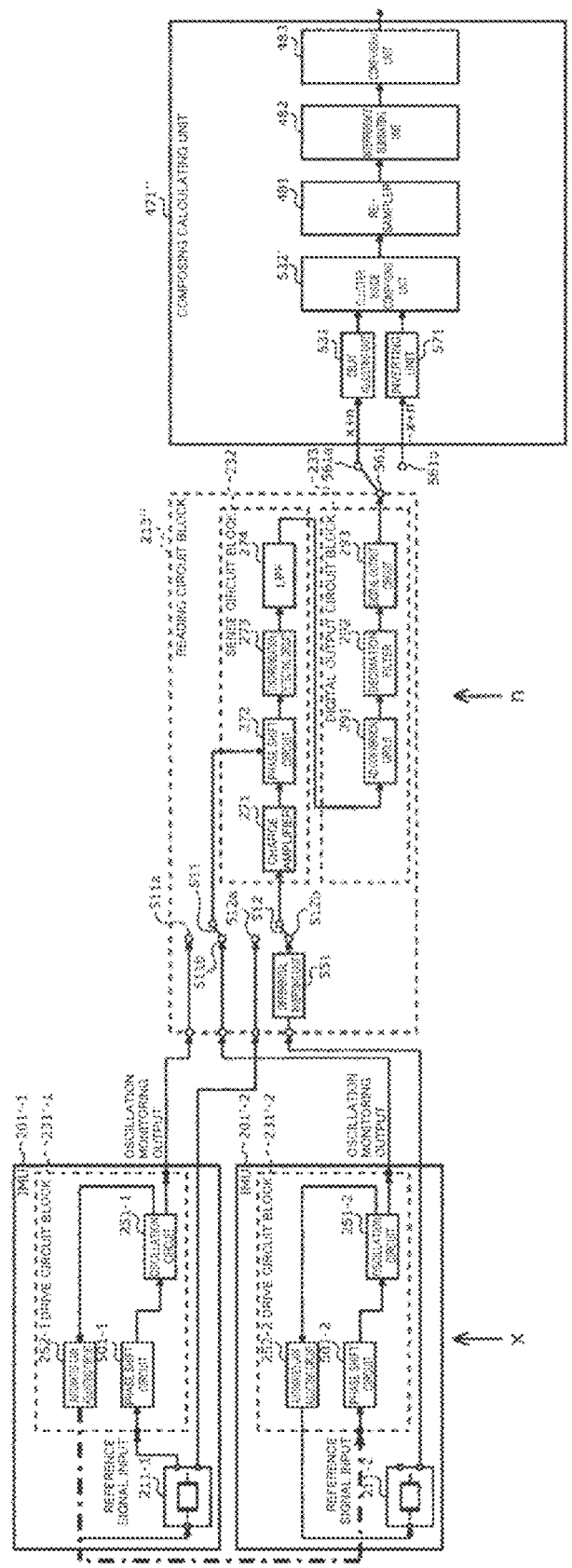
FIG. 38 is a diagram illustrating a configuration example of a multi-IMU according to a third embodiment of the present disclosure.

FIG. 38 is a configuration example of a multi-IMU 200 capable of canceling a flicker noise.

In addition, in FIG. 38, the configuration of a reading circuit 213" and a composing calculating unit 471" that are shared by an IMU 201'-1 and an IMU 201'-2, which are classified into the same cluster, configuring the multi-IMU 200 is illustrated.

In the multi-IMU 200 illustrated in FIG. 38, the same reference signs are assigned to components having the same functions as those of the multi-IMU 200 illustrated in FIG. 33, and description thereof will be omitted.

In other words, in the configuration illustrated in FIG. 38, points different from the configuration illustrated in FIG. 33 are in that a reading circuit 213" and a composing calculating unit 471" are disposed in place of the reading circuit 213' and the composing calculating unit 471'.

The reading circuit 213" is different from the reading circuit 213' in that a differential inverting unit 551 is disposed in a previous stage of a terminal 512b.

The differential inverting unit 551 inverts an oscillation signal of a second phase supplied from the IMU 201'-2 and outputs the inverted oscillation signal to the terminal 512b.

In addition, the composing calculating unit 471" is different from the composing calculating unit 471' in that a cluster inside composing unit 532' is disposed in place of the cluster inside composing unit 532, and an inverting unit 571 is disposed in a previous stage thereof.

The inverting unit 571 inverts the polarity of an angular velocity of the second phase and outputs the inverted angular velocity to the cluster inside composing unit 532.

In accordance with the configuration as described above, an angular velocity is calculated for an oscillation signal of a second layer output from the IMU 201'-2 in a state in which an oscillation signal of a first layer output from the IMU 201'-1 is converted into an inverse phase shift.

In accordance with this, for example, for an angular velocity x acquired in the first phase, an angular velocity acquired in the second phase is an angular velocity −x.

When the flicker noise is added as n in the reading circuit 213, an angular velocity of the first layer is acquired as x+n, and an angular velocity of the second phase is acquired as −x+n.

The angular velocity x+n of the first phase is delayed by the delay adjusting unit 531 and is supplied to the cluster inside composing unit 532', and an angular velocity −x+n of the second phase is inverted in polarity by the inverting unit 571 and is supplied to the cluster inside composing unit 532' as an angular velocity x−n.

Thus, the cluster inside composing unit 532' adds the angular velocity x+n of the first phase and the angular velocity x−n that is acquired by inverting the angular velocity of the second phase and are composed as an average value, whereby the flicker noise component n can be canceled.

<Angular Velocity Detecting Processing Using Multi-IMU and Composing Calculating Unit Illustrated in FIG. 38>

Figure 39:
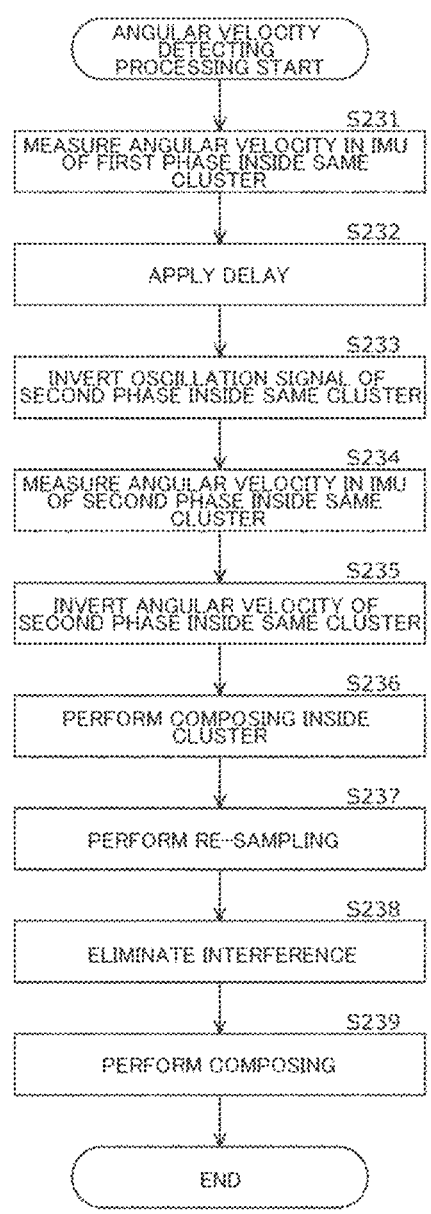
FIG. 39 is a flowchart illustrating angular velocity detecting processing using the multi-IMU illustrated in FIG. 38.

Next, angular velocity detecting processing using the multi-IMU 200 and the composing calculating unit 471" illustrated in FIG. 38 will be described with reference to a flowchart illustrated in FIG. 39.

In Step S231, an angular velocity is measured by an IMU 201' of the first phase inside the same cluster.

In Step S232, the delay adjusting unit 531 of the composing calculating unit 471" temporarily stores the supplied angular velocity of the first phase and delays the supplied angular velocity until an angular velocity of the second phase is supplied.

In Step S233, the differential inverting unit 551 performs differential inversion of an oscillation signal from the IMU 201' of the second phase inside the same cluster and outputs a resultant signal.

In Step S234, an angular velocity of the IMU 201' of the second phase inside the same cluster is measured.

In Step S235, the inverting unit 571 of the composing calculating unit 471" inverts the polarity of the angular velocity of the IMU 201' of the second phase and outputs the inverted angular velocity to the cluster inside composing unit 532.

In Step S236, by acquiring the angular velocity of the first layer supplied from the delay adjusting unit 531 and the polarity-inverted angular velocity of the second phase supplied from the inverting unit 571 and adding both the angular velocities, the cluster inside composing unit 532' composes the angular velocities inside the cluster by acquiring an average of the angular velocities inside the cluster such that a flicker noise is canceled and outputs a resultant angular velocity to the re-sampler 481.

In Step S237, the re-sampler 481 acquires angular velocities in units of clusters, aligns the sampling frequencies in units of clusters, and outputs the angular velocities to the interference eliminating unit 482.

In Step S238, the interference eliminating unit 482 eliminates an influence of interferences for the information of the angular velocity supplied from the re-sampler 481 and outputs information of resultant angular velocities to the composing unit 483.

In Step S239, the composing unit 483 composes information of angular velocities in units of clusters supplied from the interference eliminating unit 482 and outputs a result of the composing as one detection value.

In accordance with the process described above, an angular velocity can be detected with high accuracy while canceling the flicker noise.

Figure 40:
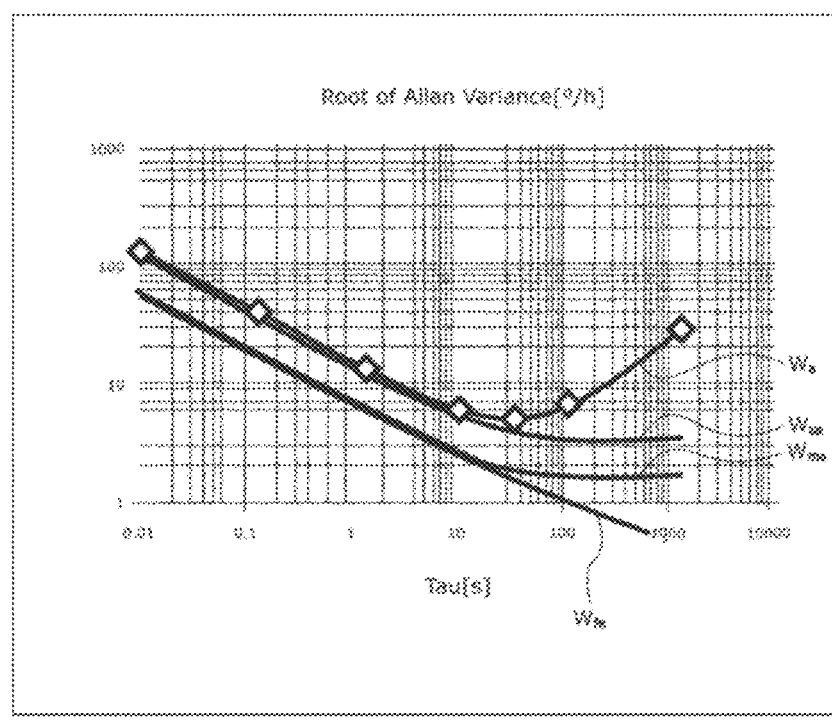
FIG. 40 is a diagram illustrating an effect of Allan variance for a flicker noise that is acquired by the multi-IMU illustrated in FIG. 38.

As illustrated in FIG. 40, while normal Allan variance in the IMU as a single body has a waveform as represented in the waveform Wa, for example, it is known that the Allan variance is improved up to a waveform Wsa in accordance with temperature compensation, and it is known that the Allan variance is improved up to a waveform Wma by configuring a multi-IMU using a plurality of IMUs.

However, by using the multi-IMU 200 as illustrated in FIG. 38 that is configured such that the flicker noise is reduced described above, for example, the bottom of the noise level in the Allan variance illustrated as the waveform Wfe in FIG. 40 can be further lowered, and characteristics of the variance closer to characteristics of a white noise can be acquired.

16. First Modified Example of Third Embodiment

Although an example in which the number of time divisions is two in the same cluster has been described above, the number of time divisions may be two or more.

Figure 41:
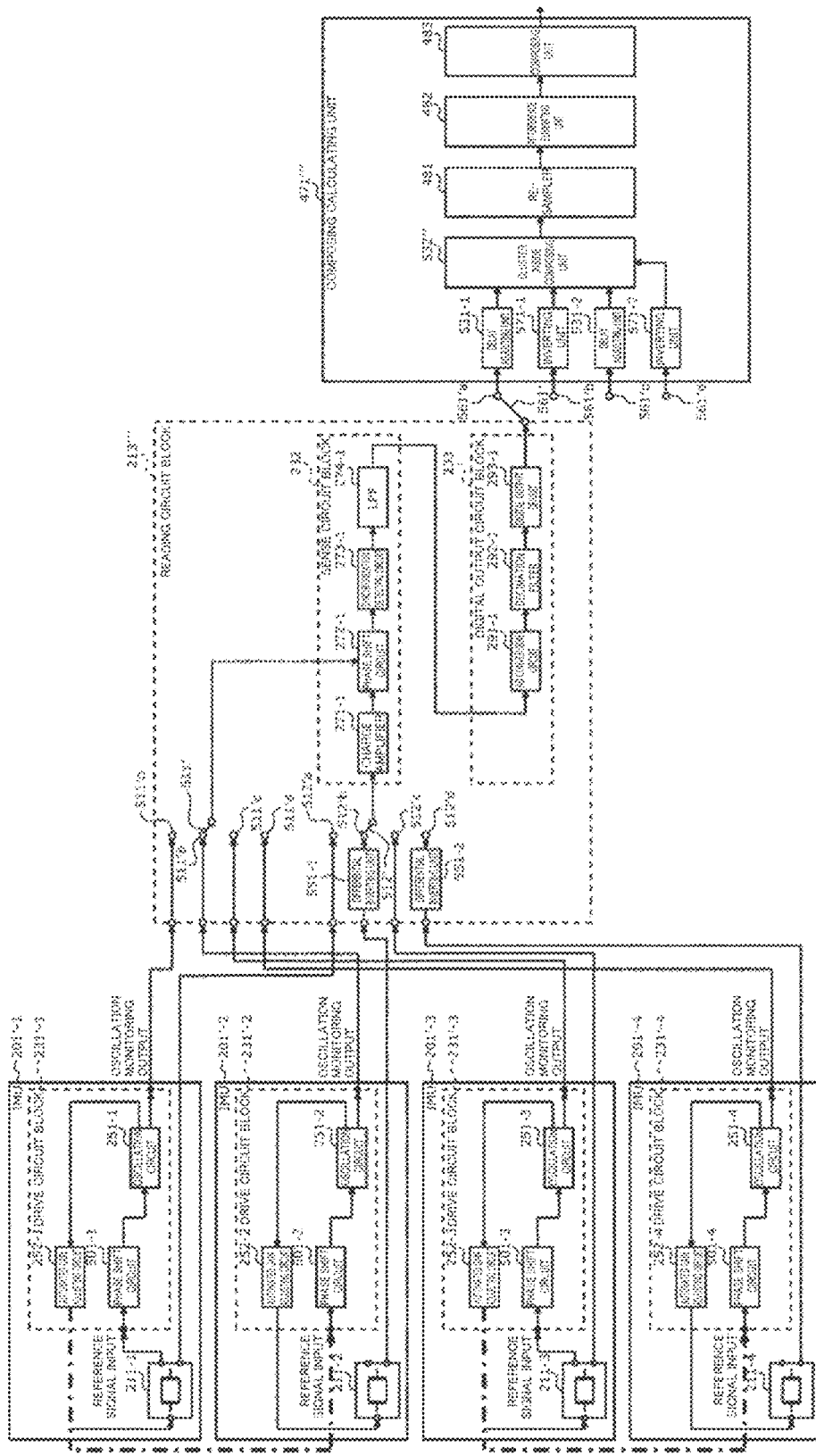
FIG. 41 is a diagram illustrating a multi-IMU according to a first modified example of the third embodiment of the present disclosure.

For example, in a case in which the number of time divisions is four, the multi-IMU 200 is configured as illustrated in FIG. 41.

The multi-IMU 200 illustrated in FIG. 41 has a configuration of a case in which IMUs 201'-1 to 201'-4 are the same cluster, the IMU 201'-1 among these is set as a synchronization master device, and the IMUs 201'-2 to 201'-4 are set as synchronization slave devices. In other words, in this case, angular velocities of a first phase to a fourth phase are acquired.

Differences from the multi-IMU 200 illustrated in FIG. 38 in a case in which the number of time divisions is two are in that a reading circuit 213"' and a composing calculating unit 471"' are disposed in place of the reading circuit 213" and the composing calculating unit 471".

In addition, the reading circuit 213"' is different from the reading circuit 213' in that switches 511' and 512' are disposed in place of the switches 511 and 512, and differential inverting units 551-1 and 551-2 are disposed in place of the differential inverting unit 551.

Although the switches 511' and 512' are basically similar to the switches 511 and 512 in terms of functions, the switches 511' and 512' have terminals of a number corresponding to the number of time divisions, which is different from the switches 511 and 512.

In other words, in the switch 511', terminals 511'a to 511'd are disposed, and when angular velocities of the first phase to the fourth phase are acquired, switching therebetween is performed to be connected in correspondence therewith.

Similarly, in the switch 512', terminals 512'a to 512'd are disposed, and when angular velocities of the first phase to the fourth phase are acquired, switching therebetween is performed to be connected in correspondence therewith.

The function of the differential inverting units 551-1 and 551-2 is basically similar to that of the differential inverting unit 551 illustrated in FIG. 38. In other words, the differential inverting unit 551-1 performs differential inversion of an oscillation signal supplied from the IMU 201'-2 of the second phase and outputs a resultant signal to the terminal 512'b of the switch 512'. In addition, the differential inverting unit 551-2 performs differential inversion of an oscillation signal supplied from the IMU 201'-4 of the fourth phase and outputs a resultant signal to the terminal 512'd of the switch 512'.

The composing calculating unit 471''' is different from the composing calculating unit 471" in that delay adjusting units 531-1 and 531-2 are disposed in place of the delay adjusting unit 531, inverting units 571-1 and 571-2 are disposed in place of the inverting unit 571, and a cluster inside composing unit 532" is disposed in place of the cluster inside composing unit 532'.

Both the delay adjusting units 531-1 and 531-2 have a function similar to the delay adjusting unit 531, the delay adjusting unit 531-1 temporarily stores an angular velocity of the first phase until an angular velocity of the second phase is supplied and outputs the angular velocity to the cluster inside composing unit 532', and the delay adjusting unit 531-2 temporarily stores an angular velocity of the third phase until an angular velocity of the fourth phase is supplied and outputs the angular velocity to the cluster inside composing unit 532'.

The inverting unit 571-1 inverts the polarity of the angular velocity of the second phase and outputs the inverted angular velocity to the cluster inside composing unit 532', and the inverting unit 571-2 inverts the polarity of the angular velocity of the fourth phase and outputs the inverted angular velocity to the cluster inside composing unit 532'.

In accordance with the configuration as described above, for the oscillation signals of the second phase and the fourth phase output from the IMUs 201'-2 and 201'-4, angular velocities are calculated in a state in which the oscillation signals of the first layer and the third phase output from the IMUs 201'-1 and 201'3 are converted into inverted phase shift.

Then, the polarity is inverted by the inverting unit 571-1 and the inverting unit 571-2, and thus the angular velocities of the second phase and the fourth phase are supplied to the cluster inside composing unit 532.

The cluster inside composing unit 532" adds the angular velocities of the first phase and the third phase and inverted angular velocities of the second phase and the fourth phase are composed as an average value, whereby the flicker noise component n can be canceled.

17. Fourth Embodiment

<Mechanical Structure of IMU>

In the description presented above, the technology for inhibiting occurrent of error due to beats by driving a plurality of IMUs 201 and 201' with the drive frequencies synchronized with each other through electric control and detecting angular velocities with high accuracy has been described.

However, in addition to the electric control of the plurality of IMUs 201, by using a mechanical structure, occurrence of error due to beats is further inhibited, and angular velocities may be detected with higher accuracy.

Thus, first, the vibrator 211 that is a mechanical component of the IMU 201 will be described with reference to FIG. 42.

Figure 42:
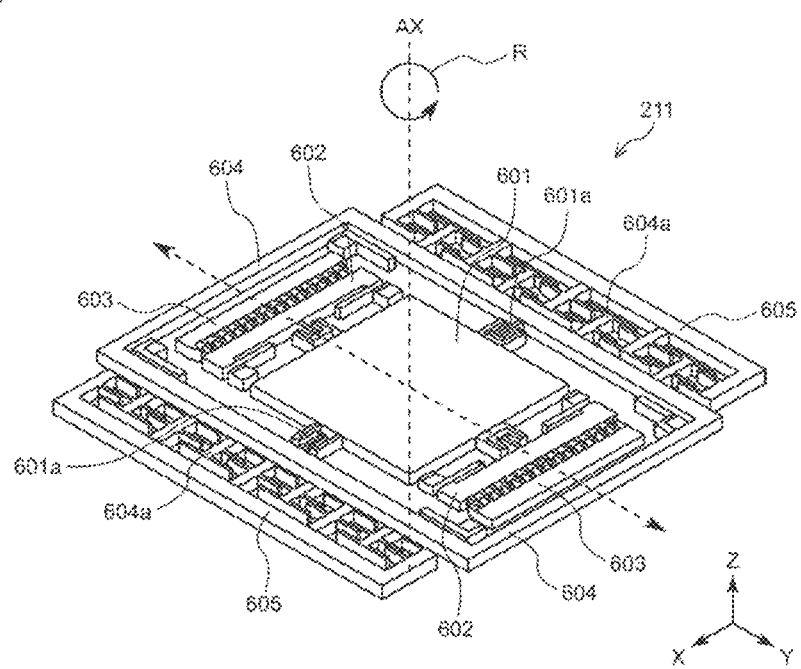
FIG. 42 is a diagram illustrating a configuration of a vibrator that is a mechanical configuration part of an IMU.

The vibrator 211 illustrated in FIG. 42 is composed of a proof mass 601, movable drive parts 602, fixed drive parts 603, a connection part 604, and detection electrodes 605.

The proof mass 601 is a rectangular weight and vibrates in a Y-axis direction together with rotating around an axis Ax as a rotational axis in a direction of an arrow R.

On both side faces of the rectangular proof mass 601 in the Y-axis direction in the drawing, the movable drive parts 602 for vibration in the Y-axis direction are disposed. At positions facing the movable drive parts 602, the fixed drive parts 603 are disposed.

The movable drive part 602 is formed from an electrode formed in a comb shape toward a side opposite to the proof mass 601 and is configured to be movable with respect to the fixed drive part 603 configured to be in a state being fixed to the proof mass 601.

The fixed drive part 603 is formed from an electrode formed in a comb shape toward a side facing the proof mass 601, that is, a side facing the comb-shaped electrode of the movable drive part 602 and is formed in a state being fixed to the connection part 604. The movable drive part 602 and the fixed drive part 603 are disposed to face each other such that comb-shaped electrode portions thereof are intermeshed with each other, whereby static capacitance is formed in a space between both electrodes.

In accordance with such a configuration, by supplying an oscillation signal formed from a predetermined drive frequency supplied from the drive circuit block 231 to the electrode of the fixed drive part 603, the static capacitance between the electrodes of the movable drive part 602 and the fixed drive part 603 changes in accordance with a drive frequency, and the movable drive part 602 periodically changes and reciprocates in the Y-axis direction with respect to the fixed drive part 603, thereby vibrating the proof mass 601 at a predetermined drive frequency in the Y-axis direction.

The proof mass 601 is connected to the connection part 604 formed from a rectangular frame surrounding the proof mass 601 using connection parts 601a.

On both side faces of the rectangular frame of the connection part 604 in the X-axis direction, plate-shaped electrodes 604a formed in a tree shape are disposed.

Plate-shaped detection electrodes 605 formed to be not in contact with the plate-shaped electrode 604a formed in a tree shape, surround the electrode 604a, and to be mutually engaged with each other are formed, and static capacitance is formed between the electrode 604a and the detection electrode 605.

The proof mass 601 rotates around the axis Ax in the direction of the arrow R and vibrates at a predetermined drive frequency in the Y-axis direction.

Figure 43:
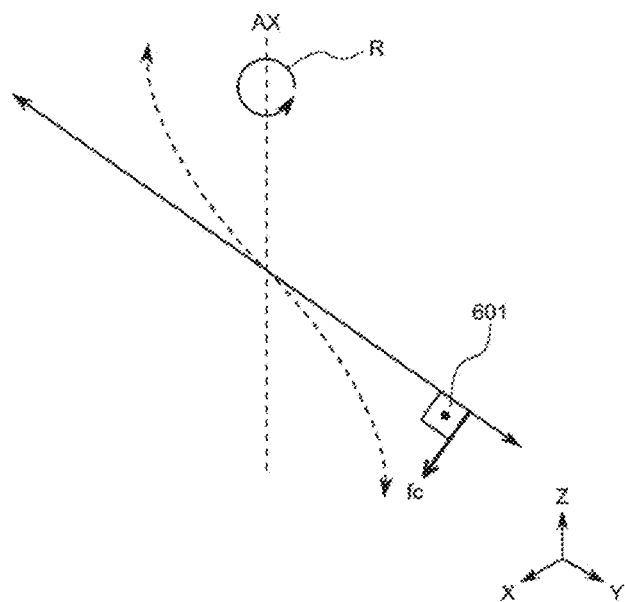
FIG. 43 is a diagram illustrating a principle of detecting a Coriolis force.

In other words, as illustrated in FIG. 43, when only movement of the proof mass 601 is represented, when the proof mass rotates in the direction of the arrow R and vibrates at a predetermined drive frequency in the Y-axis direction, for example, when an external force as denoted by a dotted-line arrow illustrated in FIG. 43 is applied, a Coriolis force as denoted by an arrow fc is generated in the X-axis direction.

In other words, when a Coriolis force is applied to the proof mass 601 illustrated in FIG. 42, a displacement occurs in the X-axis direction, and the Coriolis force relating to the proof mass 601 is transferred to the connection part 604 formed from the rectangular frame through the connection part 601a.

Then, a change in an inter-electrode distance between the electrode 604a of the connection part 604 and the detection electrode 605 occurs, and a change in the static capacitance formed between the electrodes occurs.

In other words, by measuring a change in the inter-electrode static capacitance between the electrode 604a of the connection part 604 and the detection electrode 65, a Coriolis force can be measured.

Thus, a vibration signal supplied from the vibrator 211 described above to the sense circuit block 232 is a signal that represents a change in the inter-electrode static capacitance between the electrode 604a of this connection part 604 and the detection electrode 65.

As described with reference to FIGS. 42 and 43, the proof mass 601 rotates in the direction of the arrow R and reciprocally vibrates at a predetermined drive frequency in the Y-axis direction, and thus, an angular velocity and an acceleration are detected on the basis of a Coriolis force detected when an external force is applied.

Thus, in detecting an angular velocity or an acceleration with high accuracy using the IMU 201, the proof mass 601 stably rotating and vibrating is a significant condition.

However, the multi-IMU 200 is assumed to be mounted in a mobile object, and thus the operating environment is not limited to an environment in which the proof mass 601 stably rotates and vibrates.

For example, an environment in which a situation in which an IMU collides with an obstacle during movement, or an IMU climbs over an obstacle is predicted to frequently occur, and a strong shock is unintentionally applied is also assumed.

When a strong shock exceeding a predetermined intensity is applied to the IMU 201, in the environment in which the proof mass 601 cannot stably rotate and vibrate described above, the vibration frequency changes to generate a beat, and, as a result, detection accuracy is predicted to be degraded.

<Multi-IMU that is Countermeasure for Shock in X-Axis Direction>

Thus, by considering vibration directions of a plurality of IMUs 201, a shock may be considered to be canceled.

Figure 44:
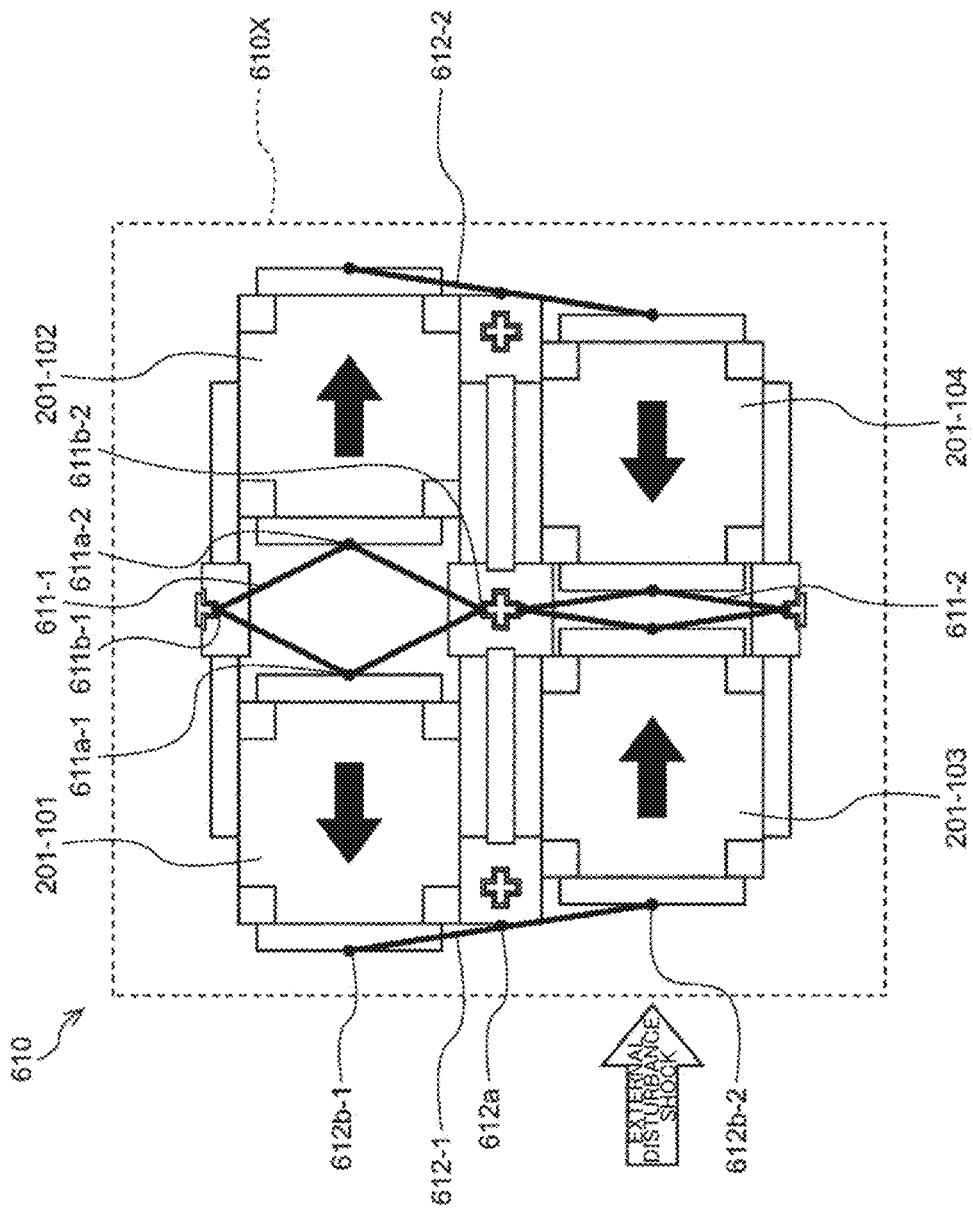
FIG. 44 is a diagram illustrating a configuration example of an IMU unit of a multi-IMU according to a fourth embodiment of the present disclosure that is configured to be able to cancel a shock in an X-axis direction.

FIG. 44 is an arrangement diagram viewed from the top face of an IMU unit 610 formed from four IMUs 201 capable of canceling a shock in an X-axis direction by considering vibration directions of the four IMUs 201 in the X-axis direction.

The IMU unit 610 illustrated in FIG. 44 is composed of four IMUs including IMU 201-101 to IMU 201-104.

In the IMU unit 610, the IMU 201-102 is disposed on a right side of the IMU 201-101 in the drawing, the IMU 201-103 is disposed on a lower side in the drawing, and the IMU 201-104 is disposed on a lower right side in the drawing.

The IMU 201-101 and the IMU 201-102 are connected using a connection beam 611-1, and the connection beam 611-1 changes a displacement between the IMU 201-101 and the IMU 201-102 into a reverse phase with respect to the X-axis direction.

In more detail, the connection beam 611-1 is a driving mechanism formed from four sebum-shaped frames in the drawing, and all the four corner parts 611a-1, 611a-2, 611b-1, and 611b-2 are configured to be ratable, and the corner part 611a-1 in contact with the IMU 201-101 and the corner part 611a-2 in contact with the IMU 201-102 among these are respectively connected to the IMU 201-101 and the IMU 201-102.

Hereinafter, the corner parts connected to the IMU 201-101 and the IMU 201-102 will be respectively referred to as connection corner parts 611a-1 and 611a-2, and the other two corner parts will be respectively referred to as a non-connection corner parts 611b-1 and 611b-2.

In other words, by opening an angle formed by frames connected to the connection corner parts 611a-1 and 611a-2 to be widened and closing an angle formed by frames connected to the non-connection corner parts 611b-1 and 611b-2 to be reduced, the IMU 201-101 and the IMU 201-102 are driven to shorten a distance therebetween.

To the contrary, by closing an angle formed by frames connected to the connection corner parts 611a-1 and 611a-2 to be reduced and opening an angle formed by frames connected to the non-connection corner parts 611b-1 and 611b-2 to be widened, the IMU 201-101 and the IMU 201-102 are driven to lengthen a distance therebetween.

In accordance with the driving mechanism of such connection corner parts 611a-1 and 611a-2 and non-connection corner parts 611b-1 and 611b-2, when the IMU 201-101 moves by a predetermined distance in a negative direction with respect to the X axis (a leftward direction in the drawing), the connection beam 611-1 moves the IMU 201-102 by a predetermined distance in a positive direction with respect to the X axis (a rightward direction in the drawing) such that a distance between the IMUs 201-101 and 201-102 is lengthened. To the contrary, when the IMU 201-101 moves by a predetermined distance in a positive direction with respect to the X axis (a rightward direction in the drawing), the connection beam 611-1 moves the IMU 201-102 by a predetermined distance in a negative direction with respect to the X axis (a leftward direction in the drawing) such that the distance between the IMUs 201-101 and 201-102 is shortened.

The connection beam 611-1 displaces the IMU 201-101 and the IMU 201-102 into a reverse phase with respect to the X-axis direction, and thus there is no master-servant relation between the IMU 201-101 and the IMU 201-102.

The IMU 201-103 and the IMU 201-104 are connected using a connection beam 611-2, and the connection beam 611-2 changes a displacement between the IMU 201-103 and the IMU 201-104 into a reverse phase with respect to the X-axis direction. A driving mechanism of the connection beam 611-2 is similar to the driving mechanism of the connection beam 611-1, and thus detailed illustration and description thereof will be omitted.

In other words, when the IMU 201-103 moves by a predetermined distance in the positive direction with respect to the X axis (the rightward direction in the drawing), the connection beam 611-2 moves the IMU 201-104 by a predetermined distance in the negative direction with respect to the X axis (the leftward direction in the drawing) such that a distance between the IMUs 201-103 and 201-104 is shortened. To the contrary, when the IMU 201-103 moves by a predetermined distance in the negative direction with respect to the X axis (the leftward direction in the drawing), the connection beam 611-2 moves the IMU 201-104 by a predetermined distance in the positive direction with respect to the X axis (the rightward direction in the drawing) such that the distance between the IMUs 201-103 and 201-104 is lengthened.

The connection beam 611-2 displaces the IMU 201-103 and the IMU 201-104 into a reverse phase with respect to the X-axis direction, and thus there is no master-servant relation between the IMU 201-103 and the IMU 201-104.

The IMU 201-101 and the IMU 201-103 are connected using a connection beam 612-1, and the connection beam 612-1 changes a displacement between the IMU 201-101 and the IMU 201-103 into a reverse phase with respect to the X-axis direction.

In more detail, in the connection beam 612-1, a rotation axis 612a is disposed at a center position, the IMU 201-101 and the IMU 201-103 are respectively connected to end portions 612b-1 and 612b-2 to be rotatable.

For this reason, the connection beam 612-1 is driven like a seesaw with the rotation axis 612a as its center in correspondence with movement of the IMU 201-101 and the IMU 201-103 in the X-axis direction.

In accordance with this, when the IMU 201-101 moves by a predetermined distance in the positive direction with respect to the X axis (the rightward direction in the drawing), the connection beam 612-1 moves the IMU 201-103 by a predetermined distance in the negative direction with respect to the X axis (the leftward direction in the drawing). To the contrary, when the IMU 201-101 moves by a predetermined distance in the negative direction with respect to the X axis, the connection beam 612-1 moves the IMU 201-103 by a predetermined distance in the positive direction with respect to the X axis.

The connection beam 612-1 displaces the IMU 201-101 and the IMU 201-103 into a reverse phase with respect to the X-axis direction, and thus there is no master-servant relation between the IMU 201-101 and the IMU 201-103.

The IMU 201-102 and the IMU 201-104 are connected using a connection beam 612-2, and the connection beam 612-2 changes a displacement between the IMU 201-102 and the IMU 201-104 into a reverse phase with respect to the X-axis direction. A driving mechanism of the connection beam 612-2 is similar to the driving mechanism of the connection beam 612-1.

In other words, when the IMU 201-102 moves by a predetermined distance in the positive direction with respect to the X axis (the rightward direction in the drawing), the connection beam 612-2 moves the IMU 201-104 by a predetermined distance in the negative direction with respect to the X axis (the leftward direction in the drawing). To the contrary, when the IMU 201-102 moves by a predetermined distance in the negative direction with respect to the X axis (the leftward direction in the drawing), the connection beam 612-2 moves the IMU 201-104 by a predetermined distance in the positive direction with respect to the X axis (the rightward direction in the drawing).

The connection beam 612-2 displaces the IMU 201-102 and the IMU 201-104 into a reverse phase with respect to the X-axis direction, and thus there is no master-servant relation between the IMU 201-102 and the IMU 201-104.

In other words, in the IMU unit 610 illustrated in FIG. 44, the IMUs 201-101 and 201-104 are driven in the same phase with respect to the X-axis direction, the IMUs 201-102 and 201-103 are driven in the same phase with respect to the X-axis direction, and the IMUs 201-101 and 201-104 and the IMUs 201-102 and 201-103 are driven in opposite phases with respect to the X-axis direction.

In addition, the IMUs 201-101 to 201-104 may have different drive directions with respect to the X-axis direction, and, as described in the first embodiment to the third embodiment, the drive frequencies are controlled to be the same.

Then, detection results acquired by the IMUs 201 driven in the same phase among the IMUs 201-101 to 201-104 are added, a difference between detection results acquired by the IMUs 201 driven in opposite phases is taken, and an average value or the like is acquired, whereby an angular velocity and an acceleration are acquired.

As a result, even when a situation in which a shock component in the X-axis direction due to an external disturbance shock in the X-axis direction as denoted by an arrow represented in the lower right part in the drawing is applied occurs, by taking a difference between detection results acquired by the IMUs 201 driven in opposite phases in the X-axis direction, a shock component in the X-axis direction due to the external disturbance shock is canceled, and thus an influence of the shock can be inhibited.

<Multi-IMU that is Countermeasure for Shock in Y-Axis Direction>

By using a technique similar to the countermeasure for a shock in the X-axis direction, a countermeasure for a shock in the Y-axis direction may be considered.

Figure 45:
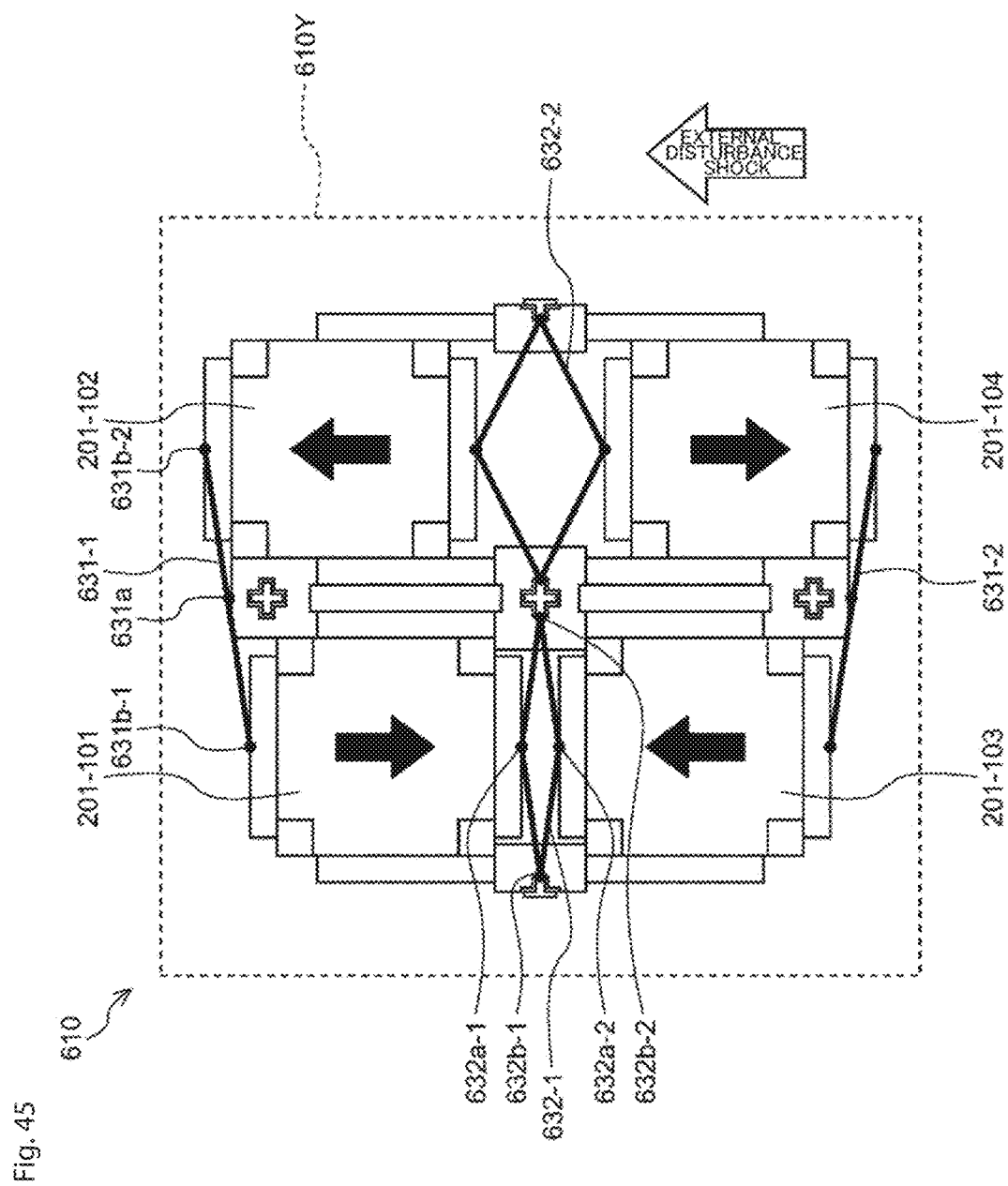
FIG. 45 is a diagram illustrating a configuration example of an IMU unit of the multi-IMU according to the fourth embodiment of the present disclosure that is configured to be able to cancel a shock in a Y-axis direction.

FIG. 45 is an arrangement diagram viewed from the top face of an IMU unit 610 formed from four IMUs 201 capable of canceling a shock in an X-axis direction by considering vibration directions of the four IMUs 201 in the Y-axis direction.

Similar to the IMU unit 610 illustrated in FIG. 44, the IMU unit 610 illustrated in FIG. 45 is also composed of four IMUs including IMU 201-101 to IMU 201-104.

The IMU 201-101 and the IMU 201-102 are connected using a connection beam 631-1, and the connection beam 631-1 changes a displacement between the IMU 201-101 and the IMU 201-102 into a reverse phase with respect to the Y-axis direction. A driving mechanism of the connection beam 631-1 is similar to the driving mechanism of the connection beam 612-1 illustrated in FIG. 44, and the drive direction is changed from the X-axis direction to the Y-axis direction.

In other words, when the IMU 201-101 connected to an end portion 631b-1 moves by a predetermined distance in a positive direction with respect to the Y axis (an upward direction in the drawing), the connection beam 631-1 is driven like a seesaw having a rotation axis 631a as its center and moves the IMU 201-102 connected to an end portion 631b-2 by a predetermined distance in a negative direction with respect to the Y axis (a downward direction in the drawing).

To the contrary, when the IMU 201-101 connected to the end portion 631b-1 moves by a predetermined distance in the negative direction with respect to the Y axis (the downward direction in the drawing), the connection beam 631-1 is driven like a seesaw having the rotation axis 631a as its center and moves the IMU 201-102 connected to the end portion 631b-2 by a predetermined distance in the positive direction with respect to the Y axis (the upward direction in the drawing.

The connection beam 631-1 displaces the IMU 201-101 and the IMU 201-102 into a reverse phase with respect to the Y-axis direction, and thus there is no master-servant relation between the IMU 201-101 and the IMU 201-102.

The IMU 201-103 and the IMU 201-104 are connected using a connection beam 631-2, and the connection beam 631-2 changes a displacement between the IMU 201-103 and the IMU 201-104 into a reverse phase with respect to the Y-axis direction. A driving mechanism of the connection beam 631-2 is similar to the driving mechanism of the connection beam 632-1.

In other words, when the IMU 201-103 moves by a predetermined distance in the positive direction with respect to the Y axis (the upward direction in the drawing), the connection beam 631-2 moves the IMU 201-104 by a predetermined distance in the negative direction with respect to the Y axis (the downward direction in the drawing). To the contrary, when the IMU 201-103 moves by a predetermined distance in the negative direction with respect to the Y axis (the downward direction in the drawing), the connection beam 631-2 moves the IMU 201-104 by a predetermined distance in the positive direction with respect to the Y axis (the upward direction in the drawing).

The connection beam 631-2 displaces the IMU 201-103 and the IMU 201-104 into a reverse phase with respect to the Y-axis direction, and thus there is no master-servant relation between the IMU 201-103 and the IMU 201-104.

The IMU 201-101 and the IMU 201-103 are connected using a connection beam 632-1, and the connection beam 632-1 changes a displacement between the IMU 201-101 and the IMU 201-103 into a reverse phase with respect to the Y-axis direction. A driving mechanism of the connection beam 632-1 is similar to the driving mechanism of the connection beam 611-1 illustrated in FIG. 44, and the drive direction is changed from the X-axis direction to the Y-axis direction.

In other words, when the IMU 201-101 moves by a predetermined distance in the positive direction with respect to the Y axis (the upward direction in the drawing), by closing an angle formed by frames connected to the connection corner parts 632a-1 and 632a-2 to be reduced and opening an angle formed by frames connected to the non-connection corner parts 632b-1 and 632b-2 to be widened, the connection beam 632-1 drives the IMU 201-101 and the IMU 201-103 to shorten a distance therebetween and moves the IMU 201-103 by a predetermined distance in the negative direction with respect to the Y axis (the downward direction in the drawing).

To the contrary, when the IMU 201-101 moves by a predetermined distance in the negative direction with respect to the Y axis (the downward direction in the drawing), by opening an angle formed by frames connected to the connection corner parts 632a-1 and 632a-2 to be widened and closing an angle formed by frames connected to the non-connection corner parts 632b-1 and 632b-2 to be reduced, the connection beam 632-1 drives the IMU 201-101 and the IMU 201-103 to shorten a distance therebetween and moves the IMU 201-103 by a predetermined distance in the positive direction with respect to the Y axis (the upward direction in the drawing).

The connection beam 632-1 displaces the IMU 201-101 and the IMU 201-103 into a reverse phase with respect to the Y-axis direction, and thus there is no master-servant relation between the IMU 201-101 and the IMU 201-103.

The IMU 201-102 and the IMU 201-104 are connected using a connection beam 632-2, and the connection beam 632-2 changes a displacement between the IMU 201-102 and the IMU 201-104 into a reverse phase with respect to the Y-axis direction. A driving mechanism of the connection beam 632-2 is similar to the driving mechanism of the connection beam 632-1 illustrated in FIG. 44.

In other words, when the IMU 201-102 moves by a predetermined distance in the positive direction with respect to the Y axis (the upward direction in the drawing), the connection beam 632-2 moves the IMU 201-104 by a predetermined distance in the negative direction with respect to the Y axis (the downward direction in the drawing). To the contrary, when the IMU 201-102 moves by a predetermined distance in the negative direction with respect to the Y axis (the downward direction in the drawing), the connection beam 632-2 moves the IMU 201-104 by a predetermined distance in the positive direction with respect to the Y axis (the upward direction in the drawing).

The connection beam 632-2 displaces the IMU 201-102 and the IMU 201-104 into a reverse phase with respect to the Y-axis direction, and thus there is no master-servant relation between the IMU 201-102 and the IMU 201-104.

In other words, in the IMU unit 610 illustrated in FIG. 45, the IMUs 201-101 and 201-104 are driven in the same phase with respect to the Y-axis direction, the IMUs 201-102 and 201-103 are driven in the same phase with respect to the Y-axis direction, and the IMUs 201-101 and 201-104 and the IMUs 201-102 and 201-103 are driven in opposite phases with respect to the Y-axis direction.

In addition, the IMUs 201-101 to 201-104 may have different drive directions with respect to the Y-axis direction, and, as described in the first embodiment to the third embodiment, the drive frequencies are controlled to be the same.

Then, detection results acquired by the IMUs 201 driven in the same phase among the IMUs 201-101 to 201-104 are added, a difference between detection results acquired by the IMUs 201 driven in opposite phases is taken, and an average value or the like is acquired, whereby an angular velocity and an acceleration are acquired.

As a result, even when a situation in which a shock component in the Y-axis direction due to an external disturbance shock in the Y-axis direction as denoted by an arrow represented in the lower right part in the drawing is applied occurs, by taking a difference between detection results acquired by the IMUs 201 driven in opposite phases in the Y-axis direction, a shock component in the Y-axis direction due to the external disturbance shock is canceled, and thus an influence of the shock can be inhibited.

Although FIGS. 44 and 45 separately illustrate the driving mechanism in the X-axis direction and the driving mechanism in the Y-axis direction for the same IMU unit 610, all the driving mechanisms are driving mechanisms included in the IMU unit 610.

In other words, as described with reference to FIGS. 44 and 45, even when a shock in one of the X-axis direction and the Y-axis direction is applied, the IMU unit 610 uses a difference between detection results, thus, a shock component is canceled in the X-axis direction and the Y-axis direction, and accordingly, measurement of an angular velocity and an acceleration with high accuracy can be realized.

Configuration Example of Multi-IMU Including IMU Unit Illustrated in FIGS. 44 and 45

Next, a configuration example of a multi-IMU 200 including the IMU unit 610 illustrated in FIGS. 44 and 45 will be described with reference to FIG. 46.

Figure 46:
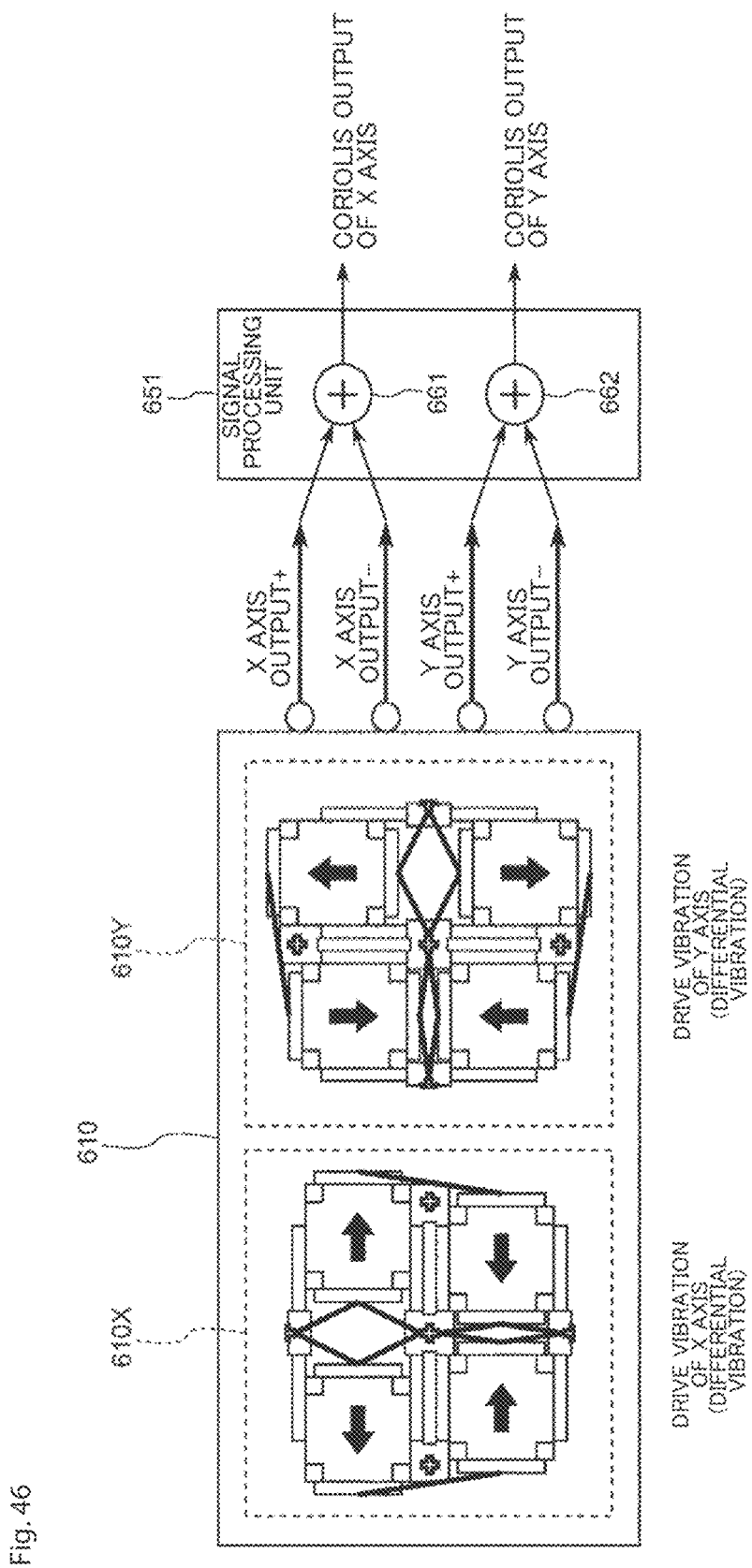
FIG. 46 is a diagram illustrating a configuration example of the multi-IMU including IMU units having a driving mechanism illustrated in FIGS. 44 and 45.

The multi-IMU 200 illustrated in FIG. 46 includes a signal processing unit 651 that accepts outputs of the positive direction and the negative direction with respect to the X axis and outputs of the positive direction and the negative direction with respect to the Y axis among outputs of the IMU unit 610 and IMUs 201-101 to 201-104 of the IMU unit 610 and performs signal processing.

The signal processing unit 651 includes calculation units 661 and 662 and accepts outputs of the positive direction and the negative direction with respect to the X axis and outputs of the positive direction and the negative direction with respect to the Y axis from the IMUs 201-101 to 201-104 and performs signal processing.

In more details, the calculation unit 661 accepts an output of the positive direction with respect to the X-axis direction (X-axis output+) and an output of the negative direction of the X-axis direction (X-axis output−) among outputs of the IMU unit 610 and performs calculation to take a difference therebetween, in other words, since a Coriolis force works in the reverse phase, and a shock component works in the same phase, by taking a difference, a shock component is canceled, and a Coriolis force of the X axis is output.

In other words, by dividing a difference between a sum of detection outputs of the IMUs 201-101 and 201-104 and a sum of detection outputs of the IMUs 201-102 and 201-103 by 2, the calculation unit 661 acquires an average value of the detection results acquired by the four IMUs 201, and thus, even when there is a shock component in the X-axis direction, it can be appropriately canceled.

The calculation unit 662 accepts an output of the positive direction with respect to the Y-axis direction (Y-axis output+) and an output of the negative direction of the Y-axis direction (Y-axis output−) among outputs of the IMU unit 610 and performs calculation to take a difference therebetween, in other words, since a Coriolis force works in the reverse phase, and a shock component works in the same phase, by taking a difference, a shock component is canceled, and a Coriolis force of the Y axis is output.

In other words, by dividing a difference between a sum of detection outputs of the IMUs 201-101 and 201-104 and a sum of detection outputs of the IMUs 201-102 and 201-103 by 2, the calculation unit 662 acquires an average value of the detection results acquired by the four IMUs 201, and thus, even when there is a shock component in the Y-axis direction, it can be appropriately canceled.

In FIG. 46, the IMU unit 610 representing the driving mechanism in the X-axis direction is particularly denoted as IMU unit 610X, and the IMU unit 610 representing the driving mechanism in the Y-axis direction is particularly denoted as IMU unit 610Y, and these denotations will be also used below. As described above, the IMU unit 610 is composed of four IMUs including an IMU 201-101 to an IMU 201-104.

<Signal Processing of IMU 200 Illustrated in FIG. 46>

Figure 47:
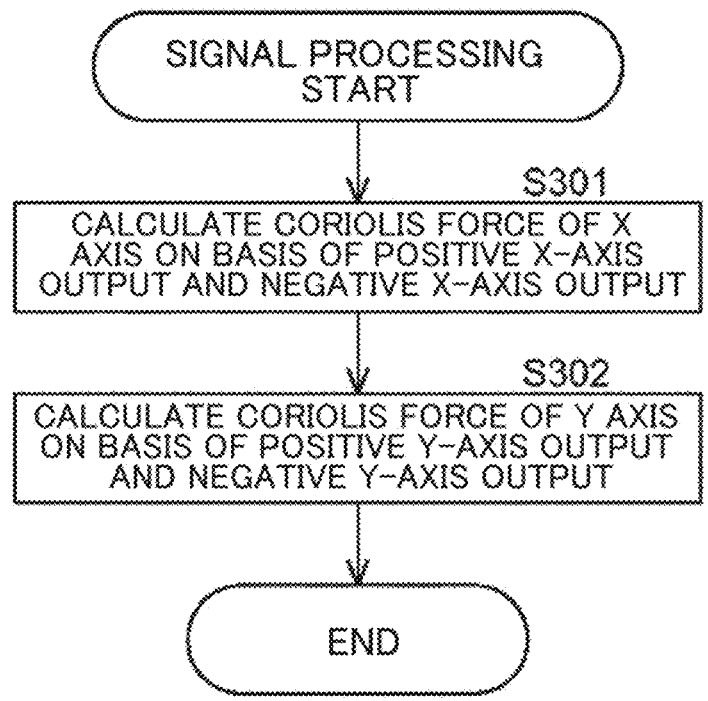
FIG. 47 is a flowchart illustrating signal processing using the multi-IMU illustrated in FIG. 46.

Next, signal processing of the IMU 200 illustrated in FIG. 46 will be described with reference to a flowchart illustrated in FIG. 47.

In Step S301, the calculation unit 661 accepts an output of the positive direction of the X-axis direction (X-axis output+) and an output of the negative direction of the X-axis direction (X-axis output−) among outputs of the IMU unit 610 and acquires an average value from a difference thereof and outputs the average value as a Coriolis force of the X axis.

In more detail, for example, by dividing a difference between a sum of detection outputs of the IMUs 201-101 and 201-104 and a sum of detection outputs of the IMU 201-102 and 201-103 by 2, the calculation unit 661 acquires an average value of the detection results of the four IMUs 201 as a Coriolis output of the X-axis direction in which a shock component of the X-axis direction is canceled.

In Step S302, the calculation unit 662 accepts an output of the positive direction of the Y-axis direction (Y-axis output+) and an output of the negative direction of the Y-axis direction (Y-axis output−) among outputs of the IMU unit 610 and acquires an average value from a difference thereof and outputs the average value as a Coriolis force of the Y axis.

In more detail, for example, by dividing a difference between a sum of detection outputs of the IMUs 201-101 and 201-104 and a sum of detection outputs of the IMU 201-102 and 201-103 by 2, the calculation unit 662 acquires an average value of the detection results of the four IMUs 201 as a Coriolis output of the Y-axis direction in which a shock component of the Y-axis direction is canceled.

In accordance with the process described above, in both directions of the X-axis direction and the Y-axis direction, by performing calculation using a difference between detection outputs of the IMUs 201-101 and 201-104 and detection outputs of the IMUs 201-102 and 201-103, even when there is a shock component in any one of the X-axis direction and the Y-axis direction, it can be appropriately canceled.

18. First Modified Example of Fourth Embodiment

<Countermeasure for Shock in X-Axis Direction Using Plurality of IMU Units>

In the description presented above, although an example in which a multi-IMU 200 is realized by configuring the IMU unit 610 using four IMUs 201 has been described, a multi-IMU 200 in which the number of IMUs 201 is increased in units of IMU units 610 may be realized.

Figure 48:
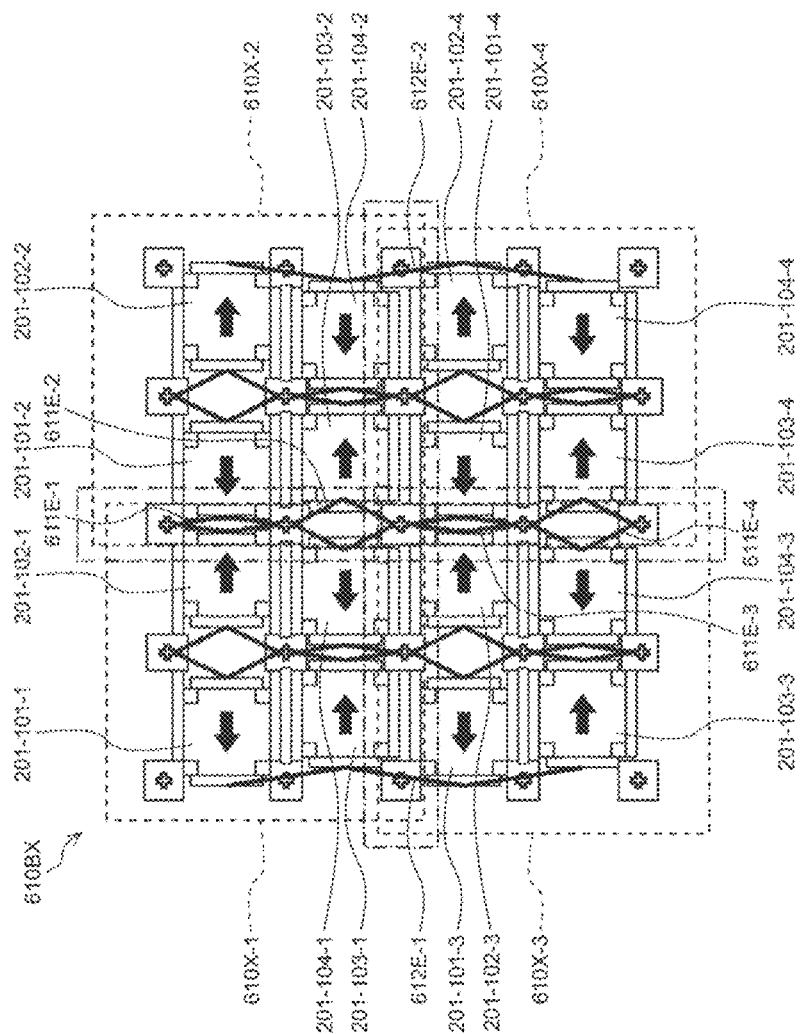
FIG. 48 is a diagram illustrating a configuration example of an IMU block of the multi-IMU according to a first modified example of the fourth embodiment of the present disclosure that cancels a shock in the X-axis direction.

FIG. 48 is a configuration example of a multi-IMU 200 in which a shock in the X-axis direction can be canceled when an IMU block 610B is configured such that four IMU units 610 are arranged as 2×2.

The IMU block 610B illustrated in FIG. 48 is composed of IMU units 610-1 to 610-4. In the IMU block 610B illustrated in FIG. 48, in order to represent a driving mechanism of the X-axis direction of each of the IMU units 610-1 to 610-4, the IMU block 610B and the IMU units 610-1 to 610-4 are respectively denoted as an IMU block 610BX and IMU units 610X-1 to 610X-4 in the drawing.

In other words, in the IMU block 610BX illustrated in FIG. 48, four units of IMU units 610 each including four IMUs 201 are disposed, and thus the IMU block 610BX is composed of a total of 16 IMUs 201 including 4 IMUs in the horizontal direction×4 IMUs in the vertical direction.

The driving mechanism of the X-axis direction of the IMU 201 configuring each of the IMU units 610X-1 to 610X-4 is similar to the component described with reference to FIG. 44.

However, a connection beam 612E-1 connecting an IMU 201-103-1 on a lower left side in the IMU unit 610X-1 and an IMU 201-101-3 on an upper left side in the IMU unit 610X-3 and a connection beam 612E-2 connecting an IMU 201-104-2 on a lower right side in the IMU unit 610X-2 and an IMU 201-102-4 on an upper right side in the IMU unit 610X-4 are newly provided.

In addition, in a connection portion between the IMU unit 610X-1 and the IMU unit 610X-2, instead of the connection beam 612 thereof, two connection beams 611E-1 and 611E-2 connecting IMUs 201 adjacent to each other in a horizontal direction are vertically disposed, and, similarly, in a connection portion between the IMU unit 610X-3 and the IMU unit 610X-4, connection beams 611E-3 and 611E-4 are disposed. In other words, in the multi-IMU 200 illustrated in FIG. 48, four connection beams 611E-1 to 611E-4 surrounded by a dash-dot line are newly disposed.

The connection beam 612E-1 includes a driving mechanism similar to that of the connection beam 612-1 illustrated in FIG. 44, and the connection beam 612E-2 includes a driving mechanism similar to that of the connection beam 612-2 illustrated in FIG. 44.

For this reason, a total of 16 IMUs 201 including four IMUs in the horizontal direction×four IMUs in the vertical direction that configure the multi-IMU 200 illustrated in FIG. 48 are driven at a synchronized drive frequency, and IMUs 201 that are adjacent to each other in the horizontal and the vertical direction are driven in opposite phases with respect to the X-axis direction, and IMUs 201 that are adjacent to each other in a left obliquely upward direction, a left obliquely downward direction, a right obliquely upward direction, and a right obliquely downward direction are driven in the same phase with respect to the X-axis direction.

Then, detection results of IMUs 201 driven in the same phase among IMUs 201 configuring each of the IMU units 610X-1 to 610X-4 of the multi-IMU 200 are added, a difference between detection results of IMUs 201 driven in opposite phases is taken, and an average value or the like is acquired, whereby an angular velocity and an acceleration are acquired.

As a result, even when a situation in which a shock is applied in the X-axis direction occurs, by taking a difference between detection results acquired by the IMUs 201 driven in opposite phases in the X-axis direction, a shock component in the X-axis direction is canceled, and thus an influence of the shock can be inhibited.

In addition, in the multi-IMU 200 illustrated in FIG. 48, the number of used IMUs 201 is larger than that of the multi-IMU 200 illustrated in FIG. 44, and thus an angular velocity and an acceleration can be detected with higher accuracy.

<Countermeasure for Shock in Y-Axis Direction Using Plurality of IMU units>

Figure 49:
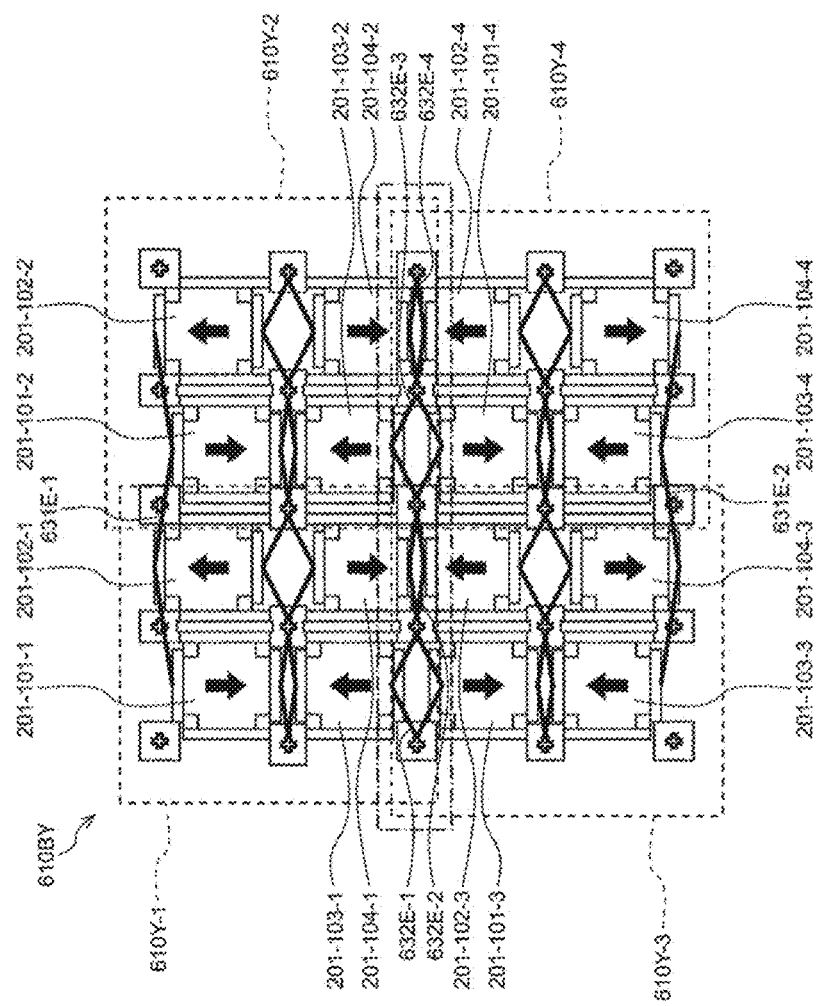
FIG. 49 is a diagram illustrating a configuration example of an IMU block of the multi-IMU according to a first modified example of the fourth embodiment of the present disclosure that cancels a shock in the Y-axis direction.

FIG. 49 is a configuration example of an IMU block 610B in which a shock in the Y-axis direction can be canceled when four IMU units 610 are arranged as 2×2.

The IMU block 610B illustrated in FIG. 49 is composed of IMU units 610-1 to 610-4. In FIG. 49, in order to represent a driving mechanism of the Y-axis direction of each of the IMU units 610-1 to 610-4, the IMU block 610B and the IMU units 610-1 to 610-4 are respectively denoted as an IMU block 610BY and IMU units 610Y-1 to 610Y-4 in the drawing.

In other words, in the IMU block 610BY illustrated in FIG. 49, four units of IMU units 610 each including four IMUs 201 are disposed, and thus the IMU block 610BY is composed of a total of 16 IMUs 201 including 4 IMUs in the horizontal direction×4 IMUs in the vertical direction.

The driving mechanism of the Y-axis direction of the IMU 201 configuring each of the IMU units 610Y-1 to 610Y-4 is similar to the component described with reference to FIG. 45.

However, a connection beam 631E-1 connecting an IMU 201-102-1 on an upper right side in the IMU unit 610Y-1 and an IMU 201-101-2 on an upper left side in the IMU unit 610Y-2 and a connection beam 631E-2 connecting an IMU 201-103-3 on a lower right side in the IMU unit 610Y-3 and an IMU 201 on a lower left side in the IMU unit 610Y-4 are newly provided.

In addition, in a connection portion between the IMU unit 610Y-1 and the IMU unit 610Y-3, instead of the connection beam 631 thereof, connection beams 632E-1 and 632E-2 connecting IMUs 201 adjacent to each other in the vertical direction are disposed, and, similarly, in a connection portion between the IMU unit 610Y-2 and the IMU unit 610Y-4, connection beams 632E-3 and 632E-4 are disposed. In other words, four connection beams 632E-1 to 632E-4 surrounded by a dash-dot line are newly disposed.

The connection beam 631E-1 includes a driving mechanism similar to that of the connection beam 631-1 illustrated in FIG. 45, and the connection beam 631E-2 includes a driving mechanism similar to that of the connection beam 631-2 illustrated in FIG. 45.

For this reason, a total of 16 IMUs 201 including four IMUs in the horizontal direction×four IMUs in the vertical direction that configure the IMU block 610BY illustrated in FIG. 49 are driven at a synchronized drive frequency, and IMUs 201 that are adjacent to each other in the horizontal and the vertical direction are driven in opposite phases with respect to the Y-axis direction, and IMUs 201 that are adjacent to each other in a left obliquely upward direction, a left obliquely downward direction, a right obliquely upward direction, and a right obliquely downward direction are driven in the same phase with respect to the Y-axis direction.

Then, detection results of IMUs 201 driven in the same phase among IMUs 201 configuring each of the IMU units 610Y-1 to 610Y-4 of the multi-IMU 200 are added, a difference between detection results of IMUs 201 driven in opposite phases is taken, and an average value or the like is acquired, whereby an angular velocity and an acceleration are acquired.

As a result, even when a situation in which a shock is applied in the Y-axis direction occurs, by taking a difference between detection results acquired by the IMUs 201 driven in opposite phases in the Y-axis direction, a shock component in the Y-axis direction is canceled, and thus an influence of the shock can be inhibited.

In addition, in the multi-IMU 200 illustrated in FIG. 49, the number of used IMUs 201 is larger than that of the multi-IMU 200 illustrated in FIG. 45, and thus an angular velocity and an acceleration can be detected with higher accuracy.

The signal processing performed by the multi-IMU 200 illustrated in FIGS. 48 and 49 can be realized by signal processing described with reference to the flowchart illustrated in FIG. 47 by disposing the signal processing unit 651 illustrated in FIG. 46 for each IMU unit 610.

For this reason, description of the signal processing performed by the multi-IMU 200 illustrated in FIGS. 48 and 49 will be omitted.

19. Second Modified Example of Fourth Embodiment

In the description presented above, although an example in which four IMU units 610 are disposed, and the multi-IMU 200 is realized using signal processing results of the IMU units 610 has been described, time divisional processing may be performed by outputting a detection result of each of the four IMU units 610 in a channel through switching.

Figure 50:
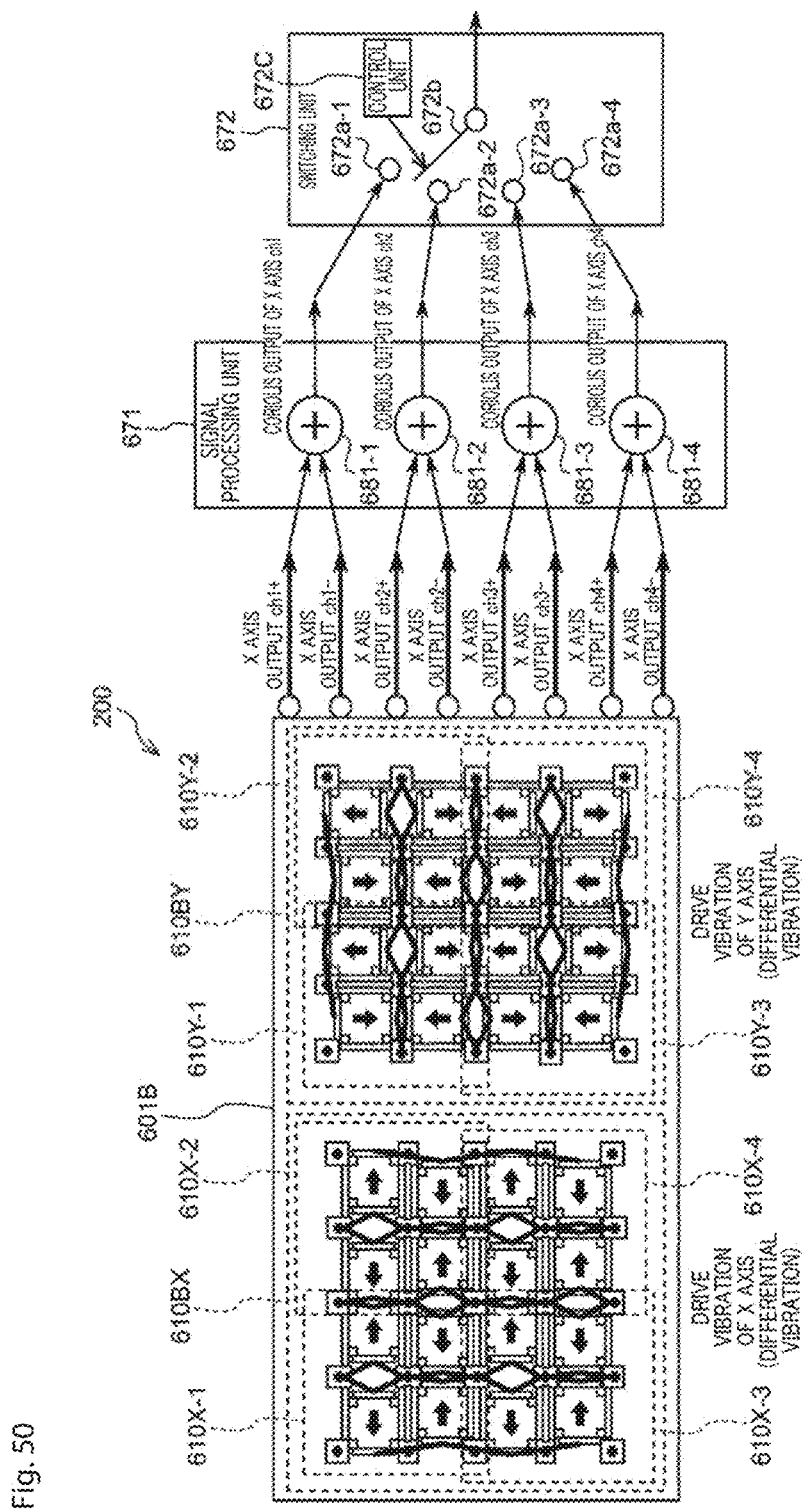
FIG. 50 is a diagram illustrating a configuration example of a case in which Coriolis forces output from a plurality of IMU blocks of the multi-IMU according to the second modified example of the fourth embodiment of the present disclosure are time-divisionally output.

FIG. 50 illustrates a configuration example of a multi-IMU 200 in which detection results of four IMU units 610 are time-divisionally processed as output signals of four channels.

The multi-IMU 200 illustrated in FIG. 50 is composed of an IMU block 610B, a signal processing unit 671, and a switching unit 672.

A driving mechanism of the IMU block 610B is formed by a driving mechanism of the X-axis direction represented in an IMU block 610BX and a driving mechanism of the Y-axis direction represented in an IMU block 610BY.

As illustrated in FIG. 48, the IMU block 610BX is composed of IMU units 610X-101 to 610X-4.

The IMU units 610X-1 to 610X-4 output detection outputs as signals of channels 1 to 4.

In other words, the IMU unit 610X-1 outputs an output of the positive direction of the X-axis direction (X-axis output ch1+) and an output of the negative direction of the X-axis direction (X-axis output ch1−) as channel 1 (ch1).

The IMU unit 610X-2 outputs an output of the positive direction of the X-axis direction (X-axis output ch2+) and an output of the negative direction of the X-axis direction (X-axis output ch2−) as channel 2 (ch2).

The IMU unit 610X-3 outputs an output of the positive direction of the X-axis direction (X-axis output ch3+) and an output of the negative direction of the X-axis direction (X-axis output ch3−) as channel 3 (ch3).

The IMU unit 610X-4 outputs an output of the positive direction of the X-axis direction (X-axis output ch4+) and an output of the negative direction of the X-axis direction (X-axis output ch4−) as channel 4 (ch4).

As illustrated in FIG. 49, the IMU block 610BY is composed of IMU units 610Y-1 to 610Y-4.

The IMU units 610Y-1 to 610Y-4 outputs detection outputs as signals of channels 1 to 4.

In other words, although not illustrated in the drawing, the IMU unit 610Y-1 outputs an output of the positive direction of the Y-axis direction (Y-axis output ch1+) and an output of the negative direction of the Y-axis direction (Y-axis output ch1−) to the signal processing unit 671 as channel 1 (ch1).

The IMU unit 610Y-2 outputs an output of the positive direction of the Y-axis direction (Y-axis output ch2+) and an output of the negative direction of the Y-axis direction (Y-axis output ch2−) to the signal processing unit 671 as channel 2 (ch2).

The IMU unit 610Y-3 outputs an output of the positive direction of the Y-axis direction (Y-axis output ch3+) and an output of the negative direction of the Y-axis direction (Y-axis output ch3−) to the signal processing unit 671 as channel 3 (ch3).

The IMU unit 610Y-4 outputs an output of the positive direction of the Y-axis direction (Y-axis output ch4+) and an output of the negative direction of the Y-axis direction (Y-axis output ch4−) to the signal processing unit 671 as channel 4 (ch4).

The signal processing unit 671 includes calculation units 681-1 to 681-4, and the calculation units 681-1 to 681-4 respectively accept outputs of channels 1 to 4 of the positive direction and the negative direction for the X axis from the IMU block BX and perform signal processing.

In more detail, the calculation unit 681-1 accepts an output of the positive direction of the X-axis direction (X-axis output ch1+) and an output of the negative direction of the X-axis direction (X-axis output ch1−) of channel 1 (ch1) among outputs of the IMU unit 610, acquires a difference thereof, acquires an average value thereof, and outputs the average value as a Coriolis force (ch1) of the X axis to the switching unit 672.

The calculation unit 681-2 accepts an output of the positive direction of the X-axis direction (X-axis output ch2+) and an output of the negative direction of the X-axis direction (X-axis output ch2−) of channel 2 (ch2) among outputs of the IMU unit 610, acquires a difference thereof, acquires an average value thereof, and outputs the average value as a Coriolis force (ch2) of the X axis to the switching unit 672.

The calculation unit 681-3 accepts an output of the positive direction of the X-axis direction (X-axis output ch3+) and an output of the negative direction of the X-axis direction (X-axis output ch3−) of channel 3 (ch3) among outputs of the IMU unit 610, acquires a difference thereof, acquires an average value thereof, and outputs the average value as a Coriolis force (ch3) of the X axis to the switching unit 672.

The calculation unit 681-4 accepts an output of the positive direction of the X-axis direction (X-axis output ch4+) and an output of the negative direction of the X-axis direction (X-axis output ch4−) of channel 4 (ch4) among outputs of the IMU unit 610, acquires a difference thereof, acquires an average value thereof, and outputs the average value as a Coriolis force (ch4) of the X axis to the switching unit 672.

The switching unit 672 outputs Coriolis forces of the X axis of four channels supplied from the signal processing unit 671 to a later stage in the time divisional manner.

In more detail, the switching unit 672 includes terminals 672a-1 to 672a-4, a switch 672b, and a control unit 672c.

The terminals 672a-1 to 672a-4 respectively accept outputs of Coriolis forces of the X axis of channels 1 to 4 from the signal processing unit 671.

The switch 672b is controlled by the control unit 672c and has connection with the terminals 672a-1 to 672a-4 being switched at predetermined time intervals and thus outputs Coriolis forces of the X axis of four channels to a later stage in a time divisional manner.

The Coriolis forces of the X-axis direction corresponding to four channels that are output from the IMU block 610BX can be sequentially output through switching at a period of four times, and thus a configuration required for detecting a Coriolis force of the X-axis direction in a later stage can be reduced to ¼.

In addition, although not illustrated in the drawing, a signal processing unit that accepts outputs of four channels of the positive direction of the Y-axis direction and outputs of four channels of the negative direction of the Y-axis direction from the IMU block 610BY for the Y-axis direction and performs signal processing and a switching unit that outputs of Coriolis forces of the Y-axis direction corresponding to four channels of the signal processing unit to a later stage in a time divisional manner are disposed as well.

<Signal Processing Using Multi-IMU Illustrated in FIG. 50>

Figure 51:
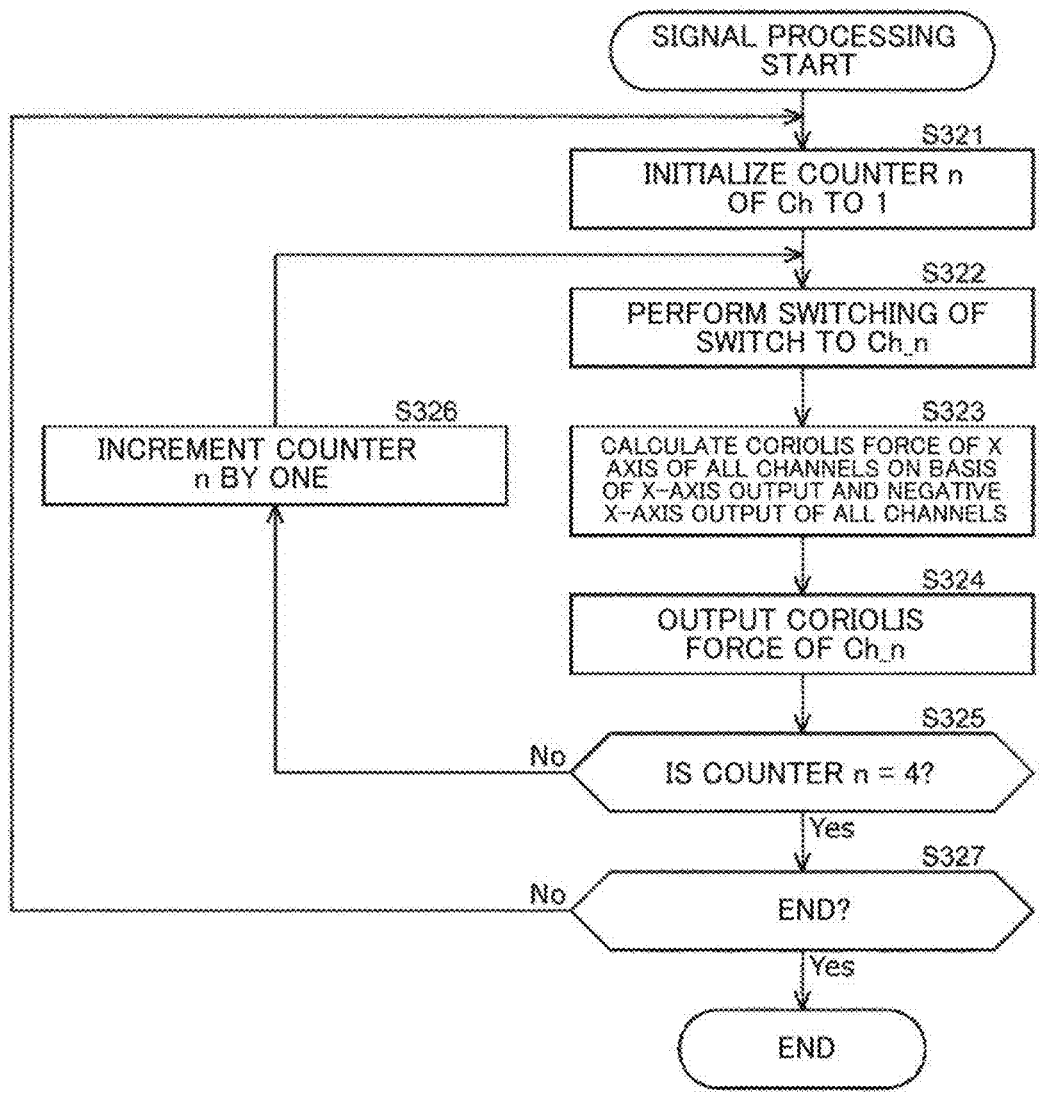
FIG. 51 is a flowchart illustrating signal processing using the multi-IMU illustrated in FIG. 50.

Next, the signal processing using the multi-IMU illustrated in FIG. 50 will be described with reference to a flowchart illustrated in FIG. 51.

In Step S321, the control unit 672c of the switching unit 672 initializes a counter n counting a channel to 1.

In Step S322, the control unit 672c is connected to the terminal 672b-n by controlling the switch 672b on the basis of the counter n.

In Step S323, the calculation units 681-1 to 681-4 of the signal processing unit 651 calculate Coriolis forces of the X-axis direction of channels 1 to 4 and output the Coriolis forces to the switching unit 672.

In Step S324, the switching unit 672 outputs a Coriolis force of the X-axis direction of channel n supplied from the signal processing unit 671 to a later stage through the terminal 672b-n to which the switch 672b is connected.

In Step S325, the control unit 672c determines whether or not the counter n is 4 and, in a case in which the counter n is not 4, the process proceeds to Step S326.

In Step S326, the control unit 672c increments the counter n by one, and the process returns to Step S322.

In other words, until the counter n becomes 4, channel n is sequentially switched by one each time, and a Coriolis force in the X-axis direction of a corresponding channel is switched and is output to a later stage.

Then, in Step S325, the counter n is 4, the process proceeds to Step S327.

In Step S327, the control unit 672c determines whether or not ending of the processing is instructed, and, in a case in which ending is not instructed, the process returns to Step S321, and subsequent processes are repeated.

In other words, the channel can be switched to 1 to 4 until the ending of the processing is instructed, and a Coriolis force in the X-axis direction of a corresponding channel is output.

Then, in Step S327, in a case in which ending of the processing is instructed, the processing ends.

In accordance with the process described above, each Coriolis force in the X-axis direction corresponding to the IMU unit 610, which has been divided into four channels, is sequentially switched and is output to a later stage, and thus a configuration required for wave detection corresponding to each channel in a later stage can be reduced to ¼.

In addition, although a similar process is performed for a Coriolis force in the Y-axis direction, only the axis direction is different, the process is basically similar, and thus description thereof will be omitted.

20. Third Modified Example of Fourth Embodiment

<Multi-IMU in which for Shock in Z-Axis Direction is Further Configured>

In the description presented above, although a configuration example of the multi-IMU 200 in which countermeasures for a shock in the X-axis direction and the Y-axis direction are configured has been described, a countermeasure for a shock in the Z-axis direction may be further configured.

Figure 52:
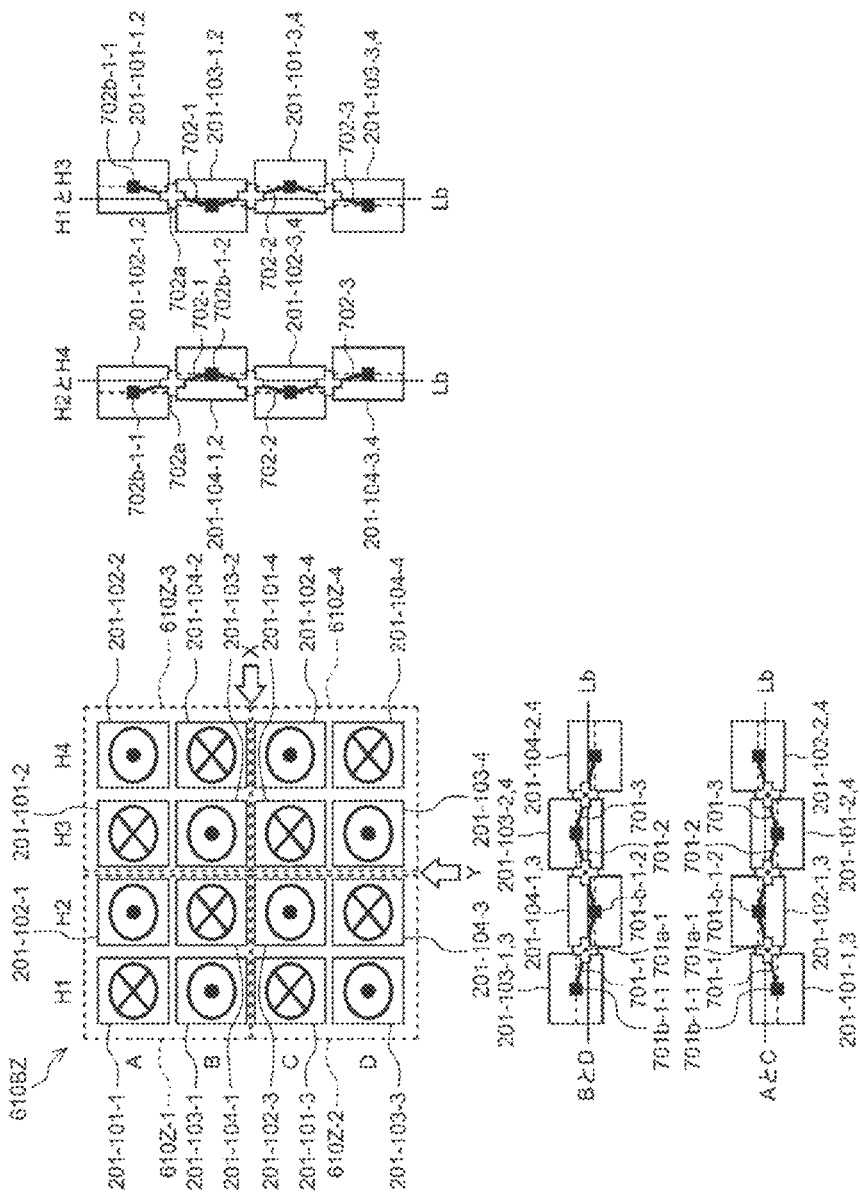
FIG. 52 is a diagram illustrating a configuration example of an IMU block of the multi-IMU according to a third modified example of the fourth embodiment of the present disclosure that cancels a shock in a Z-axis direction.

FIG. 52 illustrates a configuration of an IMU block 610B of a multi-IMU 200 in which a shock in the Z-axis direction can be canceled.

The IMU block 610B illustrated in FIG. 52 is composed of IMU units 610-1 to 610-4. In the IMU block 610B illustrated in FIG. 52, in order to represent a driving mechanism of the Z-axis direction of each of the IMU units 610-1 to 610-4, the IMU block 610B and the IMU units 610-1 to 610-4 are respectively denoted as an IMU block 610BZ and IMU units 610Z-1 to 610Z-4 in the drawing.

In other words, in the IMU block 610BZ illustrated in FIG. 52, four units formed from IMU units 610Z-1 to 610Z-4 each including four IMUs 201-101 to 104 are disposed, and thus the IMU block 610BZ is composed of a total of 16 IMUs 201 including 4 IMUs in the horizontal direction×4 IMUs in the vertical direction.

In more detail, in FIG. 52, the IMU unit 610Z-1 includes an IMU 201-101-1 to an IMU 201-104-1, the IMU unit 610Z-2 includes an IMU 201-101-2 to an IMU 201-104-2, the IMU unit 610Z-3 includes an IMU 201-101-3 to an IMU 201-104-3, and the IMU unit 610Z-4 includes an IMU 201-101-4 to an IMU 201-104-4.

The IMU 201 included in the IMU block 610BZ configuring the multi-IMU 200 illustrated in FIG. 52 reciprocally vibrates in the Z-axis direction at a predetermined drive frequency in a range of a position moved to the front side from a sheet face by a predetermined distance and a position moved to a rear side of the sheet face by a predetermined distance when the sheet face in the drawing is set as a base position in the Z-axis direction.

In an upper left part of FIG. 52, an IMU 201 to which a mark "x" is attached represents a state in which the IMU 201 has moved to a rear side from the sheet face that is the base position, and an IMU 201 to which a black circle is attached represents a state in which the IMU 201 has moved to the front side from the sheet face that is the base position.

In an upper right part of FIG. 52, a left side represents a cross-section of a side face of an H2-th column and an H4-th column of the IMU block 610BZ seen in the X-axis direction on the right side in the drawing, and a right side represents a cross-section of a side face of an H1-th column and an H3-th column of the IMU block 610BZ seen in the X-axis direction on the right side in the drawing.

In addition, in a lower left part of FIG. 52, an upper stage represents a cross-section of a side face of a B-th row and a D-th row of the IMU block 610BZ seen in the Y-axis direction on a lower side in the drawing, and a lower stage represents a cross-section of a side face of an A-th row and a C-th row of the IMU block 610BZ seen in the Y-axis direction on the lower side in the drawing.

Here, four rows of 16 IMUs 201 configuring the IMU block 610BZ of an upper left part of FIG. 52 in a vertical direction in the drawing are represented as four rows of the A-th row to the D-th row, and four columns in the horizontal direction are represented as the H1-th column to the H4-th column.

In other words, as illustrated in the lower stage of the lower left part of FIG. 52, the A-th row is composed of an IMU 201-101-1, an IMU 201-102-1, an IMU 201-101-2, and an IMU 201-102-2 from the left in the drawing, and the IMUs are connected to connection beams 701-1 to 701-3.

The connection beam 701-1 is configured from frames and the like, has a center axis 701a-1 fixed to a base position Lb, and IMUs 201-101-1 and 201-102-1 adjacent to each other are respectively connected to both end portions 701b-1-1 and 701b-1-2.

For example, when the IMU 201-101-1 connected to one end portion 701b-1-1 moves by a predetermined distance in a negative direction (for example, a rear side from the sheet face that is the base position Lb (a lower side in the drawing in a lower left part of FIG. 52)) with respect to the Z-axis direction, the connection beam 701-1 rotates around a center axis 701a-1 as an axis and moves the IMU 201-102-1 connected to the other end portion 701b-1-2 by a predetermined distance in a positive direction (for example, a front side from the sheet face that is the base position Lb (an upper side in the drawing in the lower left part of FIG. 52)) with respect to the Z-axis direction.

To the contrary, for example, when the IMU 201-101-1 connected to one end portion 701b-1-1 moves by a predetermined distance in a positive direction (for example, a front side from the sheet face that is the base position Lb (an upper side in the drawing in the lower left part of FIG. 52)) with respect to the Z-axis direction, the connection beam 701-1 rotates around the center axis 701a-1 as an axis and moves the IMU 201-102-1 connected to the other end portion 701b-1-2 by a predetermined distance in a negative direction (for example, a rear side from the sheet face that is the base position Lb (a lower side in the drawing in the lower left part of FIG. 52)) with respect to the Z-axis direction.

The connection beams 701-2 and 701-3 are composed of similar driving mechanisms. For this reason, among the IMU 201-101-1, the IMU 201-102-1, the IMU 201-101-2, and the IMU 201-102-2 configuring the A-th row, the IMU 201-101-1 and the IMU 201-102-1 are driven in synchronization with each other in the same phase in the positive or negative direction of the Z-axis direction by the driving mechanisms of the connection beams 701-1 to 701-3, and the IMU 201-101-2 and the IMU 201-102-2 are driven in synchronization with each other in the same phase in the positive or negative direction of the Z-axis direction.

In addition, the IMU 201-101-1 and the IMU 201-102-1 and the IMU 201-101-2 and the IMU 201-102-2 are driven in synchronization with each other to be in opposite phases in the Z-axis direction.

In addition, as illustrated in the right side of the upper right part of FIG. 52, the IMU 201-101-1, the IMU 201-103-1, the IMU 201-101-3, and the IMU 201-103-3 configuring the H1-th column are respectively connected to the connection beams 702-1 to 702-3.

The connection beam 702-1 is configured from frames and the like, has a center axis 702a-1 fixed to the base position Lb, and IMUs 201-101-1 and 201-103-1 adjacent to each other are respectively connected to both end portions 702b-1-1 and 702b-1-2.

For example, when the IMU 201-101-1 connected to one end portion 702b-1-1 moves by a predetermined distance in a negative direction (for example, a rear side from the sheet face that is the base position Lb, in other words, a right side of the base position Lb in the upper right part of FIG. 52) with respect to the Z-axis direction, the connection beam 702-1 rotates around a center axis 702a-1 as an axis and moves the IMU 201-103-1 connected to the other end portion 702b-1-2 by a predetermined distance in a positive direction (for example, a front side from the sheet face that is the base position Lb, in other words, a left side of the base position Lb in the upper right part of FIG. 52) with respect to the Z-axis direction.

To the contrary, for example, when the IMU 201-101-1 connected to one end portion 702b-1-1 moves by a predetermined distance in the positive direction (for example, a front side from the sheet face that is the base position Lb, in other words, a right side of the base position Lb in the upper right part of FIG. 52) with respect to the Z-axis direction, the connection beam 702-1 rotates around the center axis 702a-1 as an axis and moves the IMU 201-103-1 connected to the other end portion 702b-1-2 by a predetermined distance in the negative direction (for example, a rear side from the sheet face that is the base position Lb, in other words, a left side of the base position Lb in the upper right part of FIG. 52) with respect to the Z-axis direction.

The connection beams 702-2 and 702-3 are composed of similar driving mechanisms. For this reason, among the IMU 201-101-1, the IMU 201-103-1, the IMU 201-101-3, and the IMU 201-103-3 configuring the H1-th column, the IMU 201-101-1 and the IMU 201-101-3 are driven in synchronization with each in the positive or negative direction of the Z-axis direction by the driving mechanisms of the connection beams 702-1 to 702-3, and the IMU 201-103-1 and the IMU 201-103-3 are driven in synchronization with each other in the same phase in the positive or negative direction of the Z-axis direction.

In addition, the IMU 201-101-1 and the IMU 201-101-3 and the IMU 201-103-1 and the IMU 201-103-3 are driven in synchronization with each other to be in opposite phases in the Z-axis direction.

The IMU 201 configuring each of the A-th row to the D-th row is composed of a driving mechanism similar to that of the IMU 201 of the A-th row. For example, as illustrated in an upper stage of the lower left part of FIG. 52, the IMUs 201 of the B-th row and the D-th row are driven in an opposite phase of the IMU 201 of the A-th row in the Z-axis direction, and, as illustrated in the lower stage of the lower left part of FIG. 52, the IMU 201 of the C-th row is driven in the same phase as the IMU 201 of the A-th row in the Z-axis direction.

The IMU configuring each of the H1-th column to the H4-th column is composed of a driving mechanism similar to that of the IMU 201 of the H1-th column. For this reason, as illustrated on the left side of the upper right part of FIG. 52, the IMUs 201 of the H2-th column and the H4-th column are driven in an opposite phase of the IMU 201 of the H1-th column in the Z-axis direction, and, as illustrated on the right side of the upper right part of FIG. 52, the IMU 201 of the H3-th column is driven in the same phase as the IMU 201 of the H1-th column in the Z-axis direction.

In accordance with such a drive configuration, adjacent IMUs 201 disposed in the A-th row to the D-th row configuring the IMU block 610BZ in the X-axis direction are alternately driven in opposite phases having the base position Lb as its center in the Z-axis direction. In addition, adjacent IMUs 201 disposed in the H1-th column to the H4-th column in the Y-axis direction are alternately driven in opposite phases having the base position Lb as its center in the Z-axis direction.

As a result, IMUs 201 configuring the IMU block 610BZ are driven in synchronization with the IMUs 201 adjacent in the vertical direction and the horizontal direction in the Z-axis direction in opposite phases and are driven in synchronization with the IMUs 201 that are adjacent in a left obliquely upward direction, a left obliquely downward direction, a right obliquely upward direction, and a right obliquely downward direction in the Z-axis direction in the same phase.

FIG. 52 illustrates a drive direction of each IMU 201 when the IMU 201-101-1 moves by a predetermined distance in the negative direction (for example, a rear side from the sheet face that is the base position Lb, in other words, a right side of the base position Lb in the upper right part of FIG. 52) in the Z-axis direction. Thus, when the IMU 201-101-1 moves by a predetermined distance in the positive direction (for example, a front side from the sheet face that is the base position Lb, in other words, a left side of the base position Lb in the upper right part of FIG. 52) in the Z-axis direction, a drive direction of each IMU 201 illustrated in FIG. 52 in the Z-axis direction changes to an opposite direction.

<Variation of Connection Beam>

Example in which Connection Beam is Connected to Side Face of IMU

In the IMU block 610BZ configuring an IMU 201 canceling a shock in the Z-axis direction, variations in the connection beams 701 and 702 may be considered in accordance with connection positions to which the connection beams are connected in the IMU 201.

Figure 53:
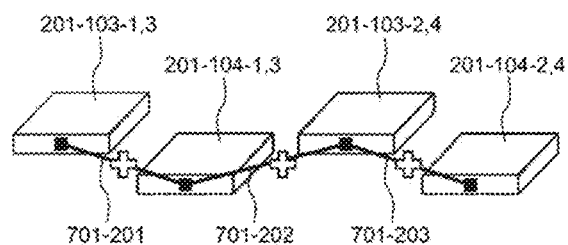
FIG. 53 is a diagram illustrating variations in connection beams in the IMU block illustrated in FIG. 52.

For example, as illustrated in FIG. 53, center portions of side faces of IMUs 201 and end portions of the connection beams 701-201 to 701-203 may be connected such that the IMUs 201-103-1, 201-104-1, 201-103-2, 201-104-2 are connected to the connection beams 701-201 to 701-203.

Example in which Connection Beams are Connected to Center Positions of IMUs

Figure 54:
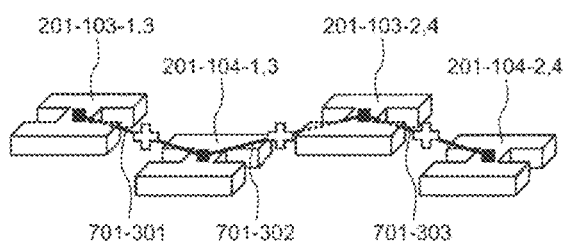
FIG. 54 is a diagram illustrating variations in connection beams in the IMU block illustrated in FIG. 52.

In addition, for example, as illustrated in FIG. 54, center positions of IMUs 201 and end portions of the connection beams 701-301 to 701-303 may be connected such that the IMUs 201-103-1, 201-104-1, 201-103-2, 201-104-2 are connected to the connection beams 701-301 to 701-303.

In such a case, interferences with an IMU 201 main body relating to driving of the connection beam 701 needs to be considered, and thus, for example, as illustrated in FIG. 54, in order to avoid interferences relating to driving of the connection beam 701, the IMU 201 may be formed in an H shape when seen from the top face so that the interferences relating to driving of the connection beam 701 can be avoided.

In addition, signal processing for acquiring a Coriolis force in the Z-axis direction is processing that is similar to the signal processing for acquiring a Coriolis force in the X-axis direction described with reference to the flowchart illustrated in FIG. 51, and thus description thereof will be omitted.

21. Fourth Modified Example of Fourth Embodiment

In the signal processing described above, although the process in which a channel is switched by the switching unit 672 after signal processing is performed by the signal processing unit 671 has been described, signal processing may be performed after the output channel of each IMU unit 610 is switched.

Figure 55:
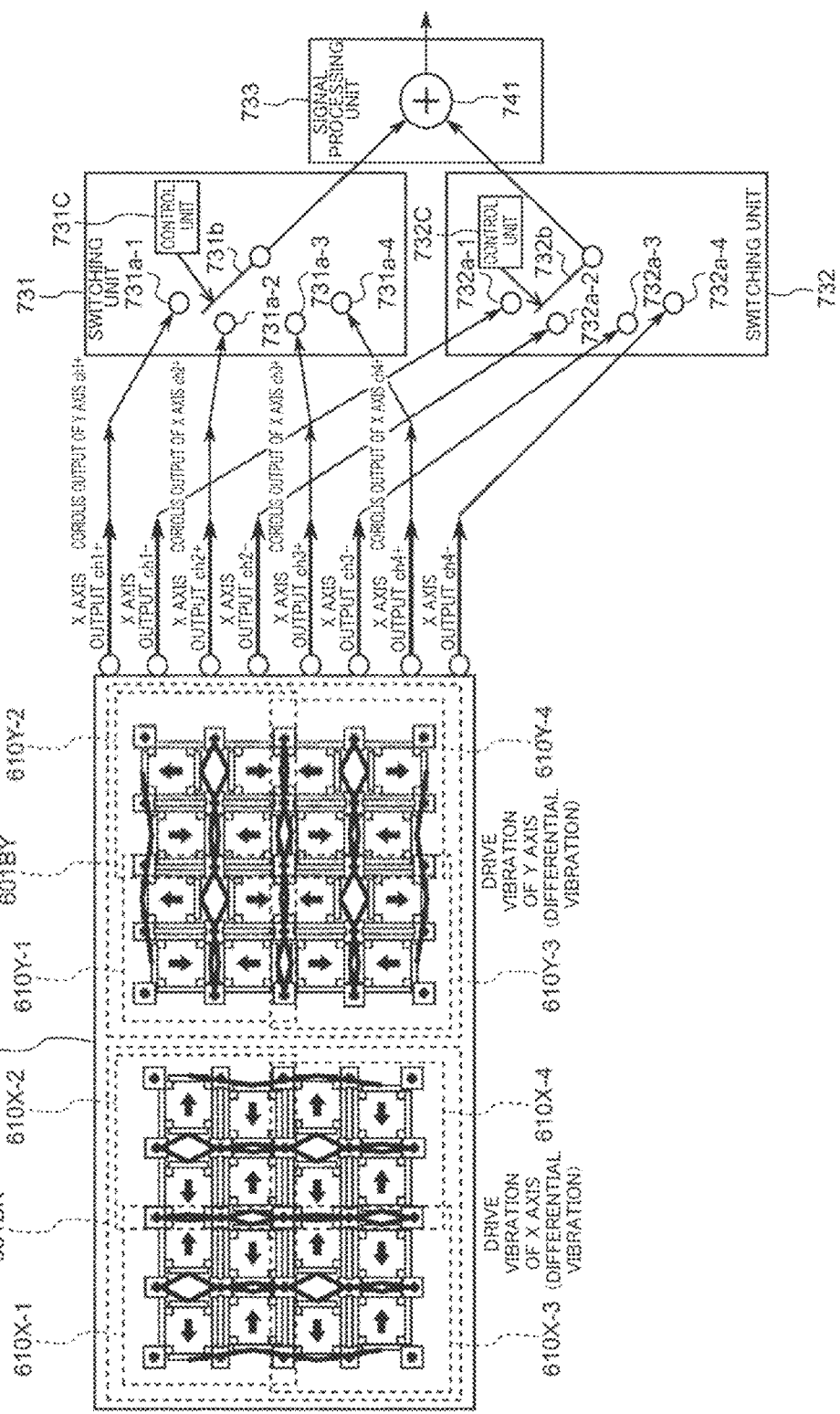
FIG. 55 is a diagram illustrating a configuration example of an IMU block of the multi-IMU according to a fourth modified example of the fourth embodiment of the present disclosure that cancels a shock in the Z-axis direction.

FIG. 55 illustrates a configuration example of a multi-IMU 200 in which signal processing is performed after an output channel of each IMU unit 610 is switched.

In the multi-IMU 200 illustrated in FIG. 55, the same reference signs are assigned to components having the same functions as the components of the multi-IMU 200 illustrated in FIG. 50, and description thereof will be omitted.

In the multi-IMU 200 illustrated in FIG. 55, a difference from the multi-IMU 200 illustrated in FIG. 50 is in that switching units 731 and 732 and signal processing unit 733 are included in place of the signal processing unit 671 and the switching unit 672.

The switching unit 731 is configured using terminals 731a-1 to 731a-4, a switch 731b, and a control unit 731c.

The terminals 731a-1 to 731a-4 accept outputs of Coriolis forces of the positive direction of the X-axis direction of channels 1 to 4 that are outputs of IMU units 610X-1 to 610X-4 of an IMU block 610BX.

The switch 731b is controlled to be synchronized with the switching unit 732 by the control unit 731c and is sequentially switched to be connected to the terminals 731a-1 to 731a-4 and outputs of Coriolis forces of the positive direction of the X-axis direction of channels 1 to 4 that are outputs of the IMU units 610X-1 to 610X-4 to the signal processing unit 733.

The switching unit 732 is configured using terminals 732a-1 to 732a-4, a switch 732b, and a control unit 732c.

The terminals 732a-1 to 732a-4 accept outputs of Coriolis forces of the negative direction of the X-axis direction of channels 1 to 4 that are outputs of the IMU units 610X-1 to 610X-4 of the IMU block 610BX.

The switch 732b is controlled to be synchronized with the switching unit 731 by the control unit 732c and is sequentially switched to be connected to the terminals 732a-1 to 732a-4 and outputs of Coriolis forces of the negative direction of the X-axis direction of channels 1 to 4 that are outputs of the IMU units 610X-1 to 610X-4 to the signal processing unit 733.

The signal processing unit 733 includes a calculation unit 741, calculates a Coriolis force of each channel on the basis of a difference between Coriolis forces of the positive direction and Coriolis forces of the negative direction of the X-axis direction of channels 1 to 4 supplied from the switching units 731 and 732 in accordance with switching of channels through synchronization, and outputs the Coriolis forces by controlling the calculation unit 741.

In other words, in the switching units 731 and 732, switching of channels is performed in synchronization with each other, and thus the calculation unit 741 calculates a Coriolis force of each channel on the basis of a difference between a Coriolis force of the positive direction and a Coriolis force of the negative direction of the X-axis direction supplied from the switching units 731 and 732 through sequential switching of channels.

In the multi-IMU 200 illustrated in FIG. 55, signal processing is performed after switching of channels, and positive and negative Coriolis forces are calculated by switching the channels, whereby the number of components required for calculation processing in a later stage after the IMU block 610BX can be simplified to two, and a flicker noise can be reduced.

Although not illustrated in the drawing, components corresponding to the switching units 731 and 732 and the signal processing unit 733 for acquiring a Coriolis force of the Y-axis direction are also present in FIG. 55, and description thereof will be omitted.

In addition, components for the Z-axis direction may be similarly disposed.

<Signal Processing Using Multi-IMU Illustrated in FIG. 55>

Figure 56:
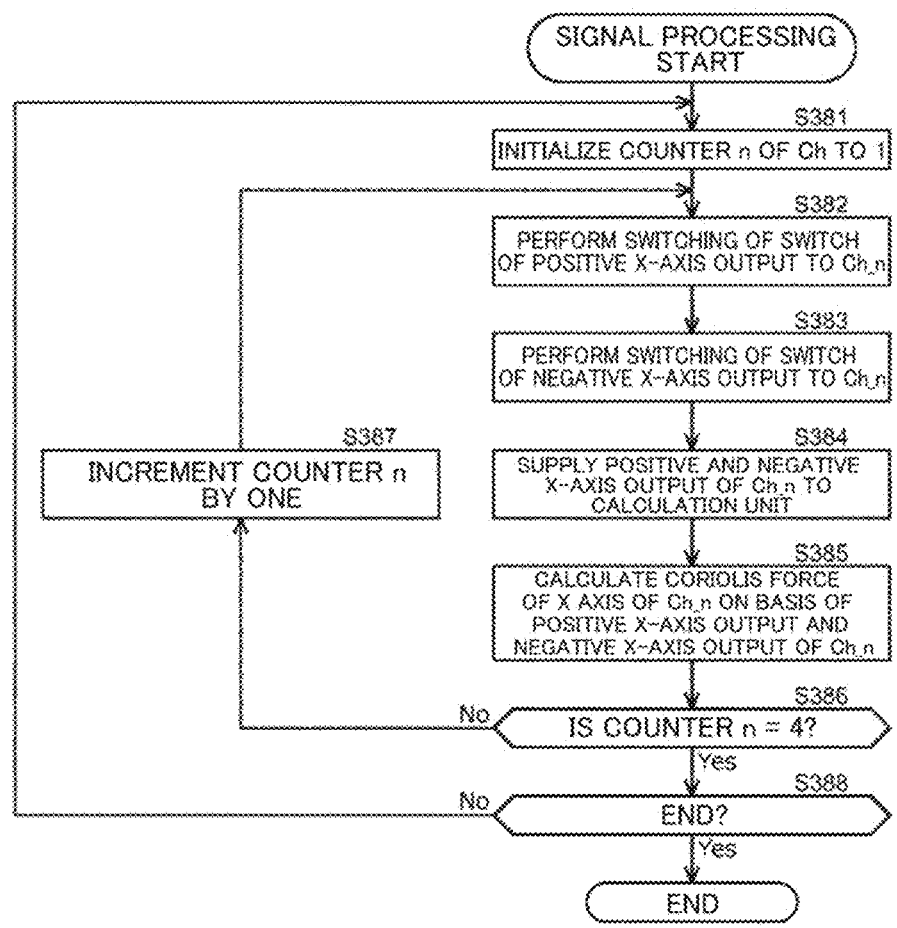
FIG. 56 is a flowchart illustrating signal processing using the multi-IMU illustrated in FIG. 55.

Next, signal processing using the multi-IMU illustrated in FIG. 55 will be described with reference to a flowchart illustrated in FIG. 56.

In Step S381, the control units 731c and 732c of the switching units 731 and 732 are synchronized with each other, and a counter n counting the channel is initialized to 1.

In Step S382, the control unit 731c is connected to the terminal 731a-n by controlling the switch 731b on the basis of the counter n.

In Step S383, the control unit 732c is connected to the terminal 732a-n by controlling the switch 732b on the basis of the counter n.

In Step S384, the switch 731b of the switching unit 731 supplies a Coriolis force of the positive direction of the X-axis direction of the channel n supplied to the terminal 731a-n to the signal processing unit 733, and the switch 732b of the switching unit 732 supplies a Coriolis force of the negative direction of the X-axis direction of the channel n supplied to the terminal 732a-n to the signal processing unit 733.

In Step S385, the calculation unit 741 of the signal processing unit 733 calculates a Coriolis force of the X-axis direction such that a shock is canceled on the basis of the Coriolis force of the positive direction of the X-axis direction of channel n supplied from the switching unit 731 and the Coriolis force of the negative direction of the X-axis direction of channel n supplied from the switching unit 732 and outputs the calculated Coriolis force.

In Step S386, the control units 731c and 732c of the switching units 731 and 732 determine whether or not the counter n is 4 and, in a case in which the counter is not 4, the process proceeds to Step S387.

In Step S387, the control units 731c and 732c of the switching units 731 and 732 increment the counter n by one, and the process returns to Step S382.

In other words, until the counter n becomes 4, sequentially the channel n is switched by one each time, and a Coriolis force of a corresponding channel n is switched and is output to the signal processing unit 733.

Then, in Step S387, in a case in which the counter n is 4, the process proceeds to Step S388.

In Step S388, the control units 731c and 732c of the switching units 731 and 732 determine whether or not ending of the processing is instructed, and, in a case in which ending is not instructed, the process returns to Step S381, and subsequent processes are repeated.

In other words, until ending of the processing is instructed, the channel is sequentially switched to 1 to 4, and a Coriolis force of the X-axis direction of a corresponding channel is output.

Then, in Step S388, in a case in which the ending of the processing is instructed, the processing ends.

In accordance with the process described above, positive and negative Coriolis forces of the X-axis direction corresponding to the IMU units 610 divided into four channels are sequentially changed and output to the signal processing unit 733, and thus the number of components required for wave detection in a later stage corresponding to each channel can be reduced to ½.

In addition, the channel is changed, and the positive and negative Coriolis forces of the X-axis direction are output to the signal processing unit 733, and thus a flicker noise can be reduced.

In addition, although a similar process is performed also for a Coriolis force of the Y-axis direction and a Coriolis force of the Z-axis direction, and the Coriolis forces can be acquired, only the axis direction is different, and the process is basically the same, and thus a description thereof will be omitted.

22. Fifth Modified Example of Fourth Embodiment

In the description presented above, an example in which the IMU block 610B has two×two IMU units 610 as the horizontal direction×the vertical direction has been described, more IMU units 610 may be included.

Figure 57:
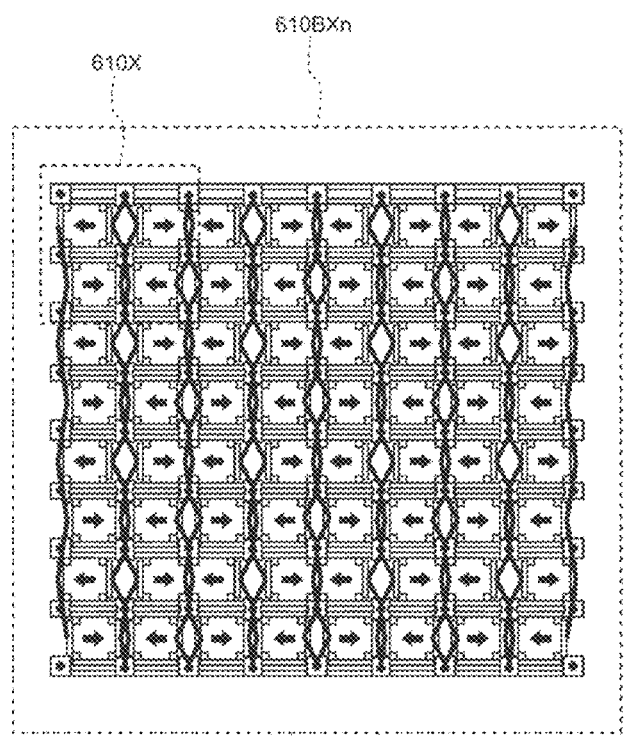
FIG. 57 is a diagram illustrating a configuration example of an IMU block, which is formed from 4×4 IMU units of an X-axis direction driving mechanism, of the multi-IMU according to a fifth modified example of the fourth embodiment of the present disclosure.
Figure 58:
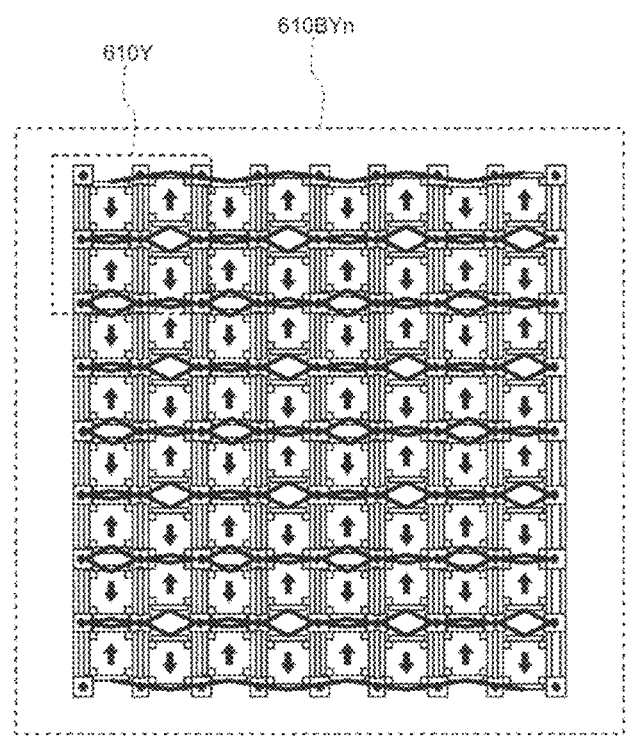
FIG. 58 is a diagram illustrating a configuration example of an IMU block, which is formed from 4×4 IMU units of a Y-axis direction driving mechanism, of the multi-IMU according to the fifth modified example of the fourth embodiment of the present disclosure.
Figure 59:
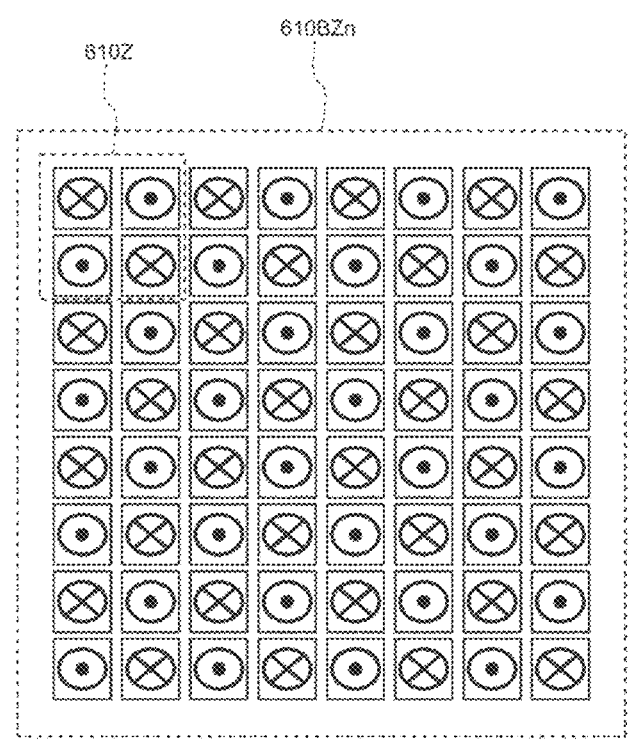
FIG. 59 is a diagram illustrating a configuration example of an IMU block, which is formed from 4×4 IMU units of a Z-axis direction driving mechanism, of the multi-IMU according to the fifth modified example of the fourth embodiment of the present disclosure.

In other words, as illustrated in FIGS. 57 to 59, the IMU units 610 may be configured from a total of 16 units of 4×4.

FIG. 57 illustrates a configuration example of an IMU block 610BXn in which IMU units 610X formed from driving mechanisms canceling shocks in the X-axis direction are arranged as 4×4.

In addition, FIG. 58 illustrates a configuration example of an IMU block 610BYn in which IMU units 610Y formed from driving mechanisms canceling shocks in the Y-axis direction are arranged as 4×4.

Furthermore, FIG. 59 illustrates a configuration example of an IMU block 610BZn in which IMU units 610Z formed from driving mechanisms canceling shocks in the Z-axis direction are arranged as 4×4.

In addition, for any one of IMU blocks 610BXn, 610BYn, and 610BZn of the XYZ axis directions, the number of IMU units 610 is not limited to 16 but may be any value, for example, n. Furthermore, the number in the horizontal direction and the number in the vertical direction do not need to be the same.

Figure 60:
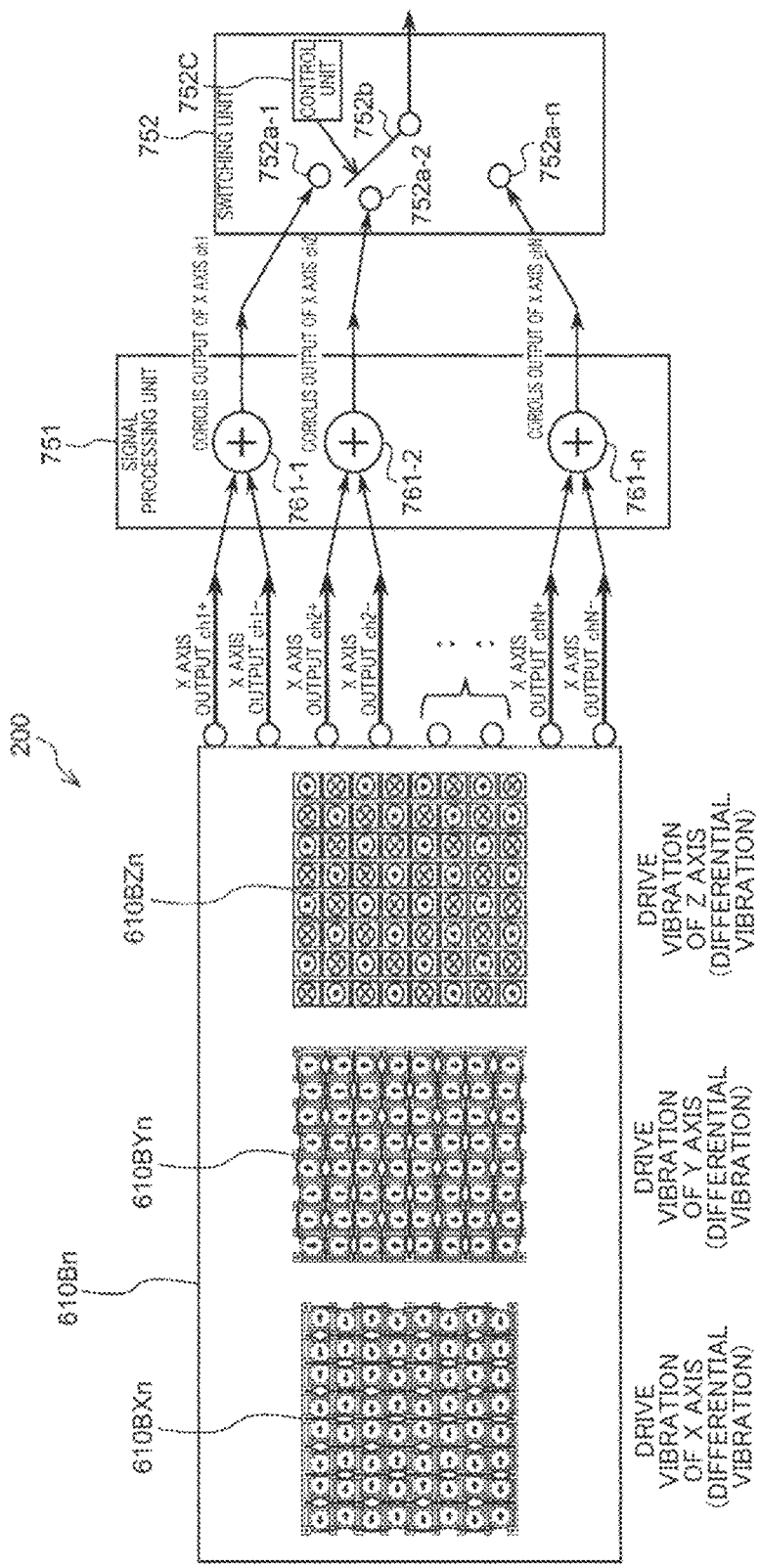
FIG. 60 is a diagram illustrating a configuration example of the multi-IMU, which includes IMU blocks each formed from 4×4 IMU units, of the multi-IMU according to the fifth modified example of the fourth embodiment of the present disclosure.

As illustrated in FIG. 60, a configuration of a multi-IMU 200 including IMU blocks 610Bn formed from IMU blocks 610BXn, 610BYn, and 610BZn relating to n IMU units acquired by expanding driving mechanisms canceling shocks in the XYZ axis directions illustrated in FIGS. 57 to 59 is basically similar to the configuration of the multi-IMU 200 illustrated in FIG. 50.

In other words, the multi-IMU 200 illustrated in FIG. 60 includes an IMU block 610Bn, a signal processing unit 751, and a switching unit 752. In FIG. 60, although only a configuration realizing signal processing corresponding to a driving mechanism canceling shocks of the X-axis direction is represented, signal processing units and switching units of the Y-axis direction and the Z-axis direction not illustrated in the drawing are included as well.

The IMU block 610Bn outputs a Coriolis force of the positive direction and a Coriolis force of the negative direction of the X-axis direction for each unit channel using the IMU unit 610 as a unit. In other words, here, a channel represents n channels corresponding to a unit number n of the IMU unit 610.

The signal processing unit 751 includes calculation units 761-1 to 761-n and calculates a Coriolis force of each channel and outputs the calculated Coriolis force to the switching unit 752.

The switching unit 752 outputs a Coriolis force of the X axis of n channels supplied from the signal processing unit 751 to a later stage in a time divisional manner.

In more details, the switching unit 752 includes terminals 752a-1 to 752a-n, a switch 752b, and a control unit 752c.

The terminals 752a-1 to 752a-n accept outputs of Coriolis forces of the X axis of channel n from signal processing unit 751.

The switch 752b is controlled by the control unit 752c and has connection with the terminals 752a-1 to 752a-n being switched at predetermined time intervals and thus outputs Coriolis forces of the X axis of n channels to a later stage in a time divisional manner.

In addition, signal processing of the multi-IMU 200 illustrated in FIG. 60 is a process of a case in which the process described with reference to FIG. 51 becomes n channels, and thus description thereof will be omitted.

Also in a case in which n IMU units 610 are disposed, similar to the multi-IMU 200 described with reference to FIG. 55, a configuration in which signal processing is performed after switching of channels may be also employed.

In the description presented above, although an example in which IMUs 201 are set as an IMU unit 610 having two IMUs in the horizontal direction×two IMUs in the vertical direction as a minimal unit has been described, the IMU unit 610 may be configured using a different number of IMUs, and, for example, an IMU unit 610 having 4 IMUs 201×4 IMUs 201 as a unit may be formed.

In such a case, 16 IMUs 201 may form one channel to perform signal processing.

As the number of IMUs 201 configuring the IMU unit 610 configuring each channel, it is preferable that the number of IMUs 201 detecting Coriolis forces of the positive direction and the number of IMUs 201 detecting Coriolis forces of the negative direction are the same.

However, the number of IMUs 201 detecting Coriolis forces of the positive direction and the number of IMUs 201 detecting Coriolis forces of the negative direction are not necessarily the same. In such a case, a calculation method for each channel, that is, for each IMU unit needs to be devised.

For example, a representative value of Coriolis forces of the positive direction is acquired from detection results acquired by a plurality of IMUs 201 detecting Coriolis forces of the positive direction, a representative value of Coriolis forces of the negative direction is acquired from detection results acquired by a plurality of IMUs 201 detecting Coriolis forces of the negative direction, and a Coriolis force of the IMU unit 610 corresponding to one channel may be acquired such that shocks are canceled on the basis of a difference between the representative value of the Coriolis force of the positive direction and the representative value of the Coriolis force of the negative direction.

23. Fifth Embodiment

In the description presented above, the configuration of the multi-IMU 200 has been described, the multi-IMU 200 described above may be applied to hand shake correction in an image sensor.

Figure 61:
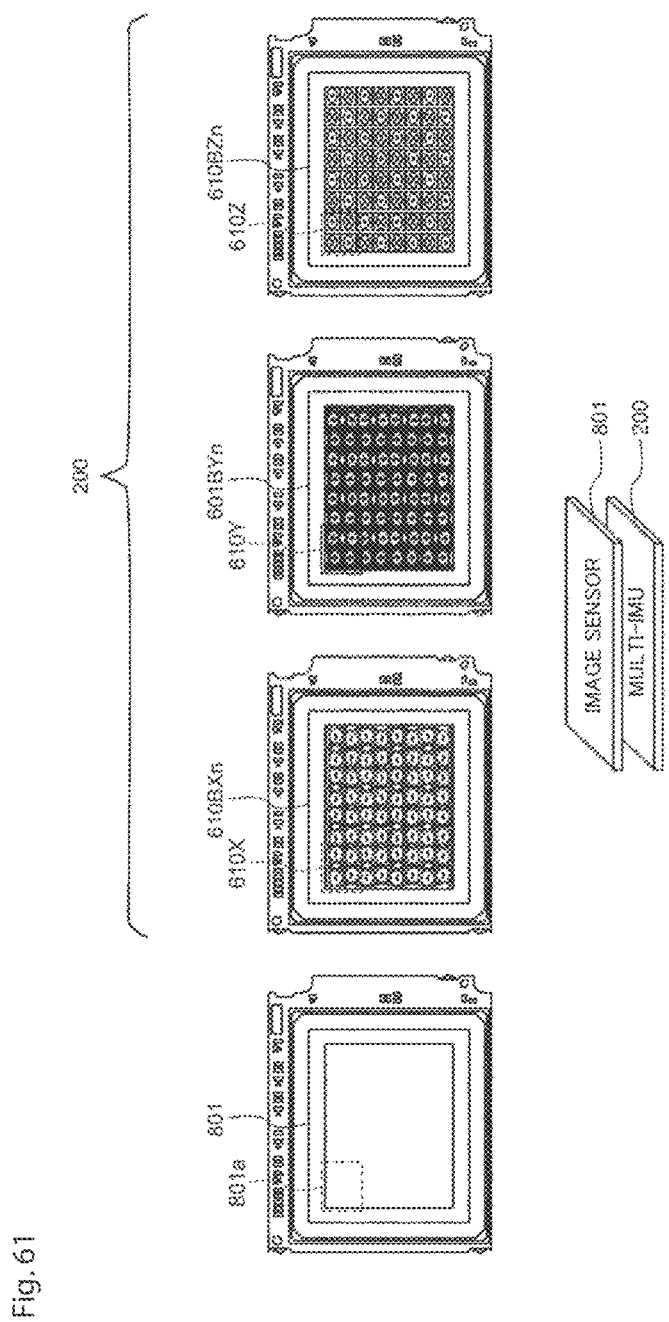
FIG. 61 is a diagram illustrating a configuration example in which the multi-IMU, which includes IMU blocks each formed from n IMU units, of the multi-IMU according to the fifth embodiment of the present disclosure is applied to hand shake correction of an image sensor.

FIG. 61 illustrates a configuration example in a case in which a multi-IMU 200 including a driving mechanism capable of canceling shocks of XYZ axis directions is applied to an image sensor.

As illustrated in a lower part of FIG. 61, a configuration in which a multi-IMU 200 including a driving mechanism capable of canceling shocks of the XYZ axis directions described above is attached to a rear side of an imaging face of the image sensor 801 is formed.

The multi-IMU 200, as described above, is composed of n IMU units 610 including IMU blocks 610BXn, 610Y, and 610BXn formed from driving mechanisms capable of canceling shocks of the XYZ axis directions.

For this reason, an angular velocity and an acceleration can be detected for each unit area 801a corresponding to an area in which the IMU unit 610 is disposed on the image sensor 801.

According to such a configuration, a hand shake can be corrected with high accuracy for each unit area 801a using signal processing based on an acceleration and an angular velocity of a pin point detected for each unit area in an image captured by the image sensor 801.

24. First Modified Example of Fifth Embodiment

In the description presented above, although an example in which hand shake correction using signal processing is applied to each unit area 801a in which the IMU unit 610 is disposed on the image sensor 801 has been described, hand shake may be corrected physically not using signal processing but using a driving mechanism.

Although a hand shake represents a deviation of imaging that occurs when a user operates an imaging device with being gripped by the hands, here, it represents a general deviation occurring at the time of imaging. For this reason, for example, a deviation in imaging occurring in accordance a high-frequency vibration generated by driving a motor or an engine in an imaging device mounted in a mobile object device such as a drone, a vehicle, and the like driven by a motor, an engine, or the like is assumed to be included in a hand shake.

Figure 62:
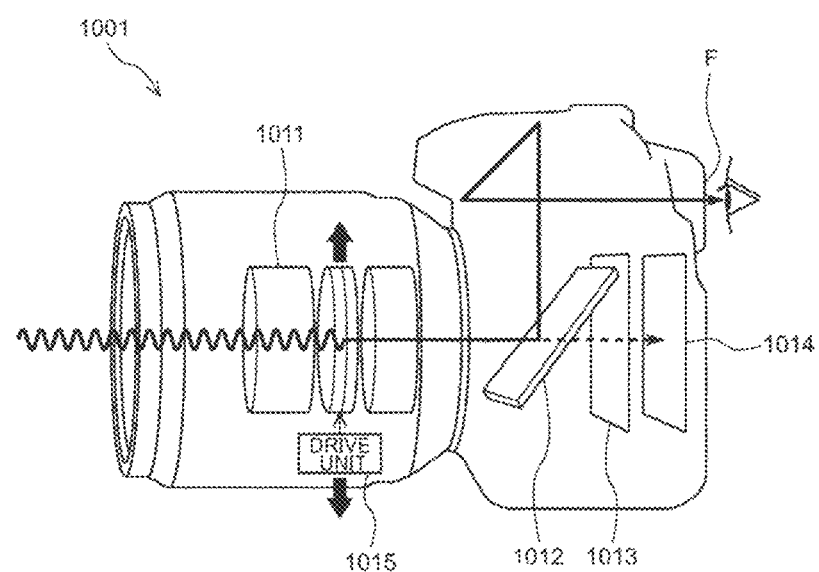
FIG. 62 is a diagram illustrating a configuration example of an imaging device that realizes hand shake correction by driving an optical block.

Configuration Example of Imaging Device
Realizing Hand Shake Correction by Driving an Optical Block First, an overview of a technology for physically correcting a hand shake using a driving mechanism will be described. FIG. 62 is a configuration example of an imaging device realizing hand shake correction by driving an optical block.

The imaging device 1001 illustrated in FIG. 62 is configured using an optical block 1011, a reflector 1012, a shutter 1013, an image sensor 1014, and a drive unit 1015.

The optical block 1011 has a configuration formed from a lens for focus adjustment and the like and transmits incident light, which is denoted by a solid line, to be focused on the image sensor 1014 through the reflector 1012 and the shutter 1013. The incident light focused on the image sensor 1014 is denoted by a dotted line. In addition, a wave shaped portion in a transmission path of the incident light denoted by a solid line represents a hand shake.

The reflector 1012 reflects a part of incident light to a finder F into which a user views and transmits the other incident light to the image sensor 1014 through the shutter 1013 together with mirrors not illustrated in the drawing.

The shutter 1013 is a component, which is formed from a mechanical configuration or an electrical configuration, controlling opening/closing and adjusts an exposure time of light in which incident light that is incident by being transmitted through the optical block 1011 is transmitted through the image sensor 1014.

The image sensor 1014 is configured using a CMOS, a CCD, or the like and captures an image formed from pixel signal corresponding to a light quantity of incident light.

The drive unit 1015 is formed from an actuator and the like and drives the optical block 1011 in a direction vertical to an incidence direction of incident light.

In more detail, when movement due to a hand shake or the like is detected in the optical block 1011 using an IMU or the like not illustrated in the drawing, the drive unit 1015 drives the optical block 1011 to cancel the detected movement.

In other words, in the imaging device 1001 illustrated in FIG. 62, the optical block 1011 is driven to cancel movement due to a hand shake or the like by the drive unit 1015, whereby hand shake of an image captured by the image sensor 1014 is corrected. In FIG. 62, a solid line representing a path of incident light after the drive unit 1015 is formed in a straight line, which represents that hand shake of the incident light is corrected by operating this drive unit 1015.

However, the drive unit 1015 of the imaging device 1001 illustrated in FIG. 62 needs to drive the optical block 1011 formed from a lens and the like, and thus a relatively large component is necessary. In addition, since the drive unit 1015 is a relatively large component, high-speed driving becomes difficult, and, for example, it is difficult to realize driving of canceling of a vibration by performing driving to follow a high-frequency vibration generated when a motor or an engine operates.

Configuration Example of Imaging Device
Realizing Hand Shake Correction by Driving Image Sensor Thus, in the present disclosure, by providing a drive unit that drives the image sensor 1014 instead of drive unit 1015 that drives the optical block 1011, the configuration of the drive unit is decreased in size, and the drive unit is configured to be able to follow a high-frequency vibration.

Figure 63:
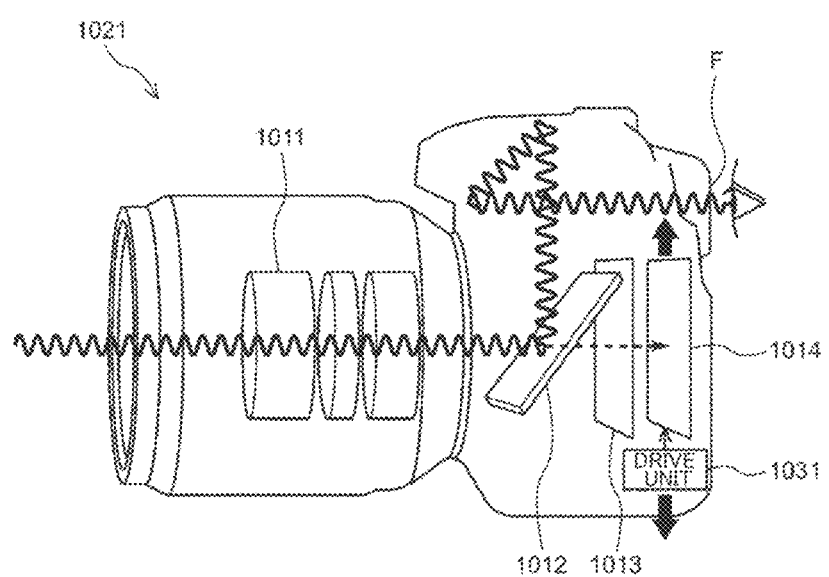
FIG. 63 is a diagram illustrating a configuration example of an imaging device that realizes hand shake correction by driving an image sensor.

FIG. 63 is a configuration example of an imaging device that realizes hand shake correction by disposing a drive unit that drives the image sensor 1014. In the imaging device 1021 illustrated in FIG. 63, the same reference signs are assigned to components having the same functions as those of the imaging device 1001 illustrated in FIG. 62, and description thereof will be appropriately omitted.

In other words, the imaging device 1021 illustrated in FIG. 63 is different from the imaging device 1001 illustrated in FIG. 62 in that a drive unit 1031 driving the image sensor 1014 is included in place of the drive unit 1015 driving the optical block 1011.

The drive unit 1031 is formed from an actuator and the like and drives the image sensor 1014 in a direction vertical to the incidence direction of incident light.

When movement of the image sensor 1014 due to hand shake or the like is detected by an IMU or the like not illustrated in the drawing, the drive unit 1031 drives the image sensor 1014 to cancel the detected movement.

In the imaging device 1021 illustrated in FIG. 63, the image sensor 1014 is driven to cancel movement due to hand shake or the like by the drive unit 1031, and accordingly, a hand shake of an image captured by the image sensor 1014 is corrected.

Since the drive unit 1031 of the imaging device 1021 illustrated in FIG. 63 is configured to drive the image sensor 1014 that is smaller and lighter than the optical block 1011 formed from lenses and the like, the drive unit 1031 can be configured to be relatively small.

In addition, since the drive unit 1031 is a relatively small and light component, high-speed driving can be realized, and, for example, driving to cancel a vibration by following a high-frequency vibration or the like generated in accordance with an operation of a motor or an engine can be realized.

Detailed Configuration Example of Imaging Device Realizing Hand Shake Correction by Driving Image Sensor Next, a detailed configuration example of the imaging device 1021 realizing hand shake correction by driving the image sensor 1014 will be described with reference to FIG. 64.

Figure 64:
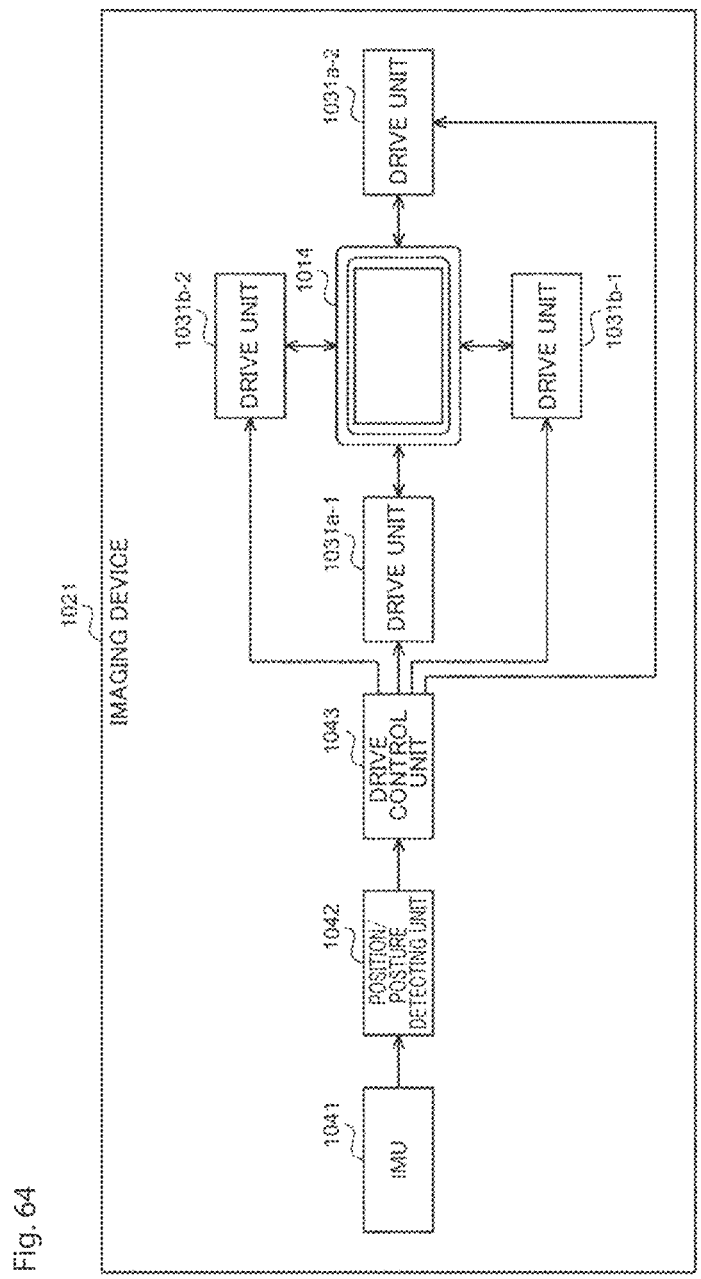
FIG. 64 is a diagram illustrating a detailed configuration example of an imaging device that realizes hand shake correction by driving an image sensor.

Among components of the imaging device 1021 illustrated in FIG. 64, the same reference signs are assigned to components having the same functions as those of the imaging device 1021 illustrated in FIG. 63, and thus description thereof will be appropriately omitted.

In other words, the imaging device 1021 illustrated in FIG. 64 has a detailed configuration of the configuration of the imaging device 1021 illustrated in FIG. 63.

The imaging device 1021 illustrated in FIG. 64 further includes an IMU 1041, a position/posture detecting unit 1042, and a drive control unit 1043 in addition to the components of the imaging device 1021 illustrated in FIG. 63.

The drive unit 1031 is described to be divided into drive units 1031*a*-1 and 1031*a*-2 that drive the image sensor 1014 in the horizontal direction in the drawing and drive units 1031*b*-1 and 1031*b*-2 that drive the image sensor 1014 in the vertical direction in the drawing.

The IMU 1041 detects an acceleration and an angular velocity of the main body of the imaging device 1021 and outputs the acceleration and the angular velocity to the position/posture detecting unit 1042.

The position/posture detecting unit 1042 detects a position and a posture of the main body of the imaging device 1021 by integrating the acceleration and the angular velocity detected by the IMU 1041 and outputs the position and the posture to the drive control unit 1043.

The drive control unit 1043 outputs control signals for driving the image sensor 1014 in a direction for canceling a generated vibration to the drive units 1031*a*-1, 1031*a*-2, 1031*a*-1, and 1031*a*-2 on the basis of information of the position and the posture of the main body of the imaging device 1021 detected by the position/posture detecting unit 1042. In other words, the drive control unit 1043 controls the position and the posture of the image sensor 1014 by driving the drive unit 1031 using inertial navigation using IMU 1041 and the position/posture detecting unit 1042 or intermediate output signals (an acceleration, a speed, an angular velocity, and an angle that become intermediate variables).

In more detail, the movement of the image sensor 1014 is transferred from a drive unit 1031 and the like accompanying the main body of the imaging device 1021 and thus becomes movement following the movement of the main body of the imaging device 1021. In other words, the movement of the image sensor 1014 is movement following the movement of the main body of the imaging device 1021 and is movement acquired by delaying the movement of the imaging device 1021 by a predetermined time interval.

Thus, the drive control unit 1043 predicts movement of the image sensor 1014 from the movement of the imaging device 1021 detected by the position/posture detecting unit 1042 and supplies control signals for driving the drive units 1031*a*-1, 1031*a*-2, 1031*a*-1, and 1031*a*-2 to cancel the predicted movement of the image sensor 1014.

Thus, by performing feed forward control based on a detection result acquired by the position/posture detecting unit 1042, the drive control unit 1043 controls the drive units 1031*a*-1, 1031*a*-2, 1031*a*-1, and 1031*a*-2 such that the movement of the image sensor 1014 is canceled.

Each of the drive units 1031*a*-1, 1031*a*-2, 1031*a*-1, and 1031*a*-2 drives the image sensor 1014 with a direction and an amount of movement based on a control signal supplied from the drive control unit 1043.

As a result, the image sensor 1014 is driven in a direction for canceling the hand shake in accordance with changes in the position and the posture of the imaging device 1021, whereby hand shake correction is realized.

However, in the case of the configuration of the imaging device 1021 illustrated in FIG. 64, the IMU 1041 is disposed outside a drive range of the drive units 1031*a*-1, 1031*a*-2, 1031*a*-1, and 1031*a*-2 that drive the image sensor 1014, and thus even when the position and the posture of the main body of the imaging device 1021 can be appropriately detected, a position and a posture of the image sensor 1014 cannot be appropriately detected.

For this reason, even when the image sensor 1014 is driven by the drive units 1031*a*-1, 1031*a*-2, 1031*a*-1, and 1031*a*-2, there is concern that hand shake may not be appropriately corrected. In addition, particularly, in a case in which a high-frequency vibration and the like are generated in the image sensor 1014, the IMU 1041 cannot detect changes in the position and the posture of the image sensor 1014 as high-frequency vibrations and cannot appropriately follow the movement, and thus there is concern that appropriate correction cannot be performed.

<Overview of Imaging Device According to Present Disclosure>

Thus, in the present disclosure, an IMU that detects a position and a posture of the image sensor 1014 is provided, and the drive unit 1031 is driven on the basis of changes in the position and the posture of the image sensor 1014 in addition to changes in the position and the posture of the main body of the imaging device.

In accordance with this, the drive unit 1015 can be controlled to follow the movement of the image sensor 1014 with high accuracy, and thus correction of hand shake also including a high-frequency vibration generated in accordance with driving of a motor or an engine can be realized.

Figure 65:
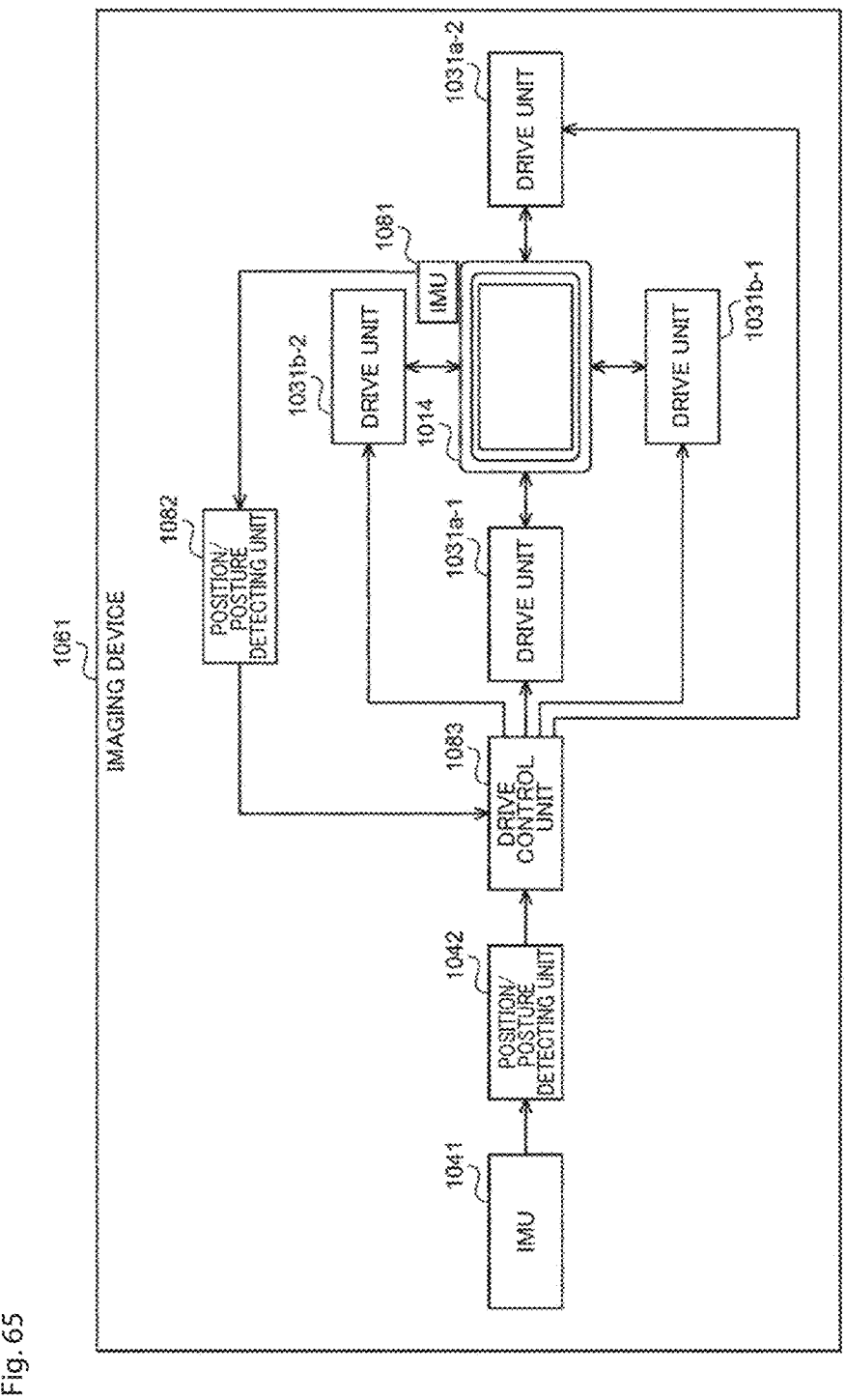
FIG. 65 is a diagram illustrating an overview of an imaging device according to the present disclosure.

FIG. 65 illustrates a configuration example that is an outline of an imaging device in which an IMU detecting a position and a posture of the image sensor 1014 is disposed, and the drive unit 1031 is driven on the basis of the position and the posture of the image sensor 1014 in addition to a position and a posture of the main body of the imaging device.

In the imaging device 1061 illustrated in FIG. 65, the same reference signs are assigned to components having the same functions as the components of the imaging device 1021 illustrated in FIG. 64, and description thereof will be appropriately omitted.

In other words, the imaging device 1061 illustrated in FIG. 65 is different from the configuration of the imaging device 1021 illustrated in FIG. 64 in that an IMU 1081 and a position/posture detecting unit 1082 are newly disposed, and a drive control unit 1083 is disposed in place of the drive control unit 1043.

The IMU 1081 is configured to be integrated with the image sensor 1014, detects an acceleration and an angular velocity of the image sensor 1014 and outputs the acceleration and the angular velocity to the position/posture detecting unit 1082.

The position/posture detecting unit 1082 detects a position and a posture of the image sensor 1014 on the basis of the acceleration of the image sensor 1014 supplied from the IMU 1081 and an integral operation of the acceleration and outputs the position and the posture to the drive control unit 1083.

The drive control unit 1083 calculates control amount target values of the drive units 1031*a*-1, 1031*a*-2, 1031*a*-1, and 1031*a*-2 for maintaining a predetermined state of the position and the posture of the image sensor 1014 on the basis of information of a position and a posture of the main body of the imaging device 1061 supplied from the position/posture detecting unit 1042 and information of a position and a posture of the image sensor 1014 supplied from the position/posture detecting unit 1082.

Then, the drive control unit 1083 generates control signals on the basis of the calculated control amount target values and drives the drive units 1031*a*-1, 1031*a*-2, 1031*a*-1, and 1031*a*-2.

In other words, the drive control unit 1083 controls the position and the posture of the image sensor 1014 to be maintained in a predetermined state using inertial navigation and intermediate output signals based on the information of a position and a posture of the main body of the imaging device 1061 supplied from the position/posture detecting unit 1042 and the information of a position and a posture of the image sensor 1014 supplied from the position/posture detecting unit 1082.

In addition, since a predetermined time delay occurs between the position and the posture of the main body of the imaging device 1061 supplied from the position/posture detecting unit 1042 and a position and a posture of an actual image sensor 1014, as described above, only using the position and the posture of the main body of the imaging device 1061, only feed forward control of the drive unit 1031 is performed.

However, the information of the position and the posture of the image sensor 1014 supplied from the position/posture detecting unit 1082 may be assumed to be the position and the posture of the current image sensor 1014 that is a result of driving performed by the drive units 1031*a*-1, 1031*a*-2, 1031*a*-1, and 1031*a*-2.

Thus, the drive control unit 1083 may be regarded to simultaneously realize feed forward control based on the position and the posture of the main body of the imaging device 1061 supplied from the position/posture detecting unit 1042 and feedback control based on the position and the posture of the image sensor 1014 supplied from the position/posture detecting unit 1082.

In accordance with such a configuration, driving of the drive units 1031*a*-1, 1031*a*-2, 1031*a*-1, and 1031*a*-2 can be controlled to follow the movement (changes in the position and the posture) of the image sensor 1014 with high accuracy, by mounting the main body of the imaging device in a mobile object device such as a drone and a vehicle, hand shake also including high-frequency vibrations generated in accordance with operations of the motor and the engine that are power sources can be corrected.

Figure 66:
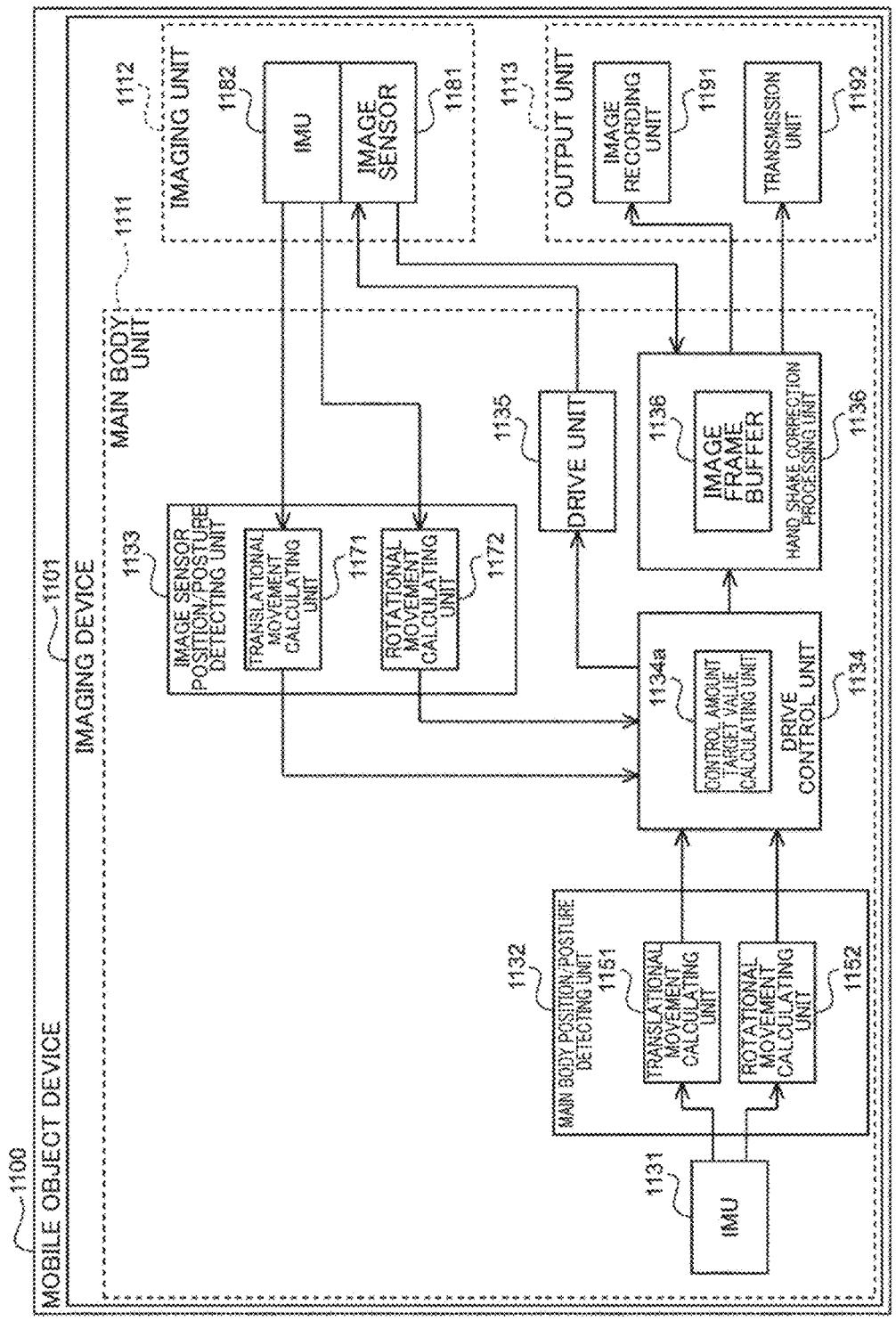
FIG. 66 is a diagram illustrating a configuration example of an imaging device according to a first modified example of the fifth embodiment.

Configuration Example of Imaging Device According to First Modified Example of Fifth Embodiment Next, a configuration example of an imaging device according to a first modified example of the fifth embodiment of the present disclosure will be described with reference to FIG. 66. In FIG. 66, although a configuration example of a case in which the imaging device 1101 is mounted in a mobile object device 1100 such as a vehicle or a drone is illustrated, the imaging device 1101 may be configured not to be mounted in the mobile object device 1100.

The imaging device 1101 illustrated in FIG. 66 is configured using a main body unit 1111 that controls an operation for correcting hand shake (including a deviation accompanying vibrations according to movement of the mobile object device 1100), an imaging unit 1112 that includes an image sensor capturing an image, and an output unit 1113 that outputs an image that is an imaging result.

The main body unit 1111 includes an IMU 1131, a main body position/posture detecting unit 1132, an image sensor position/posture detecting unit 1133, a drive control unit 1134, a drive unit 1135, and a hand shake correction processing unit 1136.

The IMU 1131 corresponds to the IMU 1041 illustrated in FIG. 65, detects an acceleration and an angular velocity of the main body unit 1111, and outputs the acceleration and the angular velocity to the main body position/posture detecting unit 1132.

The main body position/posture detecting unit 1132 is a component corresponding to the position/posture detecting unit 1042 illustrated in FIG. 65, includes a translational movement calculating unit 1151 and a rotational movement calculating unit 1152, detects a position and a posture of the main body unit 1111, and outputs the position and the posture to the drive control unit 1134.

The translational movement calculating unit 1151 detects a position of the main body unit 1111 through an integral operation on the basis of the information of an acceleration supplied from the IMU 1131 and outputs the detected position to the drive control unit 1134.

The rotational movement calculating unit 1152 detects a posture of the main body unit 1111 through an integral operation on the basis of the information of an angular velocity supplied from the IMU 1132 and outputs the detected posture to the drive control unit 1134.

The image sensor position/posture detecting unit 1133 is basically a component similar to the main body position/posture detecting unit 1132 and is a component corresponding to the position/posture detecting unit 1082 illustrated in FIG. 65. The image sensor position/posture detecting unit 1133 includes a translational movement calculating unit 1171 and a rotational movement calculating unit 1172, detects a position and a posture of the imaging unit 1112 (an image sensor 1181 thereof), and outputs the position and the posture to the drive control unit 1134.

The translational movement calculating unit 1171 detects a position of the image sensor 1181 through an integral operation on the basis of the information of an acceleration supplied from the IMU 1182 of the imaging unit 1112 and outputs the detected position to the drive control unit 1134.

The rotational movement calculating unit 1172 detects a posture of the image sensor 1181 through an integral operation on the basis of the information of an angular velocity supplied from the IMU 1182 of the imaging unit 1112 and outputs the detected posture to the drive control unit 1134.

The drive control unit 1134 corresponds to the drive control unit 1083 illustrated in FIG. 65 and controls the drive unit 1135 on the basis of the information of a position and a posture of the main body unit 1111 supplied from the main body position/posture detecting unit 1132 and the information of a position and a posture of the image sensor 1181 of the imaging unit 1112 supplied from the image sensor position/posture detecting unit 1133.

In more detail, the drive control unit 1134 includes a control amount target value calculating unit 1134a and calculates a control amount target value for maintaining the position and the posture of the image sensor 1181 to be in a predetermined state on the basis of the information of the position and the posture of the main body unit 1111 and the information of the position and the posture of the image sensor 1181.

Then, the drive control unit 1134 generates a control signal for driving the drive unit 1135 on the basis of the control amount target value that is a result of calculation acquired by the control amount target value calculating unit 1134a and supplies the control signal to the drive unit 1135 to be driven.

The drive unit 1135 is a component formed from an actuator or the like corresponding to the drive unit 1031 (1031a-1, 1031a-2, 1031b-1, and 1031b-2) illustrated in FIG. 65 and drives the position and the posture of the image sensor 1181 on the basis of the control signal from the drive control unit 1134.

The drive control unit 1134 supplies the information of changes in the position and the posture of the main body unit 1111 and changes in the position and the posture of the image sensor 1181 to the hand shake correction processing unit 1136.

The hand shake correction processing unit 1136 includes an image frame buffer 1136a and buffers an image supplied from the image sensor 1181. The hand shake correction processing unit 1136 corrects a buffered image captured by the image sensor 1181 through signal processing on the basis of information of the position and the posture of the main body unit 1111 and the position and the posture of the image sensor 1181 and outputs the corrected image to the output unit 1113.

Details of hand shake correction processing of an image performed by the hand shake correction processing unit 1136 will be described below with reference to FIG. 67.

The imaging unit 1112 is configured using an image sensor 1181 and an IMU 1182. The image sensor 1181 is a component corresponding to the image sensor 1014 illustrated in FIG. 65, captures an image formed from pixel signals corresponding to a light quantity of incident light and supplies the captured image to the hand shake correction processing unit 1136.

The IMU 1182 is a component corresponding to the IMU 1081 illustrated in FIG. 65 and is configured to be integrated with the image sensor 1181, thus detects an acceleration and an angular velocity of the image sensor 1181 and outputs the acceleration and the angular velocity to the image sensor position/posture detecting unit 1133.

The imaging unit 1112, for example, has a configuration in which a multi-IMU 200 having a driving mechanism capable of canceling shocks of the XYZ-axis directions described above is attached to a rear side of the imaging face of the image sensor 801 illustrated in FIG. 61.

In other words, the image sensor 1181 is a component corresponding to the image sensor 801 illustrated in FIG. 61, and the IMU 1182 is a component corresponding to the multi-IMU 200.

Thus, similar to the multi-IMU 200, the IMU 1182 is configured using N IMU units 610 including IMU blocks 610BXn, 610Y, and 610BXn formed from driving mechanisms capable of canceling shocks of the XYZ-axis directions.

For this reason, also the image sensor 1181 and the IMU 1182 can detect an acceleration and an angular velocity using IMU units 610 disposed for each unit area (a unit area 801a illustrated in FIG. 61) of the image sensor 801 as a unit.

The output unit 1113 outputs an image corrected by the hand shake correction processing unit 1136. In more details, the output unit 1113 includes an image recording unit 1191 and a transmission unit 1192.

The image recording unit 1191 records image corrected by the hand shake correction processing unit 1136 as data.

The transmission unit 1192, for example, is configured using ethernet or the like and transmits an image corrected by the hand shake correction processing unit 1136 to an external information processing device, a communication terminal, and the like via a network not illustrated in the drawing.

The output unit 1113 may have any other configuration, for example, may be configured using a display having a display function or the like, and may display an image corrected by the hand shake correction processing unit 1136.

Accordingly, in the imaging device 1101 illustrated in FIG. 66, the drive control unit 1134 controls the position and the posture of the image sensor 1181 to be maintained in a predetermined state using inertial navigation and intermediate output signals based on the information of the position and the posture of the main body of the imaging device 1101 supplied from the main body position/posture detecting unit 1132 and the information of the position and the posture of the image sensor 1181 supplied from the image sensor position/posture detecting unit 1133.

In addition, between the position and the posture of the main body unit 1111 of the imaging device 1101 supplied from the main body position/posture detecting unit 1132 and the position and the posture of the actual image sensor 1181, a delay of a predetermined time occurs, and thus, by using only the position and the posture of the main body of the imaging device 1101, only feed forward control is performed by the drive unit 1135.

However, the information of the position and the posture of the image sensor 1181 supplied from the image sensor position/posture detecting unit 1133 may be assumed to be the position and the posture of the current image sensor 1181 that is a result of driving performed by the drive unit 1135.

Thus, the drive control unit 1134 may be regarded to simultaneously realize feed forward control of the drive unit 1135 based on the position and the posture of the main body unit 1111 of the imaging device 1101 supplied from the main body position/posture detecting unit 1132 and feedback control of the drive unit 1135 based on the position and the posture of the image sensor 1181 supplied from the image sensor position/posture detecting unit 1133.

<Hand Shake Correction Processing>

In driving of the drive unit 1135 controlled by the drive control unit 1134, a time lag occurs until actual driving after supply of a control signal, and thus there is a possibility that hand shake for a vibration of a speed higher than a predetermined speed cannot be corrected.

The hand shake correction processing unit 1136 corrects hand shake that cannot be corrected by driving of the drive unit 1135 on the basis of the position and the posture of the main body unit 1111 of the imaging device 1101 supplied from the main body position/posture detecting unit 1132 and the position and the posture of the image sensor 1181 supplied from the image sensor position/posture detecting unit 1133 supplied through the drive control unit 1134 by using signal processing.

As described above, the imaging unit 1112, for example, has a configuration in which a multi-IMU 200 including a driving mechanism capable of canceling shocks of the XYZ axis directions is attached to a rear side of an imaging face of the image sensor 801 of FIG. 61.

For this reason, the IMU 1182 can output an acceleration and an angular velocity for each unit area of the image sensor 1181 corresponding to the IMU unit 610.

Thus, the image sensor position/posture detecting unit 1133 acquires information of the position and the posture using the IMU unit 610 as a unit and outputs the acquired information to the drive control unit 1134.

The drive control unit 1134 acquires and stores information of the position and the posture of the image sensor 1181 using the IMU unit 610 as a unit that is supplied from the image sensor position/posture detecting unit 1133 and supplies the acquired information to the hand shake correction processing unit 1136.

In correspondence with this, the image sensor 1181 outputs an image formed from pixel signals using the unit area in which the IMU unit 610 configuring the attached IMU 1182 is disposed as a unit to the hand shake correction processing unit 1136. Hereinafter, a pixel group of a unit area corresponding to the IMU unit 610 on the image sensor 1181 will be also referred to as a pixel unit.

The image sensor 1181 of the imaging unit 1112 outputs a pixel signal to the hand shake correction processing unit 1136 in units of pixel units.

The hand shake correction processing unit 1136 acquires a motion vector in units of pixels from the information of the position and the posture of the image sensor 1181 in units of IMU units 610, performs correction processing corresponding to the motion vector on pixel signals in unit of pixel units supplied from a corresponding image sensor 1181, and buffers the resultant pixel signal in the image frame buffer 1136a.

In other words, the hand shake correction processing unit 1136 repeats the process of acquiring a motion vector from the information of the position and the posture supplied in units of IMU units that are unit areas, performing hand shake correction processing on a corresponding image in units of pixel units on the basis of the acquired motion vector, and buffering the corrected image and outputs corrected images to the output unit 1113 when the images corresponding to one frame are buffered.

Figure 67:
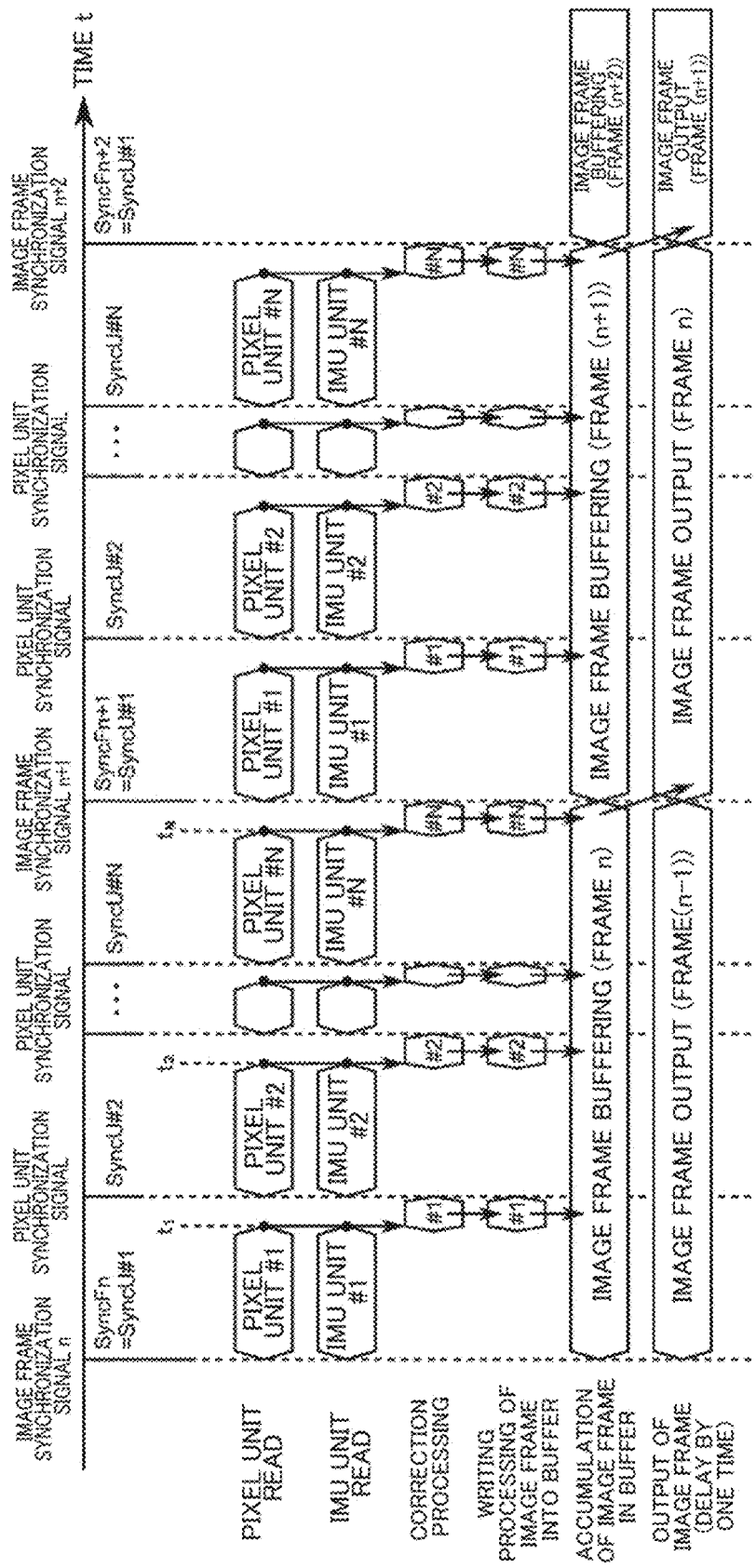
FIG. 67 is a timing diagram illustrating hand shake correction processing.

For example, in a case in which N unit areas having the IMU unit and the pixel unit as a unit are present (pixel unit #1 to #N and IMU unit #1 to #N are present) in the image sensor 1181, as illustrated in a timing diagram illustrated in FIG. 67, orderly, the processing of the hand shake correction processing unit 1136 is performed.

In FIG. 67, from above, a read timing in units of pixel units in image sensor 1181, a timing at which an acceleration and an angular velocity (a position and a posture) are read in units of IMU units in the IMU 1182, a timing at which correction processing is performed by the hand shake correction processing unit 1136, a write timing for the image frame buffer 1136a, an accumulation timing for the image frame buffer 1136a, and an image frame output timing are illustrated.

In other words, when a synchronization signal representing read of an image frame synchronization signal n starts at a timing represented as a frame synchronization signal SyncFn, at the same time, a unit synchronization signal representing read of pixel unit #1 that is a first pixel unit is assumed to be a unit synchronization signal SyncU #1. In addition, the frame synchronization signal, for example, is 30 Hz, 60 Hz, 120 Hz, or the like, and the unit synchronization signal, for example, is about 1 kHz to 10 kHz.

In a case in which this synchronization signal SyncFn=unit synchronization signal SyncU #1, when read of the image frame n starts, first, a pixel signal of pixel unit #1 is read and is supplied to the hand shake correction processing unit 1136 by the image sensor 1181.

In addition, at the same time, an acceleration and an angular velocity of a corresponding IMU unit #1 are read in the IMU 1182. Then, the image sensor position/posture detecting unit 1133 detects information of a position and a posture of a unit area corresponding to IMU unit #1 in the image sensor 1181 and supplies the detected information to the drive control unit 1134. In addition, the drive control unit 1134 supplies information of a position and a posture of a unit area corresponding to the IMU unit #1 in the image sensor 1181 to the hand shake correction processing unit 1136.

At a timing t1 that is the next timing, the hand shake correction processing unit 1136 acquires a motion vector on the basis of the information of a position and a posture of a unit area corresponding to IMU unit #1, performs hand shake correction processing for pixel signals of a corresponding pixel unit #1 using the acquired motion vector, and stores a resultant signal in the image frame buffer 1136a.

Subsequently, for the unit synchronization signal SyncU #2, pixel signals of pixel unit #2 are read and supplied to the hand shake correction processing unit 1136 by the image sensor 1181.

In addition, at the same time, the IMU 1182 reads an acceleration and an angular velocity of a corresponding IMU unit #2. Then, the image sensor position/posture detecting unit 1133 detects information of a position and a posture of a unit area corresponding to the IMU unit #2 in the image sensor 1181 and supplies the detected information to the drive control unit 1134. In addition, the drive control unit 1134 supplies information of the position and the posture of a unit area corresponding to IMU unit #2 in the image sensor 1181 to the hand shake correction processing unit 1136.

Then, at the next timing t2, the hand shake correction processing unit 1136 acquires a motion vector on the basis of the information of a position and a posture of a unit area corresponding to the IMU unit #2, performs hand shake correction processing for pixel signals of corresponding pixel unit #2 using the acquired motion vector, and stores a resultant signal in the image frame buffer 1136a.

Thereafter, a similar process is repeated until pixel unit #N and IMU unit #N, and when image data corresponding to one frame for which the hand shake correction processing has been performed is buffered in the image frame buffer 1136*a*, at the frame synchronization signal SyncF(n+1)=unit synchronization signal SyncU #1 that becomes a timing for reading the next frame (n+1), the hand shake correction processing unit 1136 outputs an image signal of frame n buffered in the image frame buffer 1136*a* to the output unit 1113.

In addition, in calculation of a control amount target value for driving the drive unit 1135 that controls the position and the posture of the image sensor 1181, by using a position and a posture for each unit area, that is, acquired in units of IMU units, and control using the drive unit 1135 may be performed with a high frequency.

In addition, in calculating a control amount target value, it may be statistically acquired from a position and a posture acquired in units of IMU units corresponding to one frame, for example, it may be acquired using information such as an average value or the like or may be acquired using information of a position and a posture of a specific unit area.

<Imaging Processing>

Figure 68:
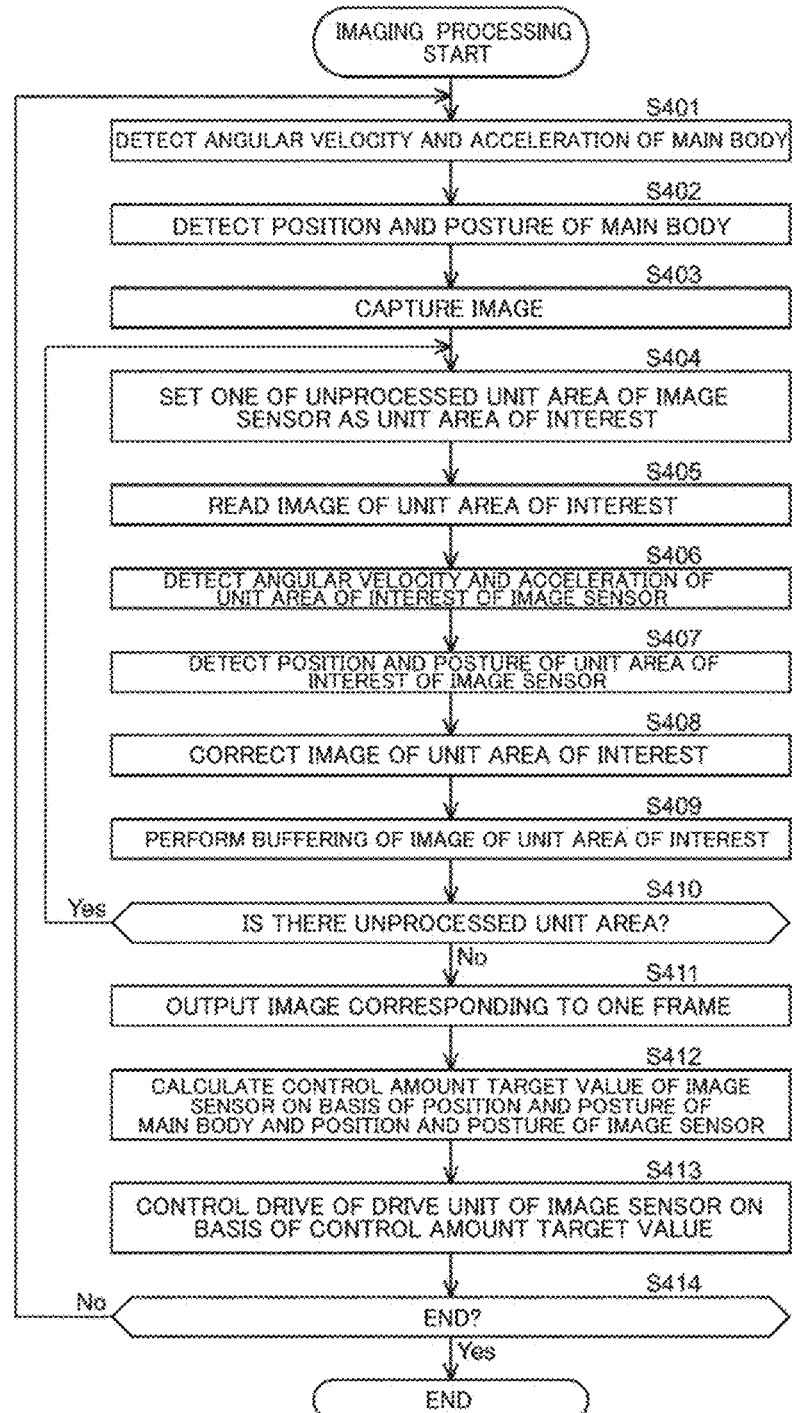
FIG. 68 is a flowchart illustrating imaging processing performed by the imaging device illustrated in FIG. 66.

Next, imaging processing using the imaging device 1101 illustrated in FIG. 66 will be described with reference to a flowchart illustrated in FIG. 68.

In Step S401, the IMU 1131 detects an acceleration and an angular velocity of the main body unit 1111 and outputs the acceleration and the angular velocity to the main body position/posture detecting unit 1132.

In Step S402, the translational movement calculating unit 1151 of the main body position/posture detecting unit 1132 detects a position of the main body unit 1111 using an integral operation on the basis of the information of the acceleration supplied from the IMU 1131 and outputs the detected position to the drive control unit 1134. The rotational movement calculating unit 1152 of the main body position/posture detecting unit 1132 detects a posture of the main body unit 1111 using an integral operation on the basis of the information of the angular velocity supplied from the IMU 1132 and outputs the detected posture to the drive control unit 1134.

In Step S403, the image sensor 1181 captures an image.

In Step S404, the image sensor 1181 and the IMU 1182 set a unit area that has not been processed among unit areas corresponding to the pixel unit and the IMU unit as a unit area of interest.

In Step S405, the image sensor 1181 reads a pixel signal of a pixel unit corresponding to the unit area of interest and outputs the read pixel signal to the hand shake correction processing unit 1136.

In Step S406, the IMU 1182 detects an acceleration and an angular velocity of the image sensor 1181 of an IMU unit corresponding to the unit area of interest and outputs the acceleration and the angular velocity to the image sensor position/posture detecting unit 1133.

In Step S407, the translational movement calculating unit 1171 of the image sensor position/posture detecting unit 1133 detects a position of the unit area of interest of the image sensor 1181 using an integral operation on the basis of the information of the acceleration of the IMU unit corresponding to the unit area of interest supplied from the IMU 1182 and outputs the detected position to the drive control unit 1134. The rotational movement calculating unit 1172 of the image sensor position/posture detecting unit 1133 detects a posture of the unit area of interest of the image sensor 1181 using an integral operation on the basis of the information of the angular velocity of the IMU unit corresponding to the unit area of interest supplied from the IMU 1182 of the imaging unit 1112 and outputs the detected posture to the drive control unit 1134.

The drive control unit 1134 supplies the information of the position and the posture of the main body unit 1111 and the information of the position and the posture of the unit area of interest of the image sensor 1181 to the hand shake correction processing unit 1136.

In Step S408, the hand shake correction processing unit 1136 acquires a motion vector in units of pixels of the unit area of interest on the basis of the information of the position and the posture of the main body unit 1111 and the information of the position and the posture of the unit area of interest of the image sensor 1181 and performs hand shake correction processing using the acquired motion vector in units of pixels of the unit area of interest.

In Step S409, the hand shake correction processing unit 1136 buffers the pixel signal of the unit area of interest for which the hand shake correction processing has been performed in the image frame buffer 1136*a*.

In Step S410, the image sensor 1181 and the IMU 1182 determine whether or not there is a unit area that has not been processed among unit areas corresponding to the pixel unit and the IMU unit.

In Step S410, in a case in which there is a unit area that has not been processed, the process returns to Step S404.

In other words, until the hand shake correction processing is performed for all the unit areas, the processes of Steps S404 to S410 are repeated, and the process of performing the hand shake correction processing for each unit area and buffering data in the image frame buffer 1136*a* is repeated.

Then, in a case in which the hand shake correction processing is performed for all the unit areas, and there is no unit area that has not been processed in Step S410, the process proceeds to Step S411.

In Step S411, the hand shake correction processing unit 1136 reads an image for which the hand shake correction processing has been performed corresponding to one frame buffered in the image frame buffer 1136*a* and outputs the read image to the output unit 1113.

In Step S412, the drive control unit 1134 generates a control signal for controlling the drive unit 1135 on the basis of the information of the position and the posture of the main body unit 1111 supplied from the main body position/posture detecting unit 1132 and the information of the position and the posture of the image sensor 1181 of the imaging unit 1112 supplied from the image sensor position/posture detecting unit 1133 and outputs the generated control signal to the drive unit 1135.

In more detail, by controlling the control amount target value calculating unit 1134*a*, the drive control unit 1134 causes a control amount target value using the drive unit 1135 for causing the position and the posture of the image sensor 1181 to be in a predetermined state to be calculated on the basis of the information of the position and the posture of the main body unit 1111 and the information of the position and the posture of the image sensor 1181.

In Step S413, the drive control unit 1134 generates a control signal for driving the drive unit 1135 on the basis of the control amount target value that is a result of calculation acquired by the control amount target value calculating unit 1134*a* and supplies the generated control signal to the drive unit 1135, thereby controlling driving.

In Step S414, it is determined whether or not ending of the imaging processing has been instructed, and, in a case in which ending has not been instructed, the process returns to Step S401.

In other words, the processes of Steps S401 to S414 are repeated until ending of the imaging processing is instructed.

Then, in Step S414, in a case in which ending of the imaging processing has been instructed, the processing ends.

In accordance with the process described above, the position and the posture of the image sensor 1181 are controlled by the drive unit 1135 on the basis of the information of the position and the posture of the image sensor 1181 in addition to the information of the position and the posture of the main body unit 1111, correction according to hand shake according to the image sensor 1181 can be realized with high accuracy at high speed.

Particularly, since the IMU 1182 is disposed in a state of being integrated with the image sensor 1181, the position and the posture of the image sensor 1181 detected using the IMU 1182 are appropriately detected, and thus the imaging device 1101 mounted in the mobile object device 1100 such as a drone or a vehicle can correct hand shake (a deviation according to high-frequency vibration of a motor, an engine, or the like) due to a high-frequency vibration of a driving motor or the like of the mobile object device 1100.

In addition, an image captured using the image sensor 1181 can be corrected through signal processing on the basis of the information of the position and the posture detected for each unit area having an image unit corresponding to the IMU unit, and accordingly, hand shake can be corrected with higher accuracy.

In the description presented above, although an example in which a motion vector is acquired on the basis of the information of the position and the posture of the main body unit 1111 and the information of the position and the posture of the image sensor 1181, and the hand shake correction processing is realized has been described, an influence of a high-frequency vibration on the position and the posture of the main body unit 1111 is considered to be low, and thus a motion vector may be acquired only from the information of the position and the posture of the image sensor 1181, and the hand shake correction processing is realized using signal processing.

<The Number of IMU Units and Accuracy of Hand Shake Correction>

In the description presented above, although an example in which N IMU units are configured for one image sensor 1181 has been described, N may be 1 or more.

Figure 69:
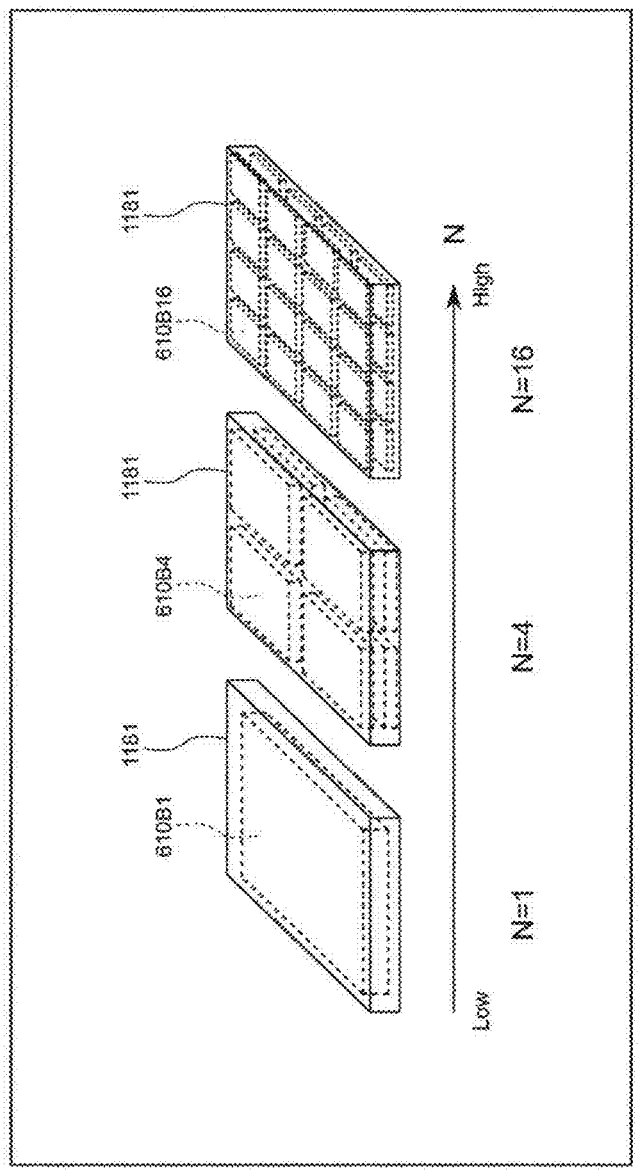
FIG. 69 is a diagram illustrating the number of IMU units and accuracy of correction.

Thus, for example, as illustrated in a left part of FIG. 69, the IMU unit 610B1 in a case in which N is 1 may be used, as illustrated in a center part of FIG. 69, the IMU unit 610B4 in a case in which N is four may be used, and, as illustrated in a right part of FIG. 69, the IMU unit 610B16 of a case in which N is 16 may be used, and N may be more than that.

In addition, although, as N that is the number of IMU units 610 increases, hand shake correction with high accuracy can be realized, as the number increases, a processing load and power consumption increase, and the cost becomes high, and thus there is trade-off between accuracy of the hand shake correction processing and the processing load, power consumption, and costs. For this reason, it is preferable to determine the number of IMU units 610 on the basis of accuracy required for the purpose and the cost.

25. Second Modified Example of Fifth Embodiment

In the description presented above, although an example of the imaging unit 1112 in which the image sensor 1181 and the IMU 1182 are configured to be integrated similar to the image sensor 801 and the multi-IMU 200 as illustrated in FIG. 61 has been described, the image sensor 1181 and the IMU 1182 may be configured to be in contact with each other, and any other configuration may be employed as long as the position and the posture of the image sensor 1181 are acquired by the IMU 1182.

Figure 70:
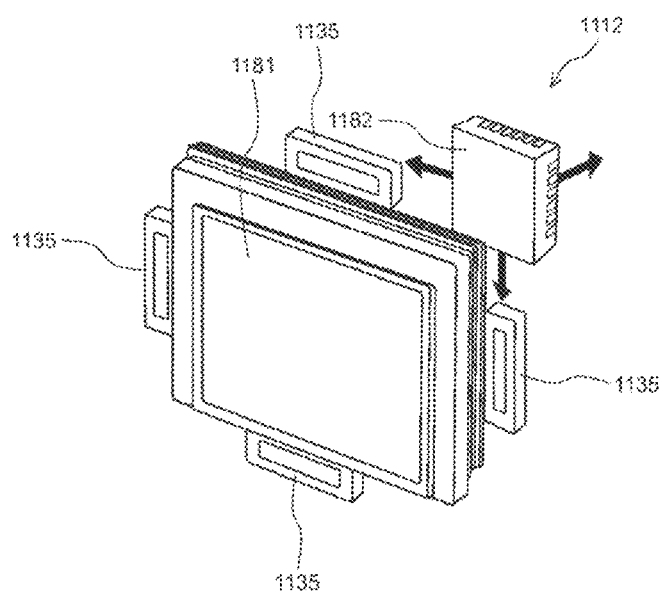
FIG. 70 is a diagram illustrating a configuration example of an imaging device according to a second modified example of the fifth embodiment.

For example, as illustrated in FIG. 70, a configuration in which an IMU 1182 that is a single body is disposed to be in contact with a side face portion of the image sensor 1181 may be employed.

FIG. 70 illustrates a configuration example of a case in which the drive unit 1135 is also integrated in the vicinity of the image sensor 1181. In other words, as illustrated in FIG. 70, the imaging unit 1112 may have a configuration in which the image sensor 1181, the IMU 1182, and the drive unit 1135 are integrated, and, for example, a package structure of an imaging element acquired by forming these as one body may be formed.

In addition, the imaging unit 1112 may have a configuration in which the drive unit 1135 is further integrated with a configuration in which the image sensor 801 and the multi-IMU 200 are integrated that has been described with reference to FIG. 60, and for example, a package structure of an imaging element acquired by forming these as one body may be formed.

26. Third Modified Example of Fifth Embodiment

In the description presented above, although an example in which the acceleration and the angular velocity of the image sensor 1181 are acquired by the IMU 1182, and the position and the posture are detected has been described, any other configuration may be employed as long as the position and the posture of the image sensor 1181 are acquired.

Figure 71:
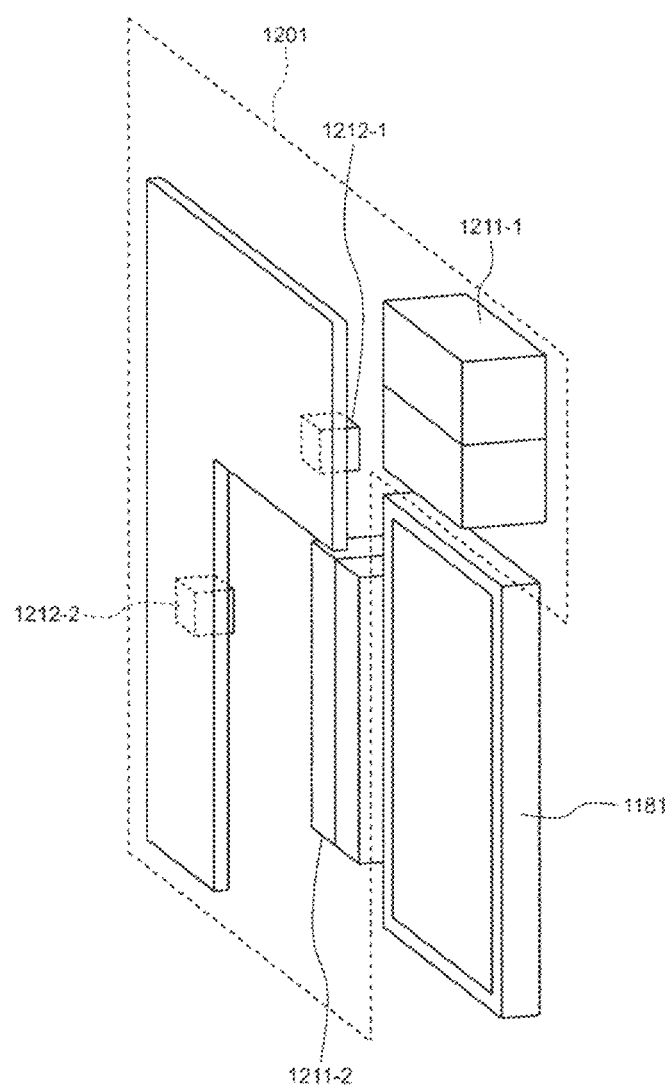
FIG. 71 is a diagram illustrating a configuration example of an imaging device according to a third modified example of the fifth embodiment.

For example, as illustrated in FIG. 71, a position detecting unit using a Hall element may be used.

In other words, the position detecting unit 1201 illustrated in FIG. 71 is composed of magnets 1211-1 and 1211-2 and Hall elements 1212-1 and 1212-2.

The magnets 1211-1 and 1211-2 are arranged such that magnetization directions of the magnets are aligned in a movement direction of each of the vertical direction and the horizontal direction of the image sensor 1181.

In a case in which the image sensor 1181 is located at the origin position, the Hall elements 1212-1 and 1212-2 are fixedly disposed to coincide with a boundary line of magnetic poles of S pole/N pole of the magnets 1211-1 and 1211-2.

In accordance with such an arrangement, when the image sensor 1181 moves, magnetic fields applied to the Hall elements 1212-1 and 1212-2 change in proportion to a movement amount of the magnets with a boundary line between the S pole/N pole of the magnets 1211-1 and 1211-2 set as a center.

By measuring this magnetic field, positions of the magnets 1211-1 and 1211-2 within the range of the area in the horizontal direction and the vertical direction can be detected.

The position of the image sensor 1181 may be detected using a position detecting unit 1201 as illustrated in FIG. 71.

However, by using the position detecting unit 1201 as illustrated in FIG. 71, although a change in position in a plane direction corresponding to the imaging face of the image sensor 1181 can be detected, a change in the incidence direction cannot be detected. For this point, separately, the magnet 1211 and the Hall element 1212 may be disposed in an incidence direction of incidence light as a countermeasure.

In addition, the IMU 1182 and the position detecting unit 1201 may be used in combination.

27. Example of Executing Processing Using Software

The above-described series of processing can be executed by hardware or software. In a case in which a series of processing is performed using software, a program configuring the software is installed from a recording to a computer built into dedicated hardware or, for example, a general-purpose computer capable of performing various functions by installing various programs, or the like.

Figure 72:
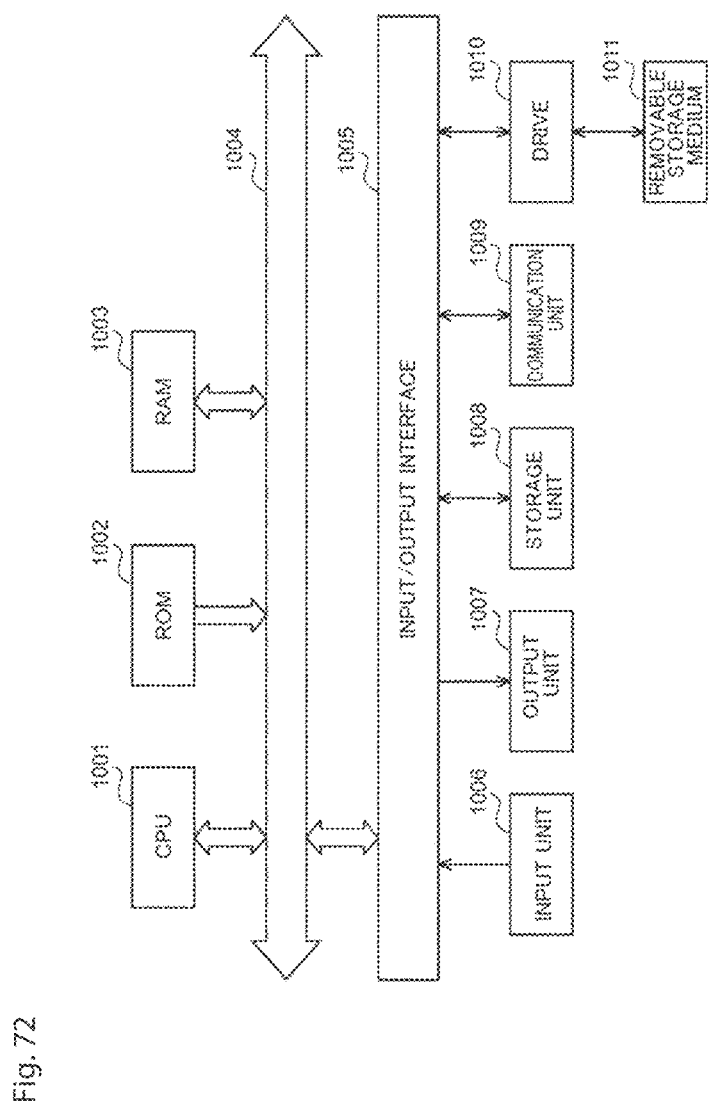
FIG. 72 is a diagram illustrating a configuration example of a general personal computer.

FIG. 72 illustrates a configuration example of a general-purpose computer. This personal computer has a central processing unit (CPU) 11001 built therein. An input/output interface 11005 is connected to the CPU 11001 through a bus 11004. A read only memory (ROM) 11002 and a random access memory (RAM) 11003 are connected to the bus 11004.

An input unit 11006 formed from input devices such as a keyboard or a mouse to which a user inputs an operation command, an output unit 11007 that outputs a process operation screen or an image of a process result to a display device, a storage unit 11008 formed from a hard disk drive or the like storing programs and various kinds of data, and a communication unit 11009 that is formed from a local area network (LAN) adapter and the like and performs communication processing via a network represented by the Internet are connected to the input/output interface 11005. In addition, a drive 11010 that reads/writes data from/into the removable storage medium 11011 such as a magnetic disk (including a flexible disk), an optical disc (including a compact disc-read only memory (CD-ROM) and a digital versatile disc (DVD)), a magneto-optical disk (including Mini Disc (MD)) or a semiconductor memory is connected to the input/output interface 11005.

A program is stored in the ROM 11002 or is read from a removable storage medium 11011 such as a magnetic disk, optical disc, magneto-optical disk, or a semiconductor memory and is installed in the storage unit 11008, and the CPU 11001 executes various kinds of processing in accordance with a program loaded from the storage unit 11008 into the RAM 11003. In the RAM 11003, the CPU 11001 performs various kinds of processing and necessary data or the like are also appropriately stored.

In the computer that has the above configuration, for example, the CPU 11001 performs the above-described series of processing by loading a program stored in the storage unit 11008 to the RAM 11003 via the input/output interface 11005 and the bus 11004 and executing the program.

The program executed by the computer (the CPU 11001) can be recorded on, for example, the removable storage medium 11011 serving as a package medium for supply. The program can also be provided via a wired or wireless transmission medium such as a local area network, the Internet, or digital satellite broadcasting.

In the computer, by mounting the removable storage medium 11011 on the drive 11010, it is possible to install the program in the storage unit 11008 via the input/output interface 11005. The program can be received by the communication unit 11009 via a wired or wireless transmission medium to be installed in the storage unit 11008. In addition, this program may be installed in advance in the ROM 11002 or the storage unit 11008.

Note that the program executed by a computer may be a program that performs processing chronologically in the order described in the present specification or may be a program that performs processing in parallel or at a necessary timing such as a called time.

In addition, the CPU 11001 illustrated in FIG. 72 realizes the functions of the drive control unit 1134 and the hand shake correction processing unit 1136 illustrated in FIG. 66.

In the present specification, a system means a set of a plurality of constituent elements (devices, modules (components), or the like) and all the constituent elements may or may not be included in a same casing. Accordingly, a plurality of devices accommodated in separate casings and connected via a network and one device in which a plurality of modules are accommodated in one casing both constitute systems.

Note that embodiments of the present disclosure are not limited to the above-mentioned embodiments and can be modified in various manners without departing from the gist of the present disclosure.

For example, the present disclosure may be configured as cloud computing in which a plurality of devices share and cooperatively process one function via a network.

In addition, each step described in the above flowchart can be executed by one device or executed in a shared manner by a plurality of devices.

Furthermore, in a case in which one step includes a plurality of processes, the plurality of processes included in the one step can be executed by one device or executed in a shared manner by a plurality of devices.

In addition, the present disclosure may take the following configurations.

<1> A solid-state imaging element including:
  an image sensor configured to capture an image; and
  an inertial measurement unit (IMU) disposed integrally with the image sensor and configured to detect an acceleration and an angular velocity of the image sensor,
  wherein the IMU outputs the acceleration and the angular velocity of the image sensor to a drive control unit controlling driving of the image sensor.

<2> The solid-state imaging element described in <1>, wherein the IMU is a multi-IMU formed from a plurality of IMUs.

<3> The solid-state imaging element described in <2>, wherein each of the plurality of IMUs configuring the multi-IMU detects an acceleration and an angular velocity for each unit area having a divisional area at the time of dividing the image sensor into a plurality of areas as a unit and sequentially outputs the acceleration and the angular velocity for each unit area to the drive control unit.

<4> The solid-state imaging element described in <3>, wherein, when each of the plurality of IMUs sequentially outputs the acceleration and the angular velocity for each unit area to the drive control unit, the image sensor outputs an image for each corresponding unit area.

<5> The solid-state imaging element described in <1>, wherein the IMU is a single body, detects an acceleration and an angular velocity of the image sensor, and sequentially outputs the acceleration and the angular velocity of the image sensor to the drive control unit.

<6> The solid-state imaging element described in <1>, further including a drive unit configured to control a position and a posture of the image sensor, wherein the drive control unit controls the position and the posture of the image sensor by controlling driving performed by the drive unit using inertial navigation based on the acceleration and the angular velocity of the image sensor and intermediate output signals.

<7> The solid-state imaging element described in <6>, wherein the drive unit is an actuator driving the image sensor.

<8> An imaging device including:
- a solid-state imaging element including an image sensor configured to capture an image and an IMU (Inertial Measurement Unit) disposed integrally with the image sensor and configured to detect an acceleration and an angular velocity of the image sensor;
- a drive unit configured to control a position and a posture of the image sensor; and
- a drive control unit configured to control the position and the posture of the image sensor by controlling driving performed by the drive unit using inertial navigation based on the acceleration and the angular velocity of the image sensor and intermediate output signals.

<9> The imaging device described in <8>, further including an image sensor position/posture detecting unit configured to detect the position and the posture of the image sensor using an integral operation based on the acceleration and the angular velocity of the image sensor,
wherein the drive control unit controls driving performed by the drive unit using feedback control based on the position and the posture of the image sensor.

<10> The imaging device described in <8>, further including another IMU, which is different from the IMU, disposed integrally with an device main body and configured to detect an acceleration and an angular velocity of the device main body,
wherein the drive control unit controls driving performed by the drive unit using an inertia direction based on the acceleration and the angular velocity of the image sensor detected by the IMU and the acceleration and the angular velocity of the device main body detected by the other IMU.

<11> The imaging device described in <10>, further including:
- an image sensor position/posture detecting unit configured to detect the position and the posture of the image sensor using an integral operation based on the acceleration and the angular velocity of the image sensor; and
- a main body position/posture detecting unit configured to detect the position and the posture of the device main body using an integral operation based on the acceleration and the angular velocity of the device main body,
wherein the drive control unit controls driving performed by the drive unit using feedback control based on the position and the posture of the image sensor and feed forward control based on the position and the posture of the device main body.

<12> The imaging device described in <11>, further including a control amount target value calculating unit configured to calculate a control amount target value relating to driving performed by the drive unit on the basis of the position and the posture of the image sensor and the position and the posture of the device main body,
wherein the drive control unit controls driving performed by the drive unit on the basis of the control amount target value.

<13> The imaging device described in any one of <8> to <12>, further including a correction unit configured to correct the image captured by the image sensor on the basis of the acceleration and the angular velocity of the image sensor.

<14> The imaging device described in <13>, wherein the IMU is a multi-IMU formed from a plurality of IMUs.

<15> The imaging device described in <14>,
wherein each of the plurality of IMUs configuring the multi-IMU detects an acceleration and an angular velocity for each unit area having a divisional area at the time of dividing the image sensor into a plurality of areas as a unit,
the image sensor outputs an image for each corresponding unit area when each of the plurality of IMUs detects the acceleration and the angular velocity for each unit area, and
the correction unit corrects the image for each unit area on the basis of the acceleration and the angular velocity for each unit area.

<16> The imaging device described in <15>, further including an image sensor position/posture detecting unit configured to detect the position and the posture for each unit area of the image sensor using an integral operation based on the acceleration and the angular velocity for each unit area of the image sensor, wherein the correction unit corrects the image for each unit area on the basis of the position and the posture for each unit area of the image sensor.

<17> The imaging device described in <8>, wherein the IMU is a single body and detects an acceleration and an angular velocity of the image sensor.

<18> The imaging device described in any one of <8> to <17>, wherein the drive unit is an actuator driving the image sensor.

<19> A method for operating an imaging device including:
- a solid-state imaging element including an image sensor configured to capture an image and an IMU (Inertial Measurement Unit) disposed integrally with the image sensor and configured to detect an acceleration and an angular velocity of the image sensor; and
- a drive unit configured to control a position and a posture of the image sensor, the method including:
- a step of controlling the position and the posture of the image sensor by controlling driving performed by the drive unit using inertial navigation based on the acceleration and the angular velocity of the image sensor and intermediate output signals.

<20> A program causing a computer controlling an imaging device including:
- a solid-state imaging element including an image sensor configured to capture an image and an IMU (Inertial Measurement Unit) disposed integrally with the image sensor and configured to detect an acceleration and an angular velocity of the image sensor; and
- a drive unit configured to control a position and a posture of the image sensor, to function as a drive control unit configured to control the position and the posture of the image sensor by controlling driving performed by the drive unit using inertial navigation based on the acceleration and the angular velocity of the image sensor and intermediate output signals.

<21> A mobile object device including
an imaging device including:
- a solid-state imaging element including an image sensor configured to capture an image and an IMU (Inertial Measurement Unit) disposed integrally with the image sensor and configured to detect an acceleration and an angular velocity of the image sensor;

a drive unit configured to control a position and a posture of the image sensor; and a drive control unit configured to control the position and the posture of the image sensor by controlling driving performed by the drive unit using inertial navigation based on the acceleration and the angular velocity of the image sensor and intermediate output signals.

<22> The mobile object device described in <21>, further including an image sensor position/posture detecting unit configured to detect the position and the posture of the image sensor using an integral operation based on the acceleration and the angular velocity of the image sensor, wherein the drive control unit controls driving performed by the drive unit using feedback control based on the position and the posture of the image sensor.

<23> The mobile object device described in <21>, further including another IMU, which is different from the IMU, disposed integrally with a main body of the imaging device and configured to detect an acceleration and an angular velocity of the main body of the imaging device, wherein the drive control unit controls driving performed by the drive unit using an inertia direction based on the acceleration and the angular velocity of the image sensor detected by the IMU and the acceleration and the angular velocity of the main body of the imaging device detected by the other IMU.

<24> The mobile object device described in <23>, further including:

an image sensor position/posture detecting unit configured to detect the position and the posture of the image sensor using an integral operation based on the acceleration and the angular velocity of the image sensor; and a main body position/posture detecting unit configured to detect the position and the posture of the main body of the imaging device using an integral operation based on the acceleration and the angular velocity of the main body of the imaging device, wherein the drive control unit controls driving performed by the drive unit using feedback control based on the position and the posture of the image sensor and feed forward control based on the position and the posture of the main body of the imaging device.

<25> The mobile object device described in <23>, further including a control amount target value calculating unit configured to calculate a control amount target value relating to driving performed by the drive unit on the basis of the position and the posture of the image sensor and the position and the posture of the main body of the imaging device, wherein the drive control unit controls driving performed by the drive unit on the basis of the control amount target value.

<26> The mobile object device described in any one of <21> to <25>, further including a correction unit configured to correct the image captured by the image sensor on the basis of the acceleration and the angular velocity of the image sensor.

<27> The mobile object device described in <26>, wherein the IMU is a multi-IMU formed from a plurality of IMUs.

<28> The mobile object device described in <27>, wherein each of the plurality of IMUs configuring the multi-IMU detects an acceleration and an angular velocity for each unit area having a divisional area at the time of dividing the image sensor into a plurality of areas as a unit, the image sensor outputs an image for each corresponding unit area when each of the plurality of IMUs detects the acceleration and the angular velocity for each unit area, and the correction unit corrects the image for each unit area on the basis of the acceleration and the angular velocity for each unit area.

<29> The mobile object device described in <28>, further including an image sensor position/posture detecting unit configured to detect the position and the posture for each unit area of the image sensor using an integral operation based on the acceleration and the angular velocity for each unit area of the image sensor, wherein the correction unit corrects the image for each unit area on the basis of the position and the posture for each unit area of the image sensor.

<30> A method for operating a mobile object device including an imaging device including:

a solid-state imaging element including an image sensor configured to capture an image and an IMU (Inertial Measurement Unit) disposed integrally with the image sensor and configured to detect an acceleration and an angular velocity of the image sensor; and a drive unit configured to control a position and a posture of the image sensor, the method including:

a step of controlling the position and the posture of the image sensor by controlling driving performed by the drive unit using inertial navigation based on the acceleration and the angular velocity of the image sensor and intermediate output signals.

<31> A program causing a computer controlling a mobile object device including:

a solid-state imaging element including an image sensor configured to capture an image and an IMU (Inertial Measurement Unit) disposed integrally with the image sensor and configured to detect an acceleration and an angular velocity of the image sensor; and a drive unit configured to control a position and a posture of the image sensor, to function as:

a drive control unit configured to control the position and the posture of the image sensor by controlling driving performed by the drive unit using inertial navigation based on the acceleration and the angular velocity of the image sensor and intermediate output signals.

REFERENCE SIGNS LIST

200 Multi-IMU (Inertial Measurement Unit)
201, 201-1 to 201-4 IMU
210 Printed board
211, 211-1 to 211-4 Vibrator
212, 212-1 to 212-4, 212', 212'-1, 212'-2-1 to 212'-2-4 Base
213, 213-1 to 213-4, 213', 213''', 213''' Reading circuit
231, 231-1 to 231-4 Drive circuit block
232, 232-1 to 232-4 Sense circuit block
233, 233-1 to 233-4 Digital output circuit block
251, 251-1 to 241-4 Oscillation circuit
252, 252-1 to 252-4 Automated gain adjusting circuit
271, 271-1 to 271-4 Charge amplification circuit
272, 272-1 to 272-4 Phase shift circuit
273, 273-1 to 273-4 Synchronization detecting circuit
274, 274-1 to 274-4 LPF
291, 291-1 to 291-4 AD conversion circuit
292, 292-1 to 292-4 Decimation filter
293, 293-1 to 293-4 Digital output circuit
301, 301' Switching circuit
321, 321' Reference signal generating unit 351, 351-1 to 351-4 Acoustic insulator
371 Beat detecting circuit
372 Composing unit
411, 411-1, 411-2 Cluster
451 Clustering measuring device
452 Connection part
461 Reference frequency generating unit
462 Frequency measuring unit
463 Clustering calculating unit
471, 471', 471", 471''' Composing calculating unit
481 Re-sampler
483 Interference eliminating unit
484 Composing unit
511, 511-1, 511-2, 511', 512, 512-1, 512-2, 512', 521, 521-1, 521-2, 522, 522-1, 522-2 Switch
531, 531-1, 531-2 Delay adjusting unit
532, 532', 532" Cluster inside composing unit
551, 551-1, 551-2 Differential inverting unit
561, 561' Switch
571, 571-2, 571-2 Inverting unit
601 Proof mass
602 Movable drive part
603 Fixed drive part
604 Connection part
604a Electrode
605 Detection electrode
610, 610X, 610X-1 to 610X-4, 610Y, 610Y-1 to 610Y-4, 610Z, 610Z-1 to 610Z-4 IMU unit
610BX, 610BY, 610BZ IMU block
611, 611-1, 611-2 Connection beam
612-1, 612-2 Connection beam
632, 632-1, 632-2 Connection beam
631, 631-1, 631-2 Connection beam
651 Signal processing unit
661, 662 Calculation unit
671 Signal processing unit
672 Switching unit
681, 681-1 to 681-4 Calculation unit
701, 701-1 to 701-3, 702, 702-1 to 702-3 Connection beam
731, 732 Switching unit
733 Signal processing unit
741 Calculation unit
751 Signal processing unit
752 Switching unit
801 Image sensor
1100 Mobile object device
1101 Imaging device
1111 Main body unit
1112 Imaging unit
1113 Output unit
1131 IMU
1132 Main body position/posture detecting unit
1133 Image sensor position/posture detecting unit
1134 Drive control unit
1135 Drive unit
1136 Hand shake correction processing unit
1151 Translational movement calculating unit
1152 Rotational movement calculating unit
1171 Translational movement calculating unit
1172 Rotational movement calculating unit
1181 Image sensor
1182 IMU
1191 Image recording unit
1192 Transmission unit
1201 Position detecting unit
1211-1, 1211-2 Magnet
1212-1, 1212-2 Hall element

The invention claimed is:

1. A solid-state imaging element comprising:
an image sensor configured to capture an image; and
an inertial measurement unit (IMU) disposed integrally with the image sensor and configured to detect at least one of an acceleration or an angular velocity of the image sensor,
wherein the IMU is a multi-IMU formed from a plurality of IMUs,
wherein the plurality of IMUs are formed adjacent to each other on a surface of a planar base,
wherein the planar base is stacked on the image sensor in a direction orthogonal to the surface of the planar base,
wherein the IMU outputs at least one of the acceleration or the angular velocity of the image sensor to a drive control unit controlling driving of the image sensor, and
wherein the drive control unit is implemented via at least one processor.

2. The solid-state imaging element according to claim 1, wherein each of the plurality of IMUs configuring the multi-IMU detects at least one of an acceleration or an angular velocity for each unit area having a divisional area at a time of dividing the image sensor into a plurality of areas as a unit and sequentially outputs at least one of the acceleration or the angular velocity for each unit area to the drive control unit.

3. The solid-state imaging element according to claim 2, wherein, when each of the plurality of IMUs sequentially outputs at least one of the acceleration or the angular velocity for each unit area to the drive control unit, the image sensor outputs an image for each corresponding unit area.

4. The solid-state imaging element according to claim 1, wherein the IMU is a single body, detects at least one of an acceleration or an angular velocity of the image sensor, and sequentially outputs at least one of the acceleration or the angular velocity of the image sensor to the drive control unit.

5. The solid-state imaging element according to claim 1, further comprising
an actuator configured to control a position and a posture of the image sensor,
wherein the drive control unit controls the position and the posture of the image sensor by controlling driving performed by the actuator using inertial navigation based on the acceleration and the angular velocity of the image sensor and intermediate output signals.

6. The solid-state imaging element according to claim 5, wherein the actuator drives the image sensor.

7. An imaging device comprising:
a solid-state imaging element including
an image sensor configured to capture an image and
an inertial measurement unit (IMU) disposed integrally with the image sensor and configured to detect at least one of an acceleration or an angular velocity of the image sensor;
an actuator configured to control a position and a posture of the image sensor; and
a drive control unit configured to control the position and the posture of the image sensor by controlling driving performed by the actuator using inertial navigation based on the acceleration and the angular velocity of the image sensor and intermediate output signals,
wherein the IMU is a multi-IMU formed from a plurality of IMUs,
wherein the plurality of IMUs are formed adjacent to each other on a surface of a planar base, wherein the planar base is stacked on the image sensor in a direction orthogonal to the surface of the planar base, and wherein the drive control unit is implemented via at least one processor.

8. The imaging device according to claim 7, further comprising an image sensor position/posture detecting unit configured to detect the position and the posture of the image sensor using an integral operation based on the acceleration and the angular velocity of the image sensor, wherein the drive control unit controls driving performed by the actuator using feedback control based on the position and the posture of the image sensor, and wherein the image sensor position/posture detecting unit is implemented via at least one processor.

9. The imaging device according to claim 7, further comprising another IMU, which is different from the IMU, disposed integrally with a device main body and configured to detect at least one of an acceleration or an angular velocity of the device main body, wherein the drive control unit controls driving performed by the actuator using an inertia direction based on the acceleration and the angular velocity of the image sensor detected by the IMU and the acceleration and the angular velocity of the device main body detected by the other IMU.

10. The imaging device according to claim 9, further comprising:

an image sensor position/posture detecting unit configured to detect the position and the posture of the image sensor using an integral operation based on the acceleration and the angular velocity of the image sensor; and a main body position/posture detecting unit configured to detect the position and the posture of the device main body using an integral operation based on the acceleration and the angular velocity of the device main body, wherein the drive control unit controls driving performed by the actuator using feedback control based on the position and the posture of the image sensor and feed forward control based on the position and the posture of the device main body, and wherein the image sensor position/posture detecting unit and the main body position/posture detecting unit are each implemented via at least one processor.

11. The imaging device according to claim 10, further comprising a control amount target value calculating unit configured to calculate a control amount target value relating to driving performed by the actuator on a basis of the position and the posture of the image sensor and the position and the posture of the device main body, wherein the drive control unit controls driving performed by the actuator on a basis of the control amount target value, and wherein the control amount target value calculating unit is implemented via at least one processor.

12. The imaging device according to claim 7, further comprising a correction unit configured to correct the image captured by the image sensor on a basis of the acceleration and the angular velocity of the image sensor, wherein the correction unit is implemented via at least one processor.

13. The imaging device according to claim 12, wherein each of the plurality of IMUs configuring the multi-IMU detects at least one of an acceleration or an angular velocity for each unit area having a divisional area at a time of dividing the image sensor into a plurality of areas as a unit, the image sensor outputs an image for each corresponding unit area when each of the plurality of IMUs detects at least one of the acceleration or the angular velocity for each unit area, and the correction unit corrects the image for each unit area on the basis of the acceleration and the angular velocity for each unit area.

14. The imaging device according to claim 13, further comprising an image sensor position/posture detecting unit configured to detect the position and the posture for each unit area of the image sensor using an integral operation based on the acceleration and the angular velocity for each unit area of the image sensor, wherein the correction unit corrects the image for each unit area on a basis of the position and the posture for each unit area of the image sensor, and wherein the image sensor position/posture detecting unit is implemented via at least one processor.

15. The imaging device according to claim 7, wherein the IMU is a single body and detects at least one of an acceleration or an angular velocity of the image sensor.

16. The imaging device according to claim 7, wherein the actuator drives the image sensor.

17. A method for operating an imaging device including:

a solid-state imaging element including an image sensor configured to capture an image and an inertial measurement unit (IMU) disposed integrally with the image sensor and configured to detect at least one of an acceleration or an angular velocity of the image sensor; and an actuator configured to control a position and a posture of the image sensor, the method comprising:

controlling the position and the posture of the image sensor by controlling driving performed by the actuator using inertial navigation based on the acceleration and the angular velocity of the image sensor and intermediate output signals, wherein the IMU is a multi-IMU formed from a plurality of IMUs, wherein the plurality of IMUs are formed adjacent to each other on a surface of a planar base, and wherein the planar base is stacked on the image sensor in a direction orthogonal to the surface of the planar base.

18. A non-transitory computer-readable medium having embodied thereon a program, which when executed by a computer causes the computer to execute a method for operating an imaging device including:

a solid-state imaging element including an image sensor configured to capture an image and an inertial measurement unit (IMU) disposed integrally with the image sensor and configured to detect at least one of an acceleration or an angular velocity of the image sensor; and an actuator configured to control a position and a posture of the image sensor, the method comprising:

controlling the position and the posture of the image sensor by controlling driving performed by the actuator using inertial navigation based on the acceleration and the angular velocity of the image sensor and intermediate output signals, wherein the IMU is a multi-IMU formed from a plurality of IMUs, wherein the plurality of IMUs are formed adjacent to each other on a surface of a planar base, and wherein the planar base is stacked on the image sensor in a direction orthogonal to the surface of the planar base.

19. A mobile object device comprising
an imaging device including:
   a solid-state imaging element including an image sensor configured to capture an image and an inertial measurement unit (IMU) disposed integrally with the image sensor and configured to detect at least one of an acceleration or an angular velocity of the image sensor;
   an actuator configured to control a position and a posture of the image sensor; and
   a drive control unit configured to control the position and the posture of the image sensor by controlling driving performed by the actuator using inertial navigation based on the acceleration and the angular velocity of the image sensor and intermediate output signals,
wherein the IMU is a multi-IMU formed from a plurality of IMUs,
wherein the plurality of IMUs are formed adjacent to each other on a surface of a planar base,
wherein the planar base is stacked on the image sensor in a direction orthogonal to the surface of the planar base, and
wherein the drive control unit is implemented via at least one processor.

20. The mobile object device according to claim 19, further comprising
   an image sensor position/posture detecting unit configured to detect the position and the posture of the image sensor using an integral operation based on the acceleration and the angular velocity of the image sensor,
   wherein the drive control unit controls driving performed by the actuator using feedback control based on the position and the posture of the image sensor, and
   wherein the image sensor position/posture detecting unit is implemented via at least one processor.

21. The mobile object device according to claim 19, further comprising
   another IMU, which is different from the IMU, disposed integrally with a main body of the imaging device and configured to detect at least one of an acceleration or an angular velocity of the main body of the imaging device,
   wherein the drive control unit controls driving performed by the actuator using an inertia direction based on the acceleration and the angular velocity of the image sensor detected by the IMU and the acceleration and the angular velocity of the main body of the imaging device detected by the other IMU.

22. The mobile object device according to claim 21, further comprising:
   an image sensor position/posture detecting unit configured to detect the position and the posture of the image sensor using an integral operation based on the acceleration and the angular velocity of the image sensor; and
   a main body position/posture detecting unit configured to detect the position and the posture of the main body of the imaging device using an integral operation based on the acceleration and the angular velocity of the main body of the imaging device,
   wherein the drive control unit controls driving performed by the actuator using feedback control based on the position and the posture of the image sensor and feed forward control based on the position and the posture of the main body of the imaging device, and
   wherein the image sensor position/posture detecting unit and the main body position/posture detecting unit are each implemented via at least one processor.

23. The mobile object device according to claim 21, further comprising
   a control amount target value calculating unit configured to calculate a control amount target value relating to driving performed by the actuator on a basis of the position and the posture of the image sensor and the position and the posture of the main body of the imaging device,
   wherein the drive control unit controls driving performed by the actuator on a basis of the control amount target value, and
   wherein the control amount target value calculating unit is implemented via at least one processor.

24. The mobile object device according to claim 19, further comprising
   a correction unit configured to correct the image captured by the image sensor on a basis of the acceleration and the angular velocity of the image sensor,
   wherein the correction unit is implemented via at least one processor.

25. The mobile object device according to claim 24,
   wherein each of the plurality of IMUs configuring the multi-IMU detects at least one of an acceleration or an angular velocity for each unit area having a divisional area at a time of dividing the image sensor into a plurality of areas as a unit,
   the image sensor outputs an image for each corresponding unit area when each of the plurality of IMUs detects at least one of the acceleration or the angular velocity for each unit area, and
   the correction unit corrects the image for each unit area on the basis of the acceleration and the angular velocity for each unit area.

26. The mobile object device according to claim 25, further comprising
   an image sensor position/posture detecting unit configured to detect the position and the posture for each unit area of the image sensor using an integral operation based on the acceleration and the angular velocity for each unit area of the image sensor,
   wherein the correction unit corrects the image for each unit area on a basis of the position and the posture for each unit area of the image sensor, and
   wherein the image sensor position/posture detecting unit is implemented via at least one processor.

27. A method for operating a mobile object device including an imaging device including:
   a solid-state imaging element including an image sensor configured to capture an image and an inertial measurement unit (IMU) disposed integrally with the image sensor and configured to detect at least one of an acceleration or an angular velocity of the image sensor; and
   an actuator configured to control a position and a posture of the image sensor, the method comprising:
    controlling the position and the posture of the image sensor by controlling driving performed by the actuator using inertial navigation based on the acceleration and the angular velocity of the image sensor and intermediate output signals,
    wherein the IMU is a multi-IMU formed from a plurality of IMUs,
    wherein the plurality of IMUs are formed adjacent to each other on a surface of a planar base, and
    wherein the planar base is stacked on the image sensor in a direction orthogonal to the surface of the planar base.

28. A non-transitory computer-readable medium having embodied thereon a program, which when executed by a computer causes the computer to execute a method for operating a mobile object device including an imaging device including:
    a solid-state imaging element including an image sensor configured to capture an image and an inertial measurement unit (IMU) disposed integrally with the image sensor and configured to detect at least one of an acceleration or an angular velocity of the image sensor; and
    an actuator configured to control a position and a posture of the image sensor, to function as the method comprising:
        controlling the position and the posture of the image sensor by controlling driving performed by the actuator using inertial navigation based on the acceleration and the angular velocity of the image sensor and intermediate output signals,
    wherein the IMU is a multi-IMU formed from a plurality of IMUs,
    wherein the plurality of IMUs are formed adjacent to each other on a surface of a planar base, and
    wherein the planar base is stacked on the image sensor in a direction orthogonal to the surface of the planar base.

29. The solid-state imaging element according to claim 1, further comprising
    an acoustic insulator interposed between the IMU and the planar base.

* * * * *